United States Patent
Hahn et al.

(10) Patent No.: US 6,997,684 B2
(45) Date of Patent: Feb. 14, 2006

(54) FAN MOTOR WITH DIGITAL CONTROLLER FOR APPLYING SUBSTANTIALLY CONSTANT DRIVING CURRENT

(75) Inventors: Alexander Hahn, Sauldorf (DE); Hermann Rappenecker, Vohrenbach (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 246 days.

(21) Appl. No.: 10/362,696

(22) PCT Filed: Aug. 13, 2001

(86) PCT No.: PCT/EP01/09322

§ 371 (c)(1), (2), (4) Date: Feb. 26, 2003

(87) PCT Pub. No.: WO02/19511

PCT Pub. Date: Mar. 7, 2002

(65) Prior Publication Data

US 2003/0175124 A1    Sep. 18, 2003

(30) Foreign Application Priority Data

Aug. 30, 2000  (DE) .............................. 100 42 506

(51) Int. Cl.
*F04B 49/06*    (2006.01)

(52) U.S. Cl. ............... 417/44.1; 417/44.11; 318/599; 318/600; 318/635; 318/434

(58) Field of Classification Search ............... 417/44.1, 417/44.11, 423.1; 318/599, 632, 635, 432–434, 318/138, 254, 439, 569, 600
See application file for complete search history.

(56) References Cited

U.S. PATENT DOCUMENTS

| | | | |
|---|---|---|---|
| 3,873,897 A | 3/1975 | Müller et al. ............... | 318/138 |
| 4,426,604 A | 1/1984 | Doemen et al. ............ | 318/334 |
| 4,775,631 A * | 10/1988 | Saman ......................... | 435/6 |
| 4,829,218 A | 5/1989 | Bauer et al. ................ | 318/811 |
| 4,933,614 A | 6/1990 | Kawata ....................... | 318/432 |
| 5,220,259 A | 6/1993 | Werner et al. ............. | 318/432 |
| 5,296,787 A | 3/1994 | Albrecht et al. ........... | 318/433 |

(Continued)

FOREIGN PATENT DOCUMENTS

CA    2048018    2/1992

(Continued)

OTHER PUBLICATIONS

Patent Abs. of Japan, re Sunaga/Calsonic JP 2000-175 482-A, publ. Jun. 2000.

(Continued)

*Primary Examiner*—Charles G. Freay
*Assistant Examiner*—Emmanuel Sayoc
(74) *Attorney, Agent, or Firm*—Milton Oliver, Esq.; Ware Fressola Van Der Sluys & Adolphson LLP

(57) ABSTRACT

The invention relates to a fan arrangement comprising a radial or diagonal fan (370) with which a direct current motor (32) is associated as drive motor, further comprising a digital control element (23, 24) such as a microcontroller or microprocessor, associated with that direct current motor (32), and comprising a program, associated with that digital control element (23, 24), for controlling the current flowing through the direct current motor (32), which program is embodied to generate a substantially constant current in the motor (32) in the working rotation speed range of the fan.

15 Claims, 42 Drawing Sheets

U.S. PATENT DOCUMENTS

| | | | |
|---|---|---|---|
| 5,336,063 A | 8/1994 | Lehrke et al. | 417/415 |
| 5,341,286 A | 8/1994 | Inoue et al. | 363/98 |
| 5,373,436 A | 12/1994 | Yamaguchi et al. | 363/98 |
| 5,463,299 A | 10/1995 | Futami et al. | 318/618 |
| RE351,124 * | 12/1995 | Erdman et al. | 318/599 |
| 5,492,273 A * | 2/1996 | Shah | 236/44 A |
| 5,592,058 A * | 1/1997 | Archer et al. | 318/254 |
| 5,675,231 A * | 10/1997 | Becerra et al. | 318/801 |
| 5,676,523 A | 10/1997 | Lee | 415/206 |
| 5,689,162 A | 11/1997 | Li | 318/599 |
| 5,695,318 A * | 12/1997 | Harmsen | 415/218.1 |
| 5,738,503 A | 4/1998 | Schmidt-Marloh et al. | 417/423.7 |
| 5,825,597 A * | 10/1998 | Young | 361/31 |
| 5,933,573 A | 8/1999 | Lukenich et al. | 388/811 |
| 5,939,807 A * | 8/1999 | Patyk et al. | 310/89 |
| 5,942,866 A | 8/1999 | Hsieh | 318/268 |
| 6,078,152 A | 6/2000 | Dieterle et al. | 318/264 |
| 6,091,887 A | 7/2000 | Dieterle et al. | 388/811 |
| 6,118,239 A * | 9/2000 | Kadah | 318/268 |
| 6,147,615 A | 11/2000 | Chen | 340/648 |
| 6,310,453 B1 | 10/2001 | Lin | 318/445 |
| 6,452,349 B1 | 9/2002 | Hahn et al. | 318/254 |

FOREIGN PATENT DOCUMENTS

| | | |
|---|---|---|
| CA | 2334674 | 6/1999 |
| DE | 39 10 643 A1 | 10/1990 |
| DE | 41 24 240 A1 | 2/1992 |
| DE | 44 08 442 | 9/1995 |
| DE | 44 08 805 | 9/1995 |
| DE | 195 02 907 | 8/1996 |
| DE | 197 00 479 A1 | 7/1997 |
| GB | 2 195 037 A | 3/1988 |
| JP | 52-040188 A | 3/1977 |
| SU | 1654964 | 6/1991 |

OTHER PUBLICATIONS

Derwent English abstract of Ivanov et al. SU 1,654,964, publ. Jun. 7, 1991.

* cited by examiner

| phi_el | 700 | | | 702 | | | 704 | | | 706 | EN | | | IN | | |
|---|---|---|---|---|---|---|---|---|---|---|---|---|---|---|---|---|
| | HS1 | HS2 | HS3 | 81 | 83 | 85 | 80 | 82 | 84 | | EN1 | EN2 | EN3 | IN1 | IN2 | IN3 |
| 0°...60° | 1 | 0 | 1 | 0 | 1 | 0 | 1 | 0 | 0 | | 0 | 0 | 1 | 1 | TRI | 1 |
| 60°...120° | 1 | 0 | 0 | 0 | 0 | 1 | 1 | 0 | 0 | | 0 | 1 | 0 | 1 | 1 | TRI |
| 120°...180° | 1 | 1 | 0 | 1 | 0 | 1 | 0 | 1 | 0 | | 1 | 0 | 0 | 1 | 1 | 1 |
| 180°...240° | 0 | 1 | 0 | 1 | 0 | 0 | 0 | 0 | 1 | | 0 | 1 | 1 | TRI | 1 | 1 |
| 240°...300° | 0 | 1 | 1 | 0 | 1 | 0 | 0 | 0 | 1 | | 0 | 0 | 1 | TRI | 1 | 1 |
| 300°...360° | 0 | 0 | 1 | 0 | 1 | 0 | 1 | 0 | 0 | | 1 | 0 | 0 | 1 | TRI | 1 |

708 encompasses EN and IN columns. 706 encompasses 702 and 704. 740 points to EN3 column.

Fig. 3

FAN MOTOR WITH DIGITAL CONTROLLER FOR APPLYING SUBSTANTIALLY CONSTANT DRIVING CURRENT

The invention concerns a fan arrangement.

Such arrangements are used in many fields, e.g. for the aeration and venting of equipment, vehicles, buildings, etc.

It is an object of the invention to make available a new fan arrangement.

According to the invention, this object is achieved by means of the subject matter of claim 1. A fan arrangement of this kind is less dependent on counterpressure than an axial fan, since its rotation speed rises with rising counterpressure so that it can successfully "fight against" higher counterpressures.

The invention also concerns an arrangement for aeration or venting according to claim 6. An arrangement of this kind offers great practical advantages, since with it, a reversal of the air flow through one of the fans as a result of a local pressure rise can occur much less frequently than with axial fans of the same size.

The invention furthermore concerns a method for regulating the current in a direct current motor serving to drive a fan, this being the subject matter of claims 12 through 19. This kind of method can be implemented very easily and inexpensively by means of a mixture of digital and analog components, and is suitable for inexpensive fans. Fans for carrying out such a method can also be implemented in very simple and compact fashion.

The invention furthermore concerns methods for automatic testing of fans that are the subject matter of claims 20 through 25. Such methods make it possible greatly to increase operating reliability in critical applications, since imminent failures of a motor usually make themselves known some time in advance by way of a corresponding deterioration in its values.

Further details and advantageous developments of the invention are evident from the exemplary embodiments described below and depicted in the drawings, which are in no way to be understood as a limitation of the invention, and from the dependent claims. In the drawings:

FIG. 3 is a table showing the output signals of rotor position sensors 111, 112, 113 and, as a function thereof, the control of full bridge circuit 78 of FIG. 2;

Figure 1:
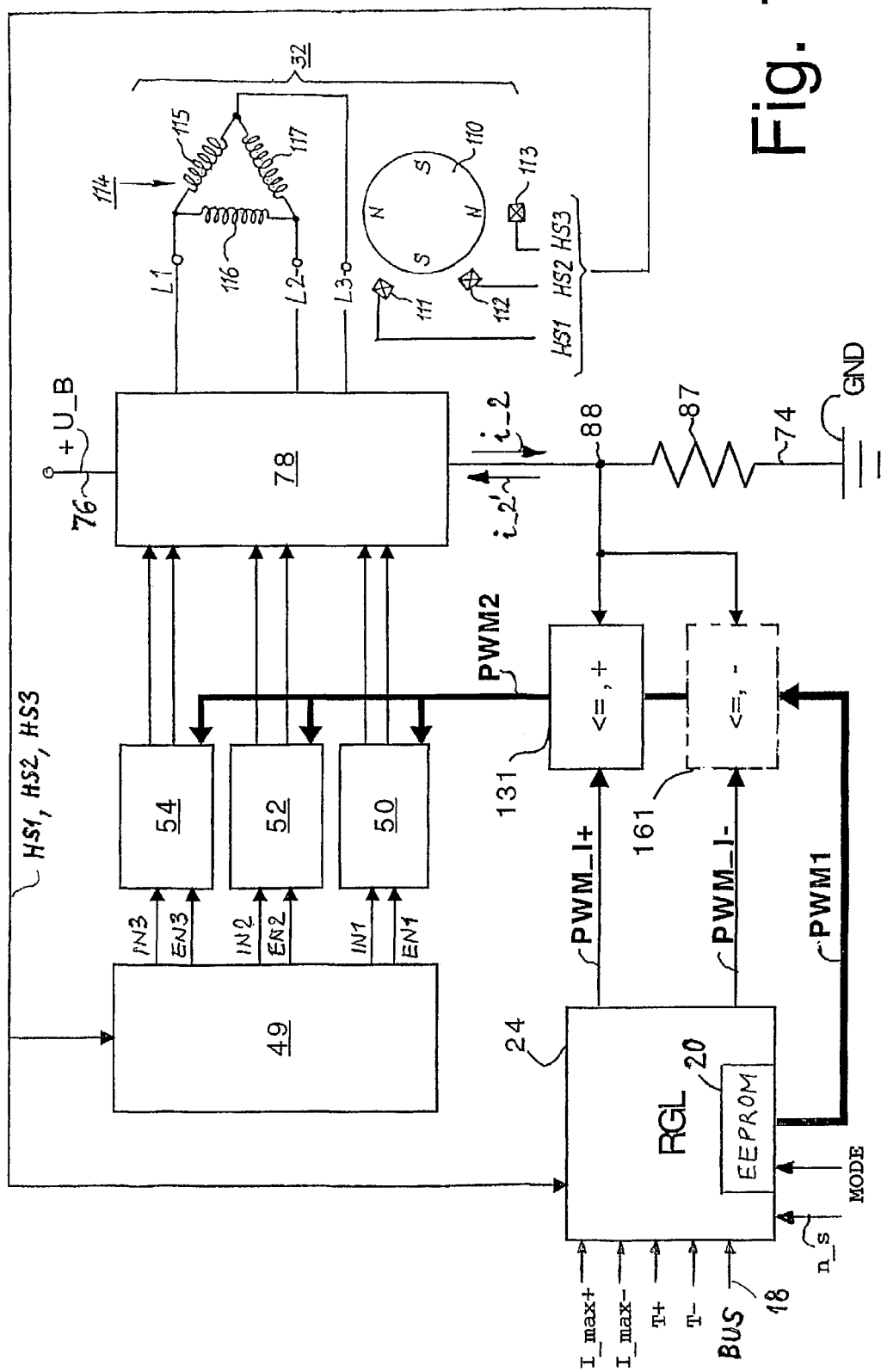
FIG. 1 is an overview circuit diagram of a preferred embodiment of an arrangement according to the present invention having a DC machine.
Figure 4:
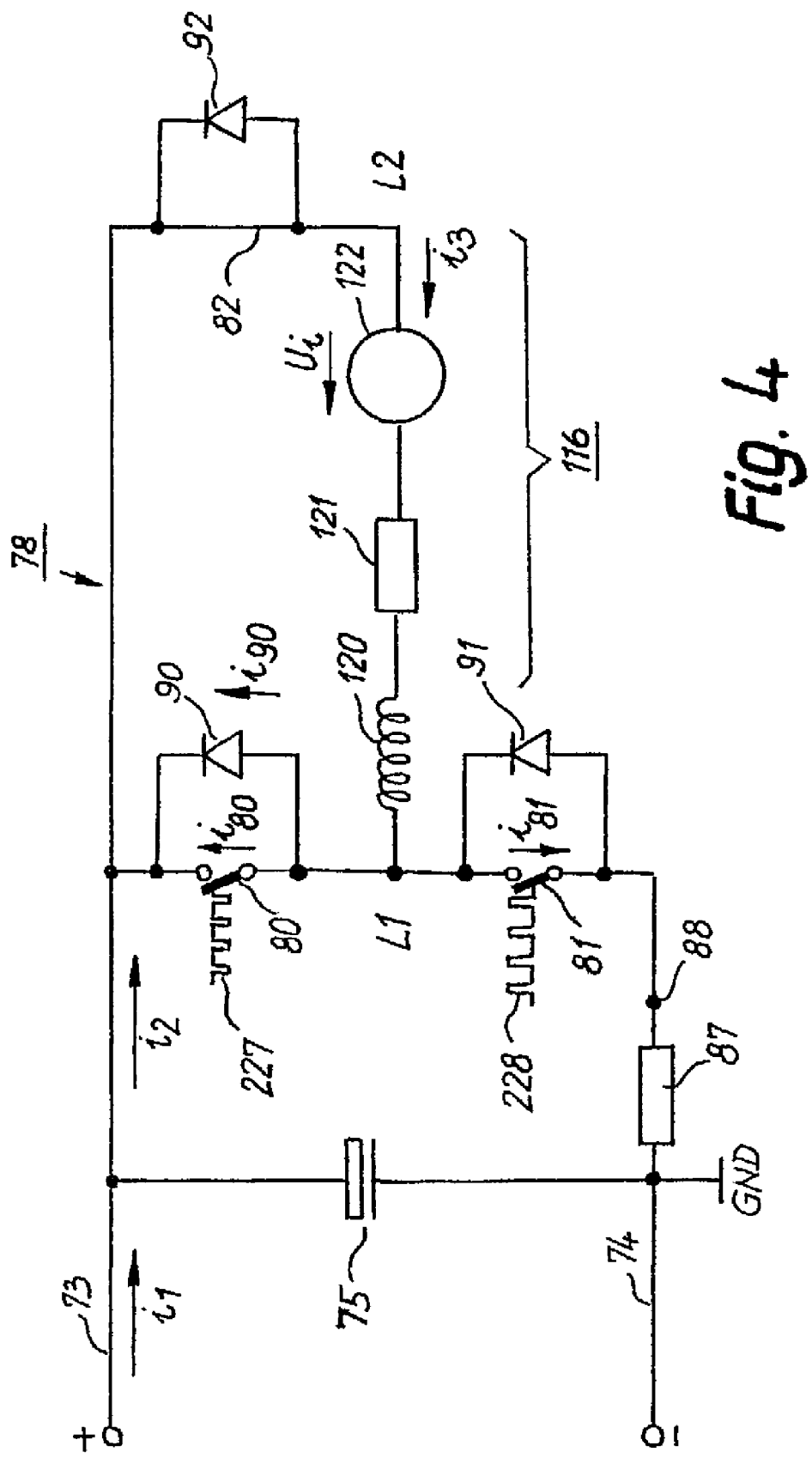
FIG. 4 is an equivalent circuit diagram showing a portion of full bridge circuit 78 of FIG. 2.
Figure 5:
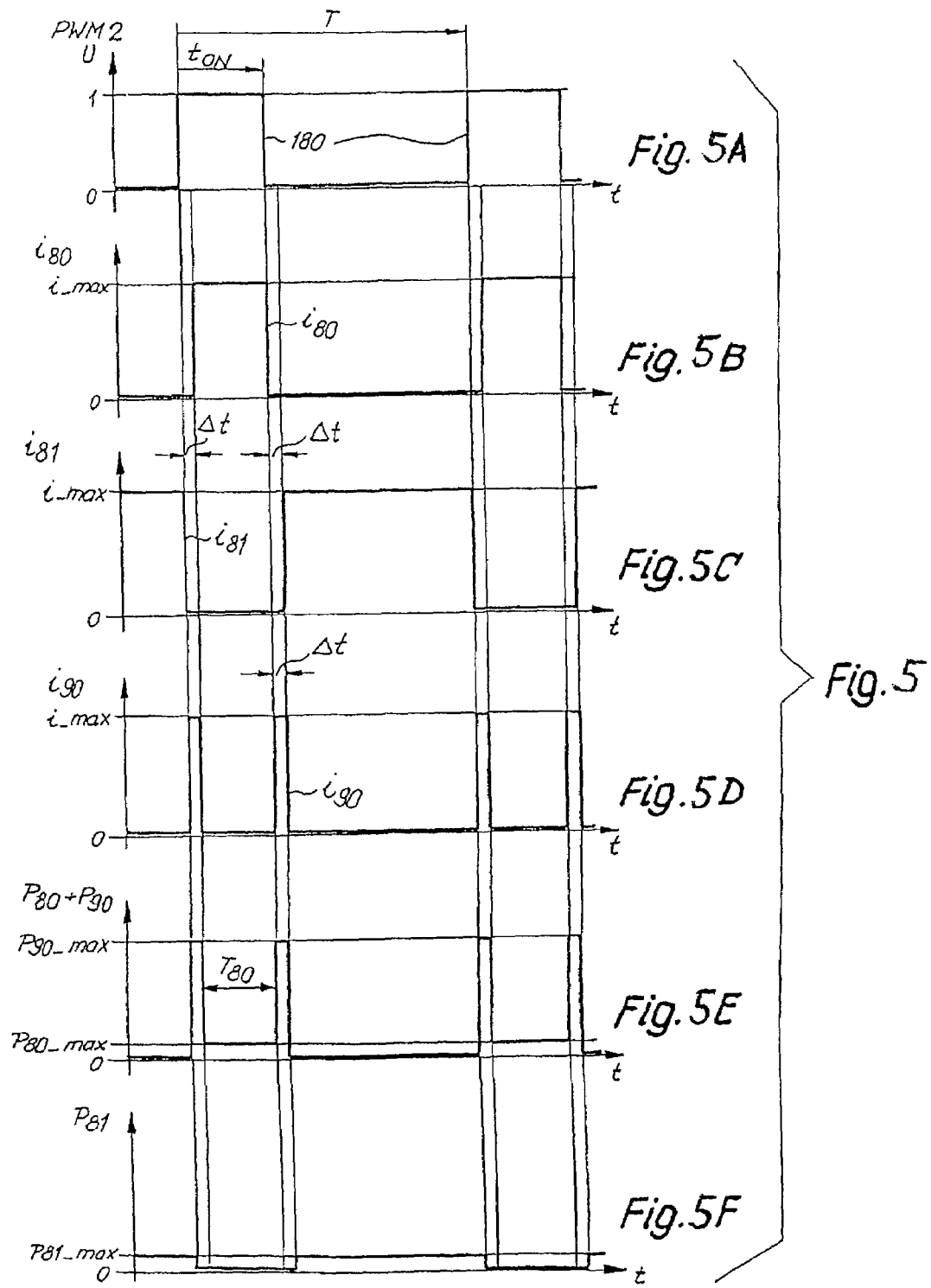
Figure 6:
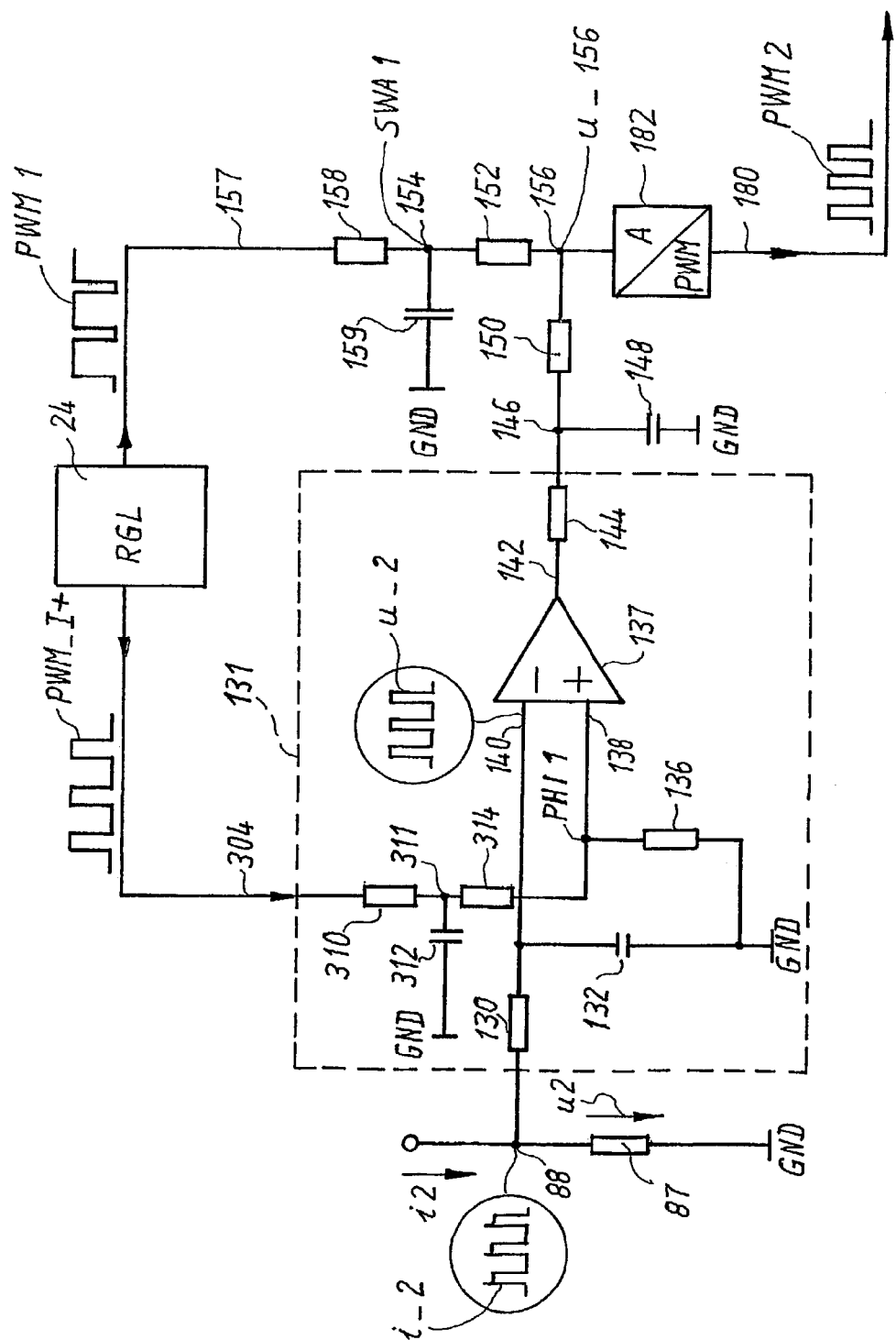
Figure 7:
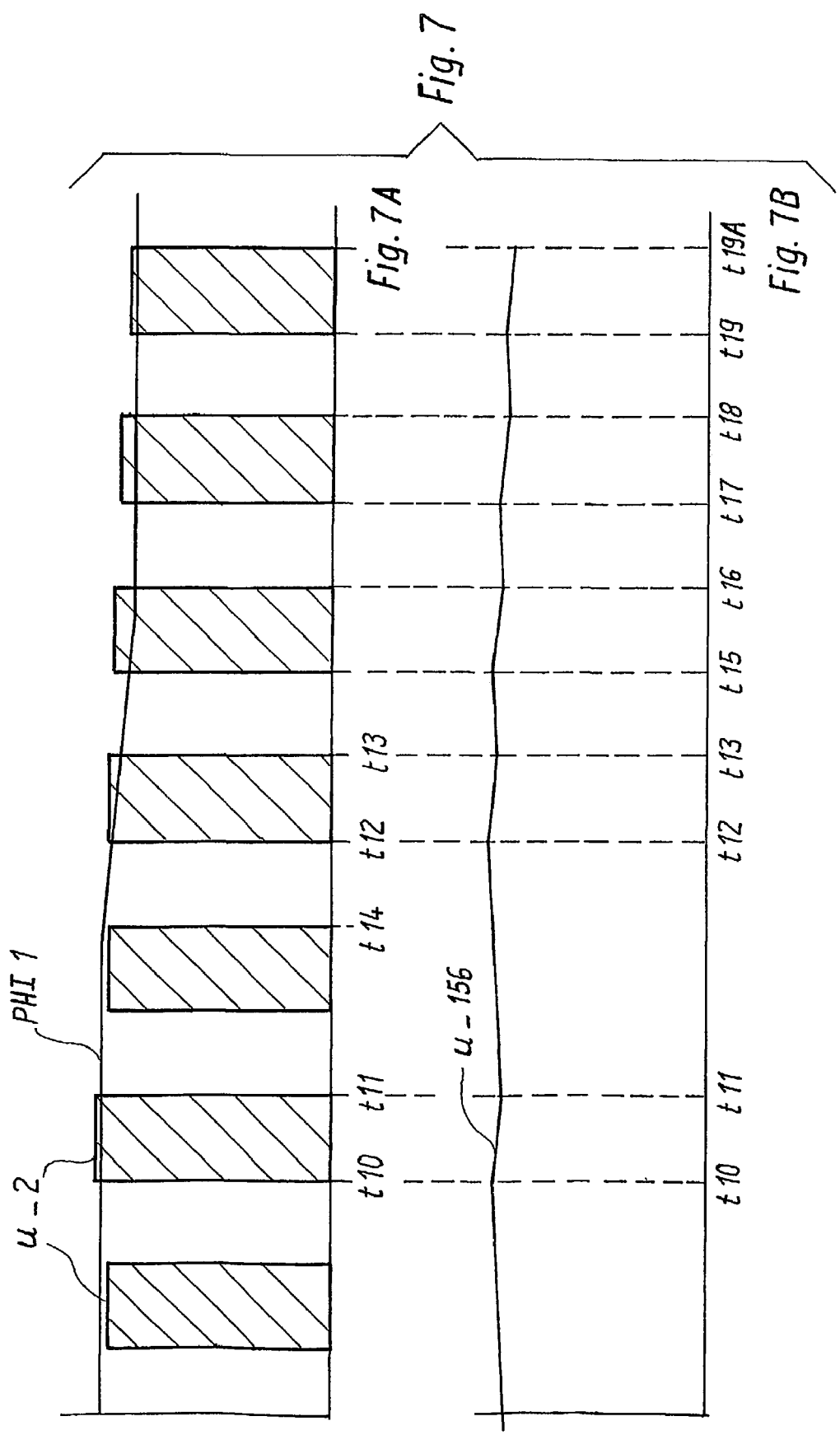
Figure 8:
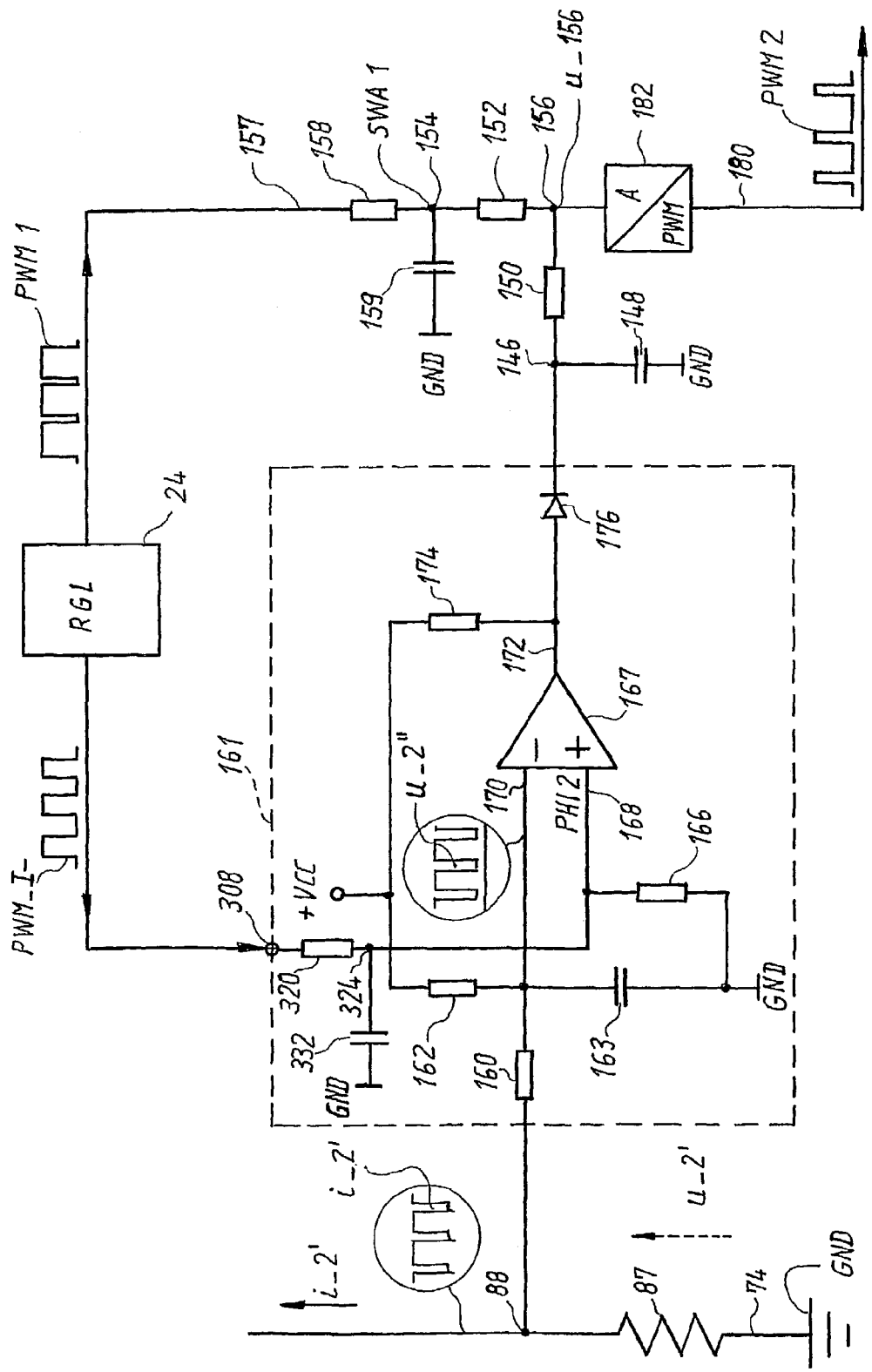
Figure 9:
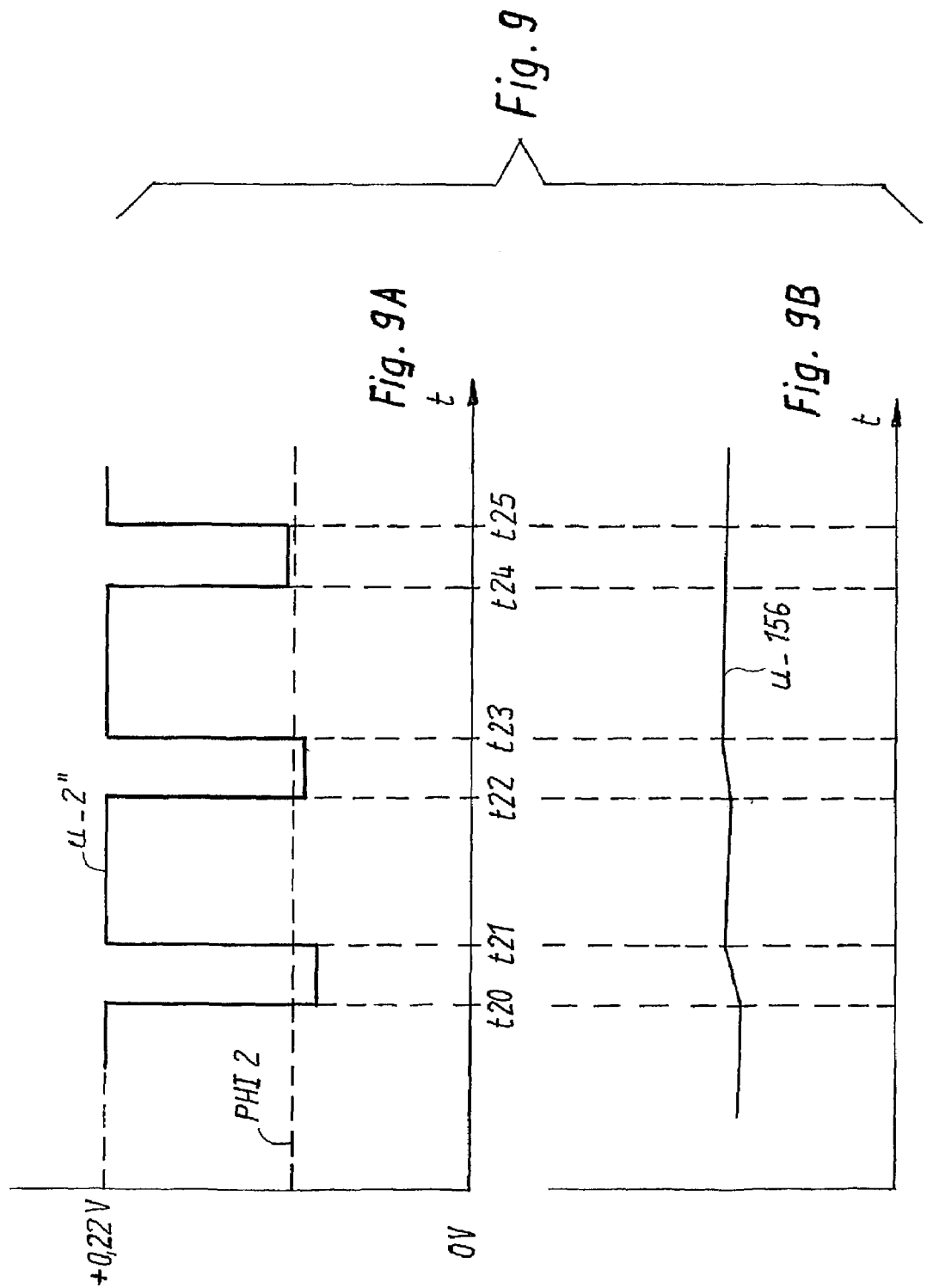
Figure 10:
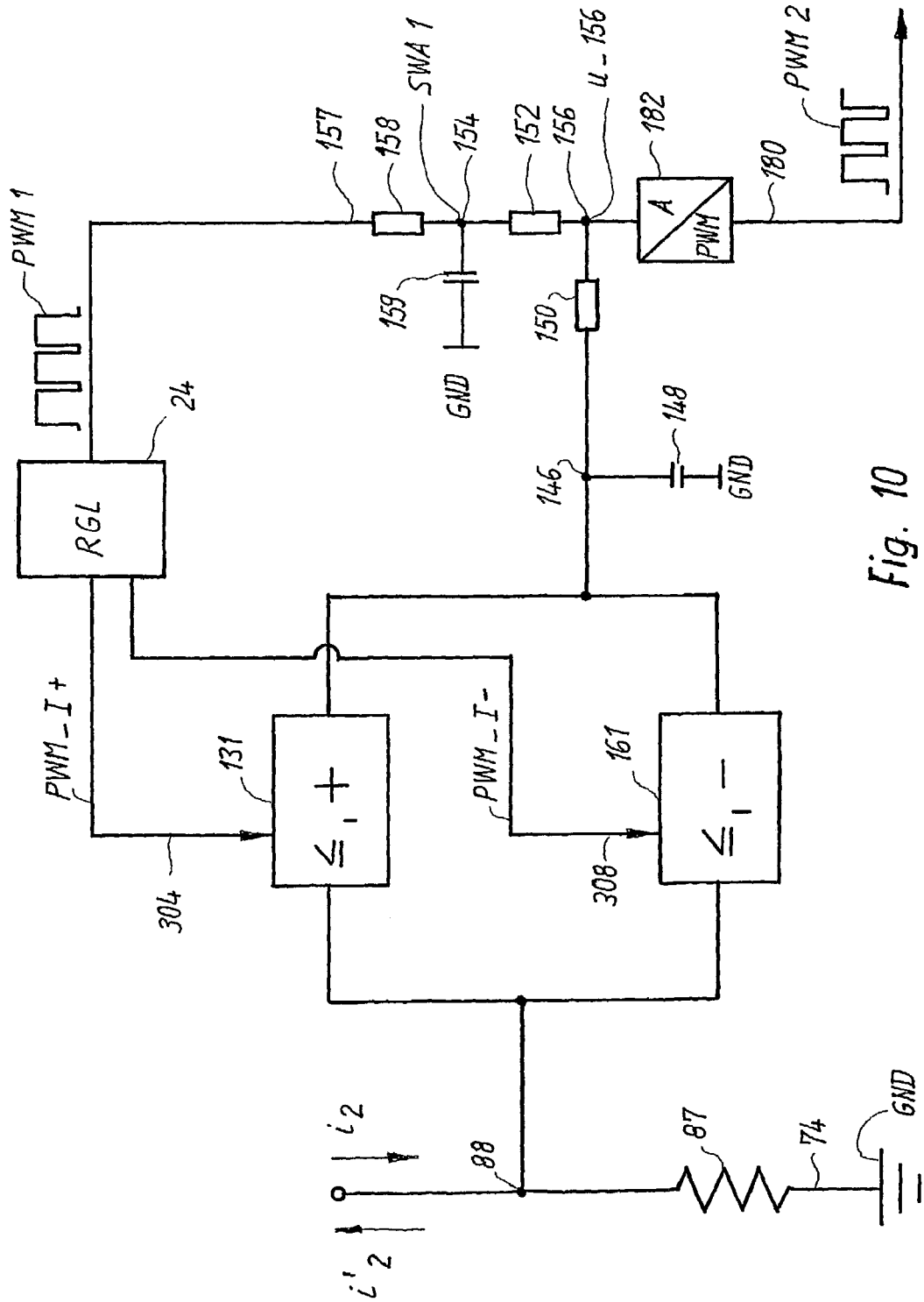
Figure 11:
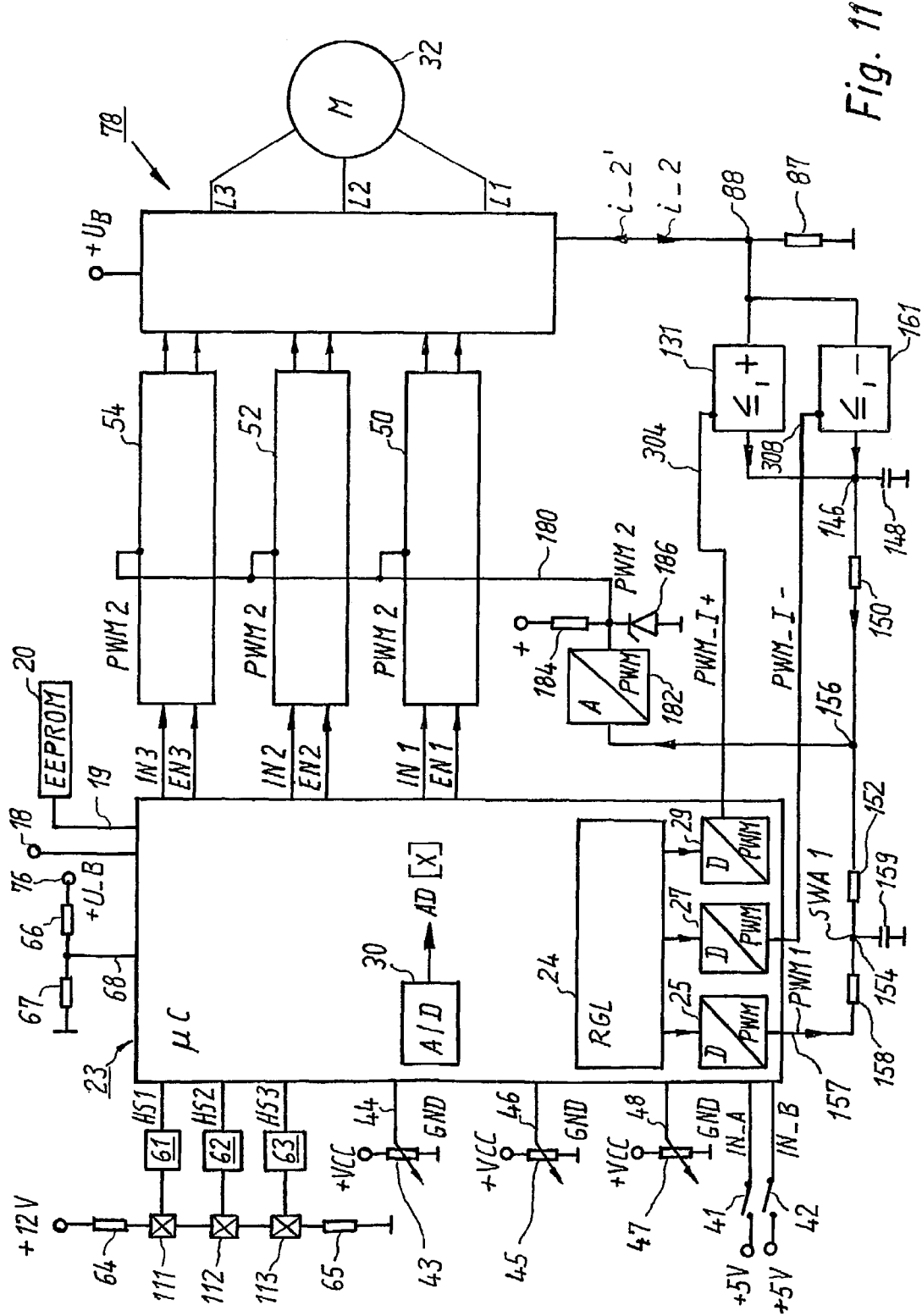
Figure 12:
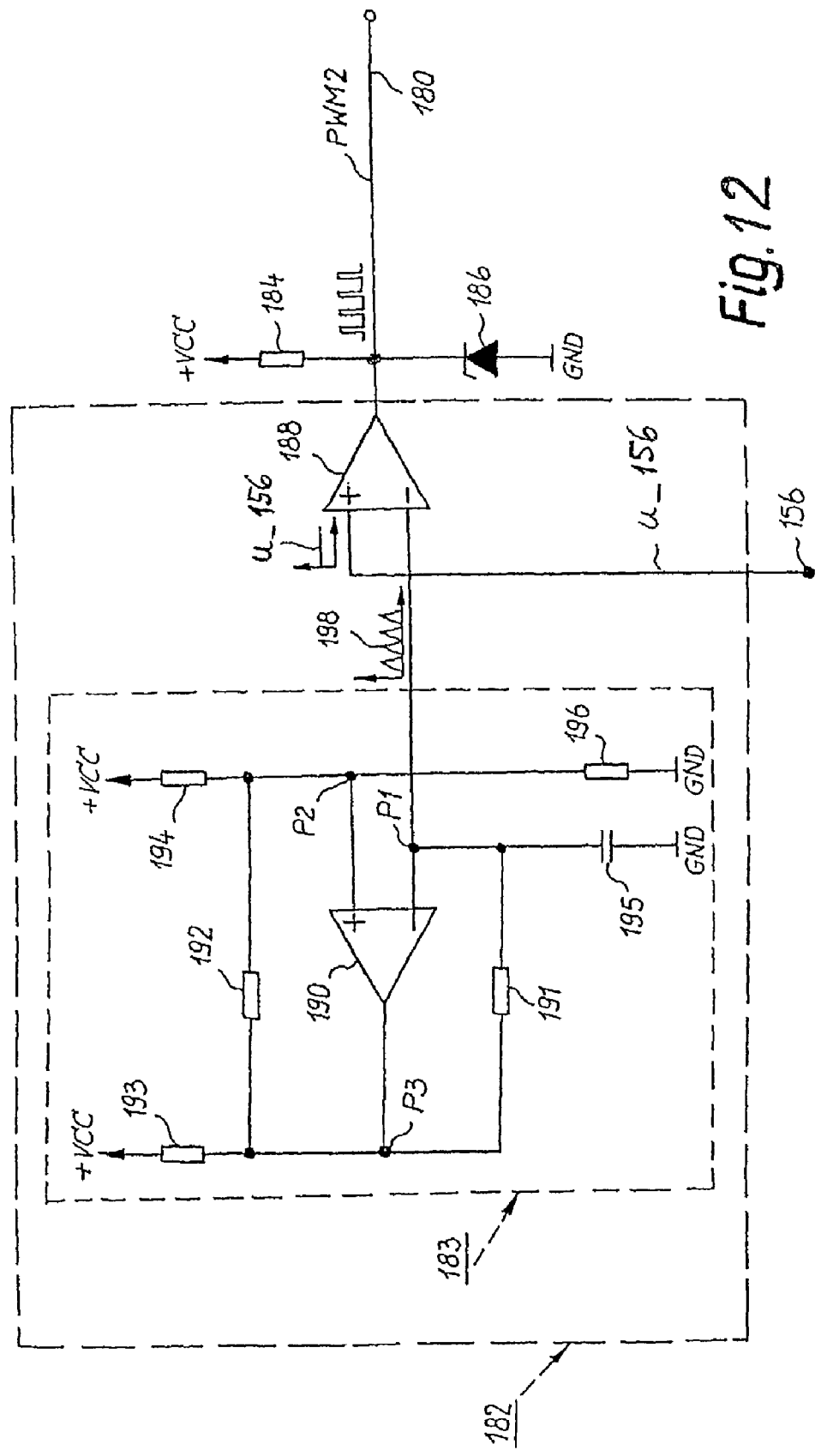
Figure 13:
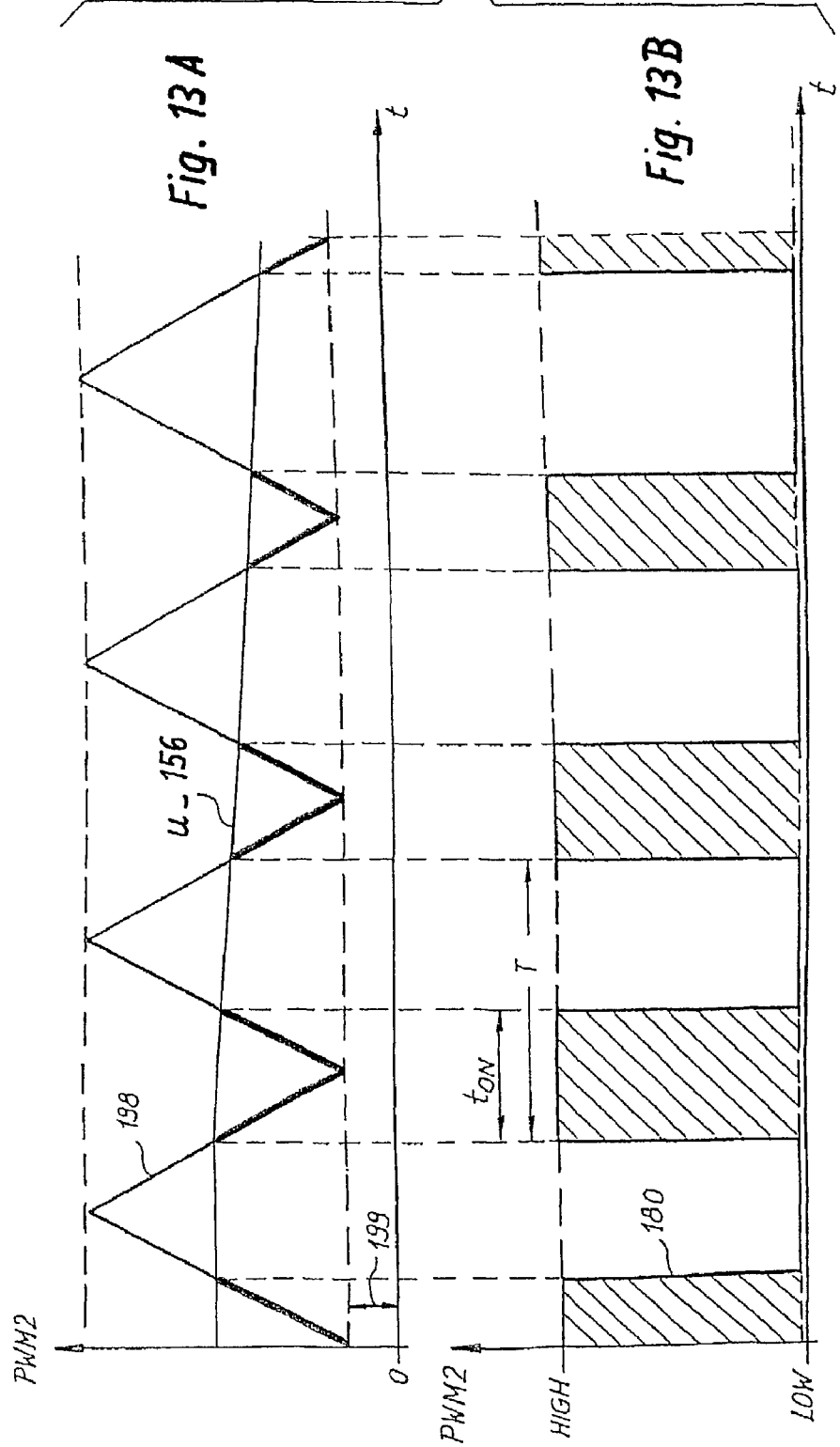
Figure 14:
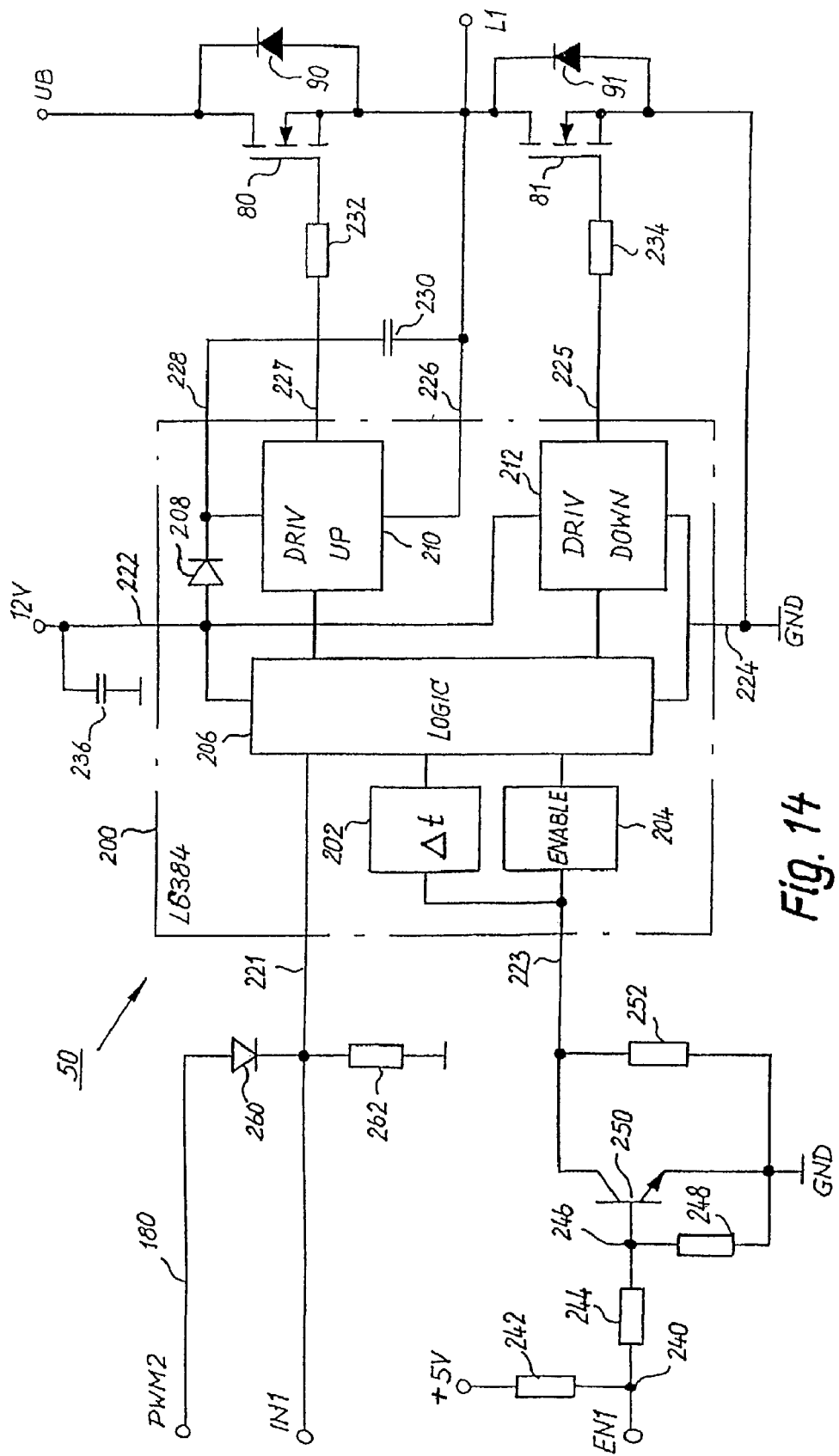
Figure 15:
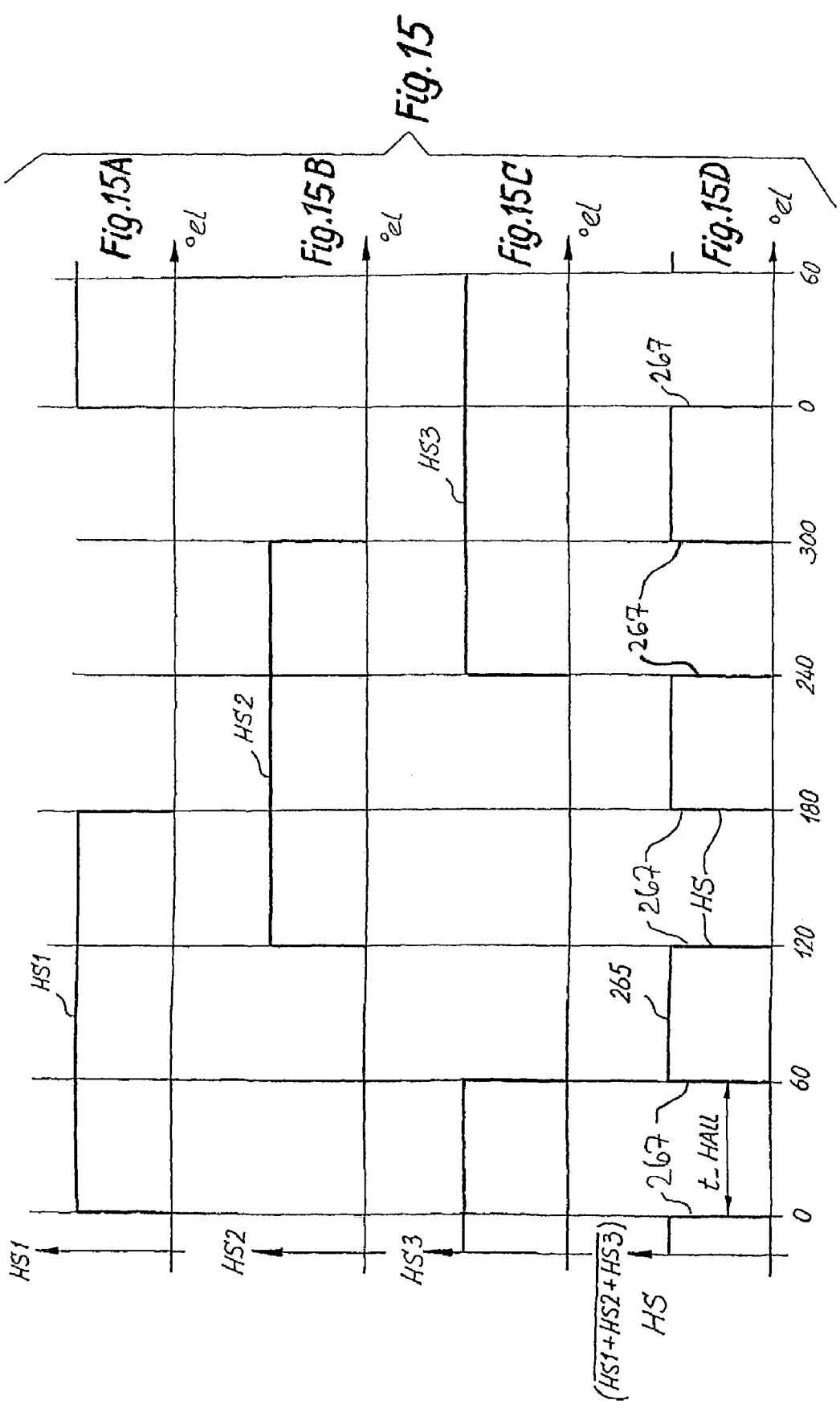
Figure 16:
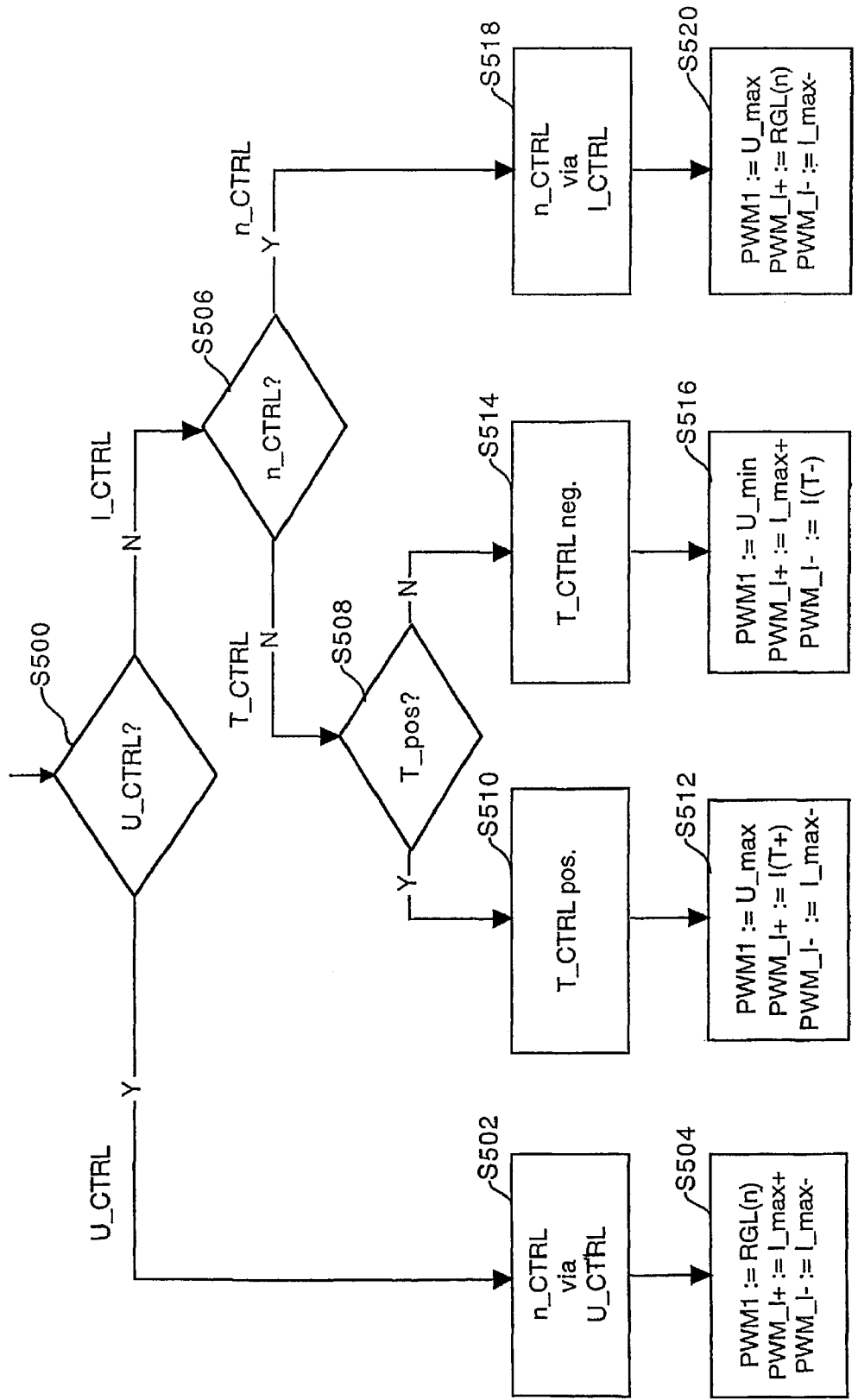
Figure 17:
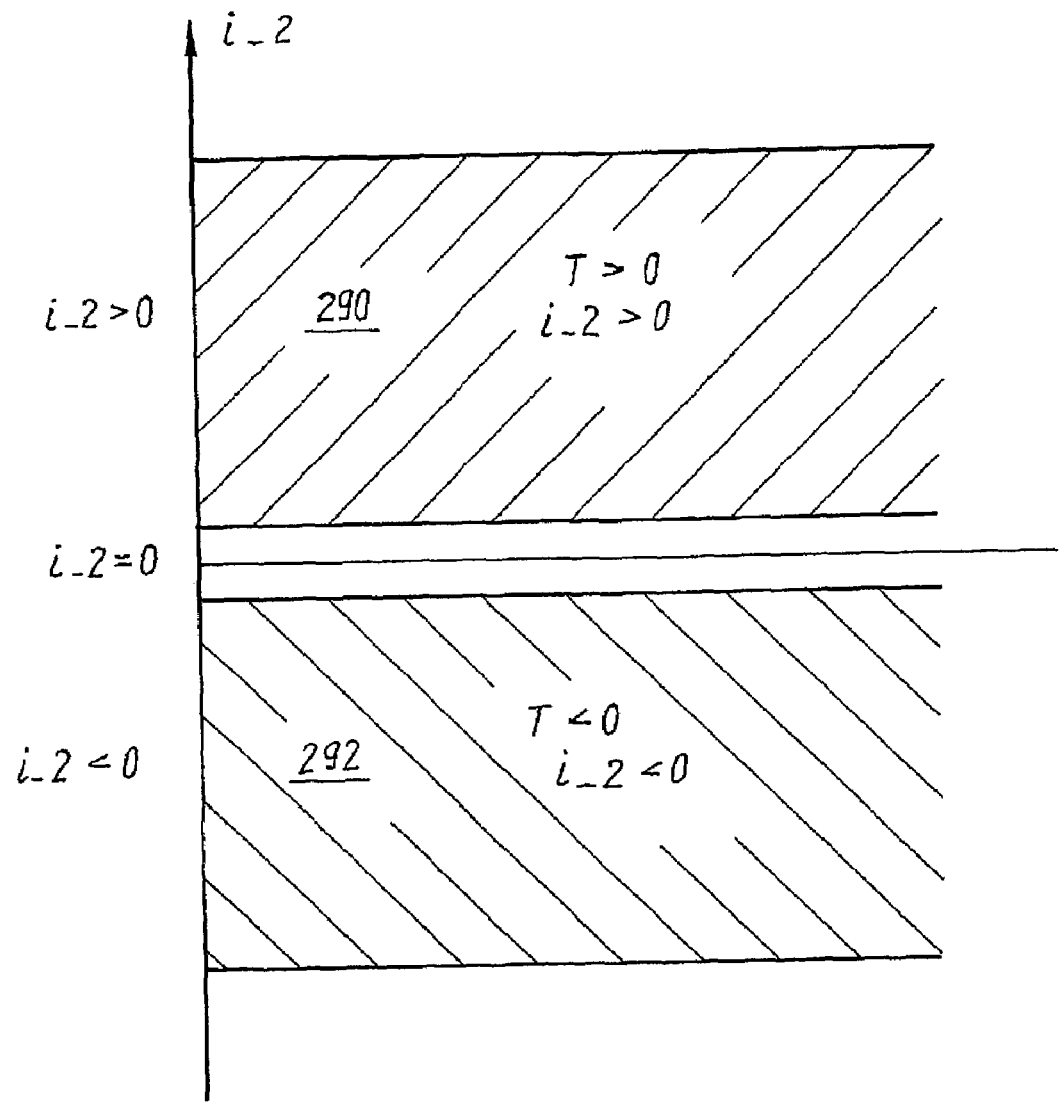
Figure 18:
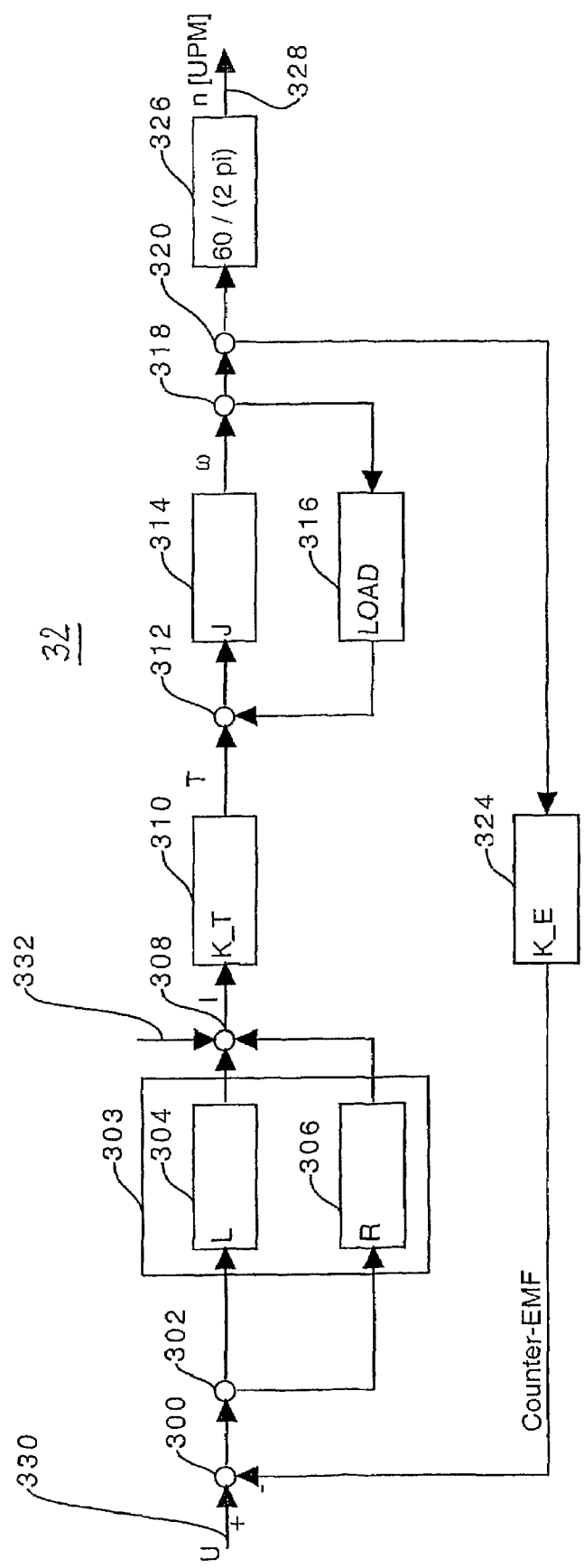
Figure 19:
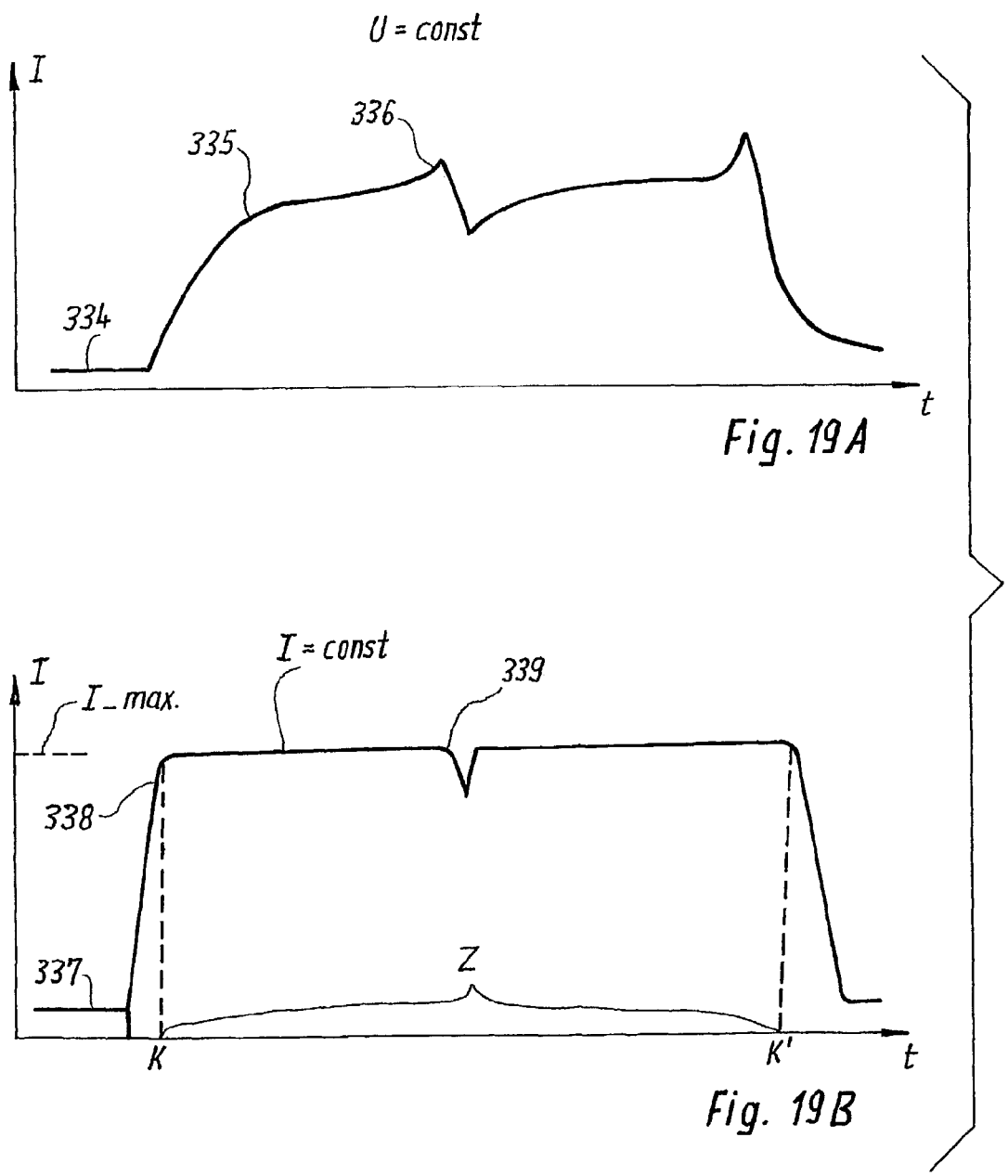
Figure 20:
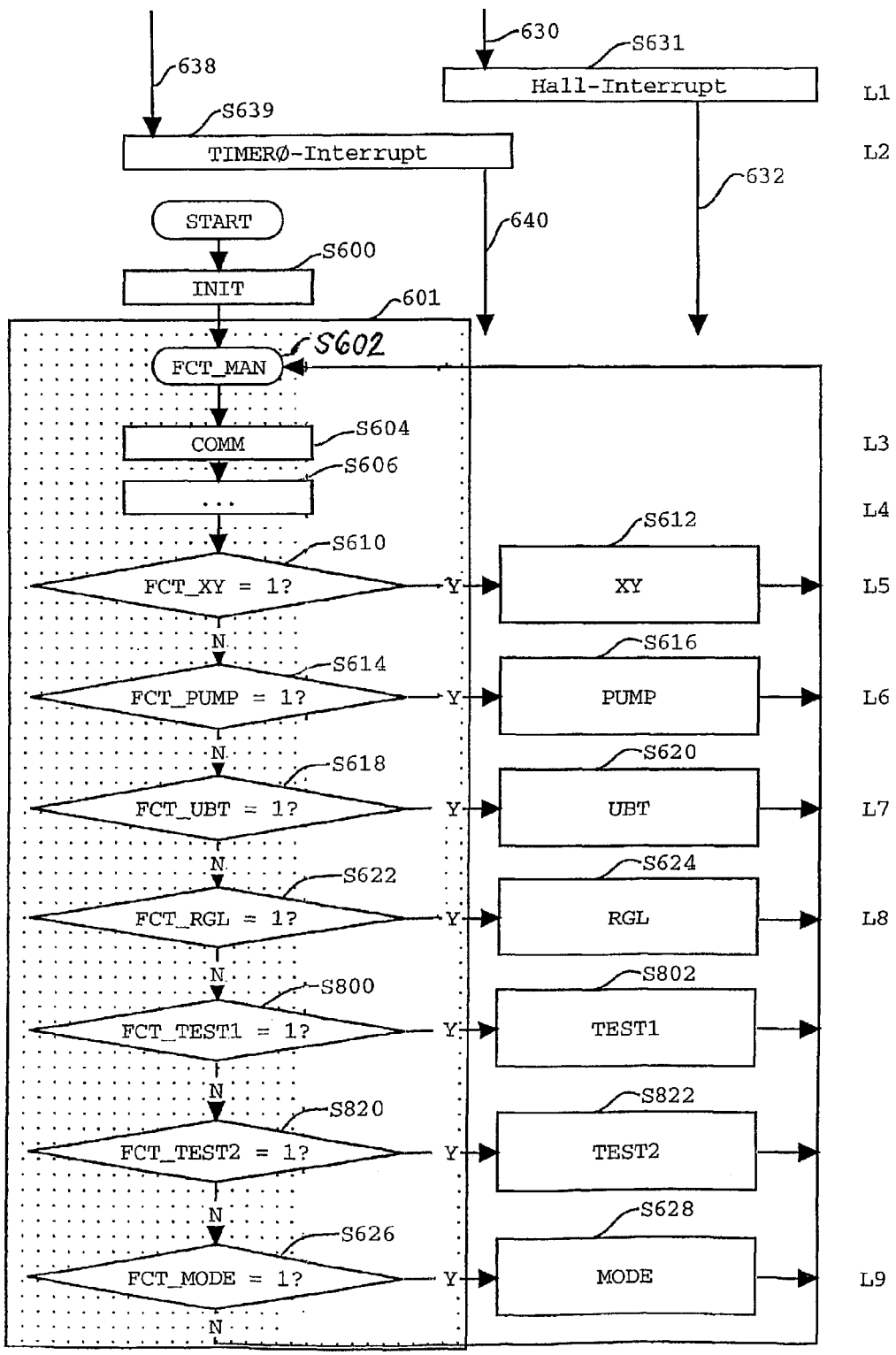
Figure 21:
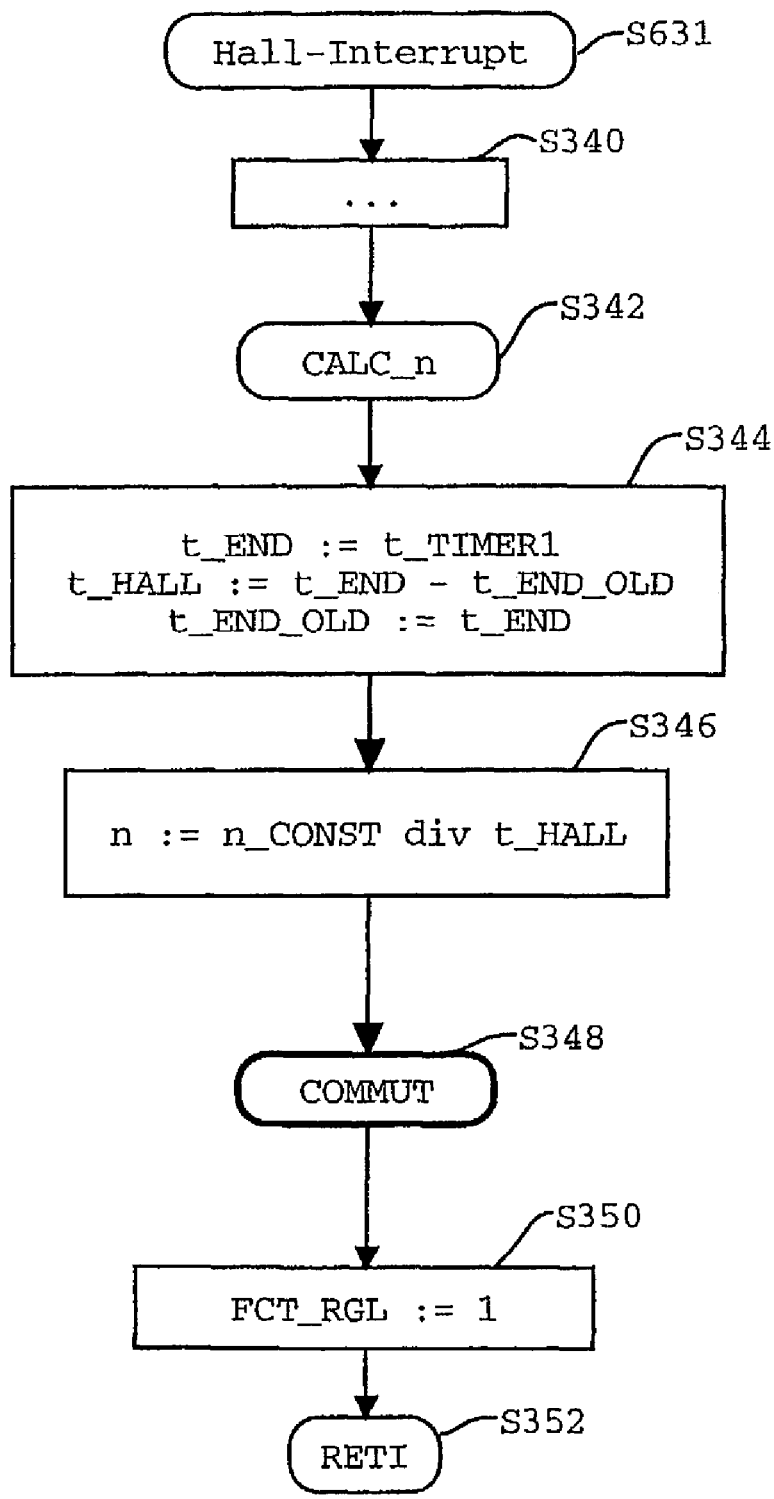
Figure 22:
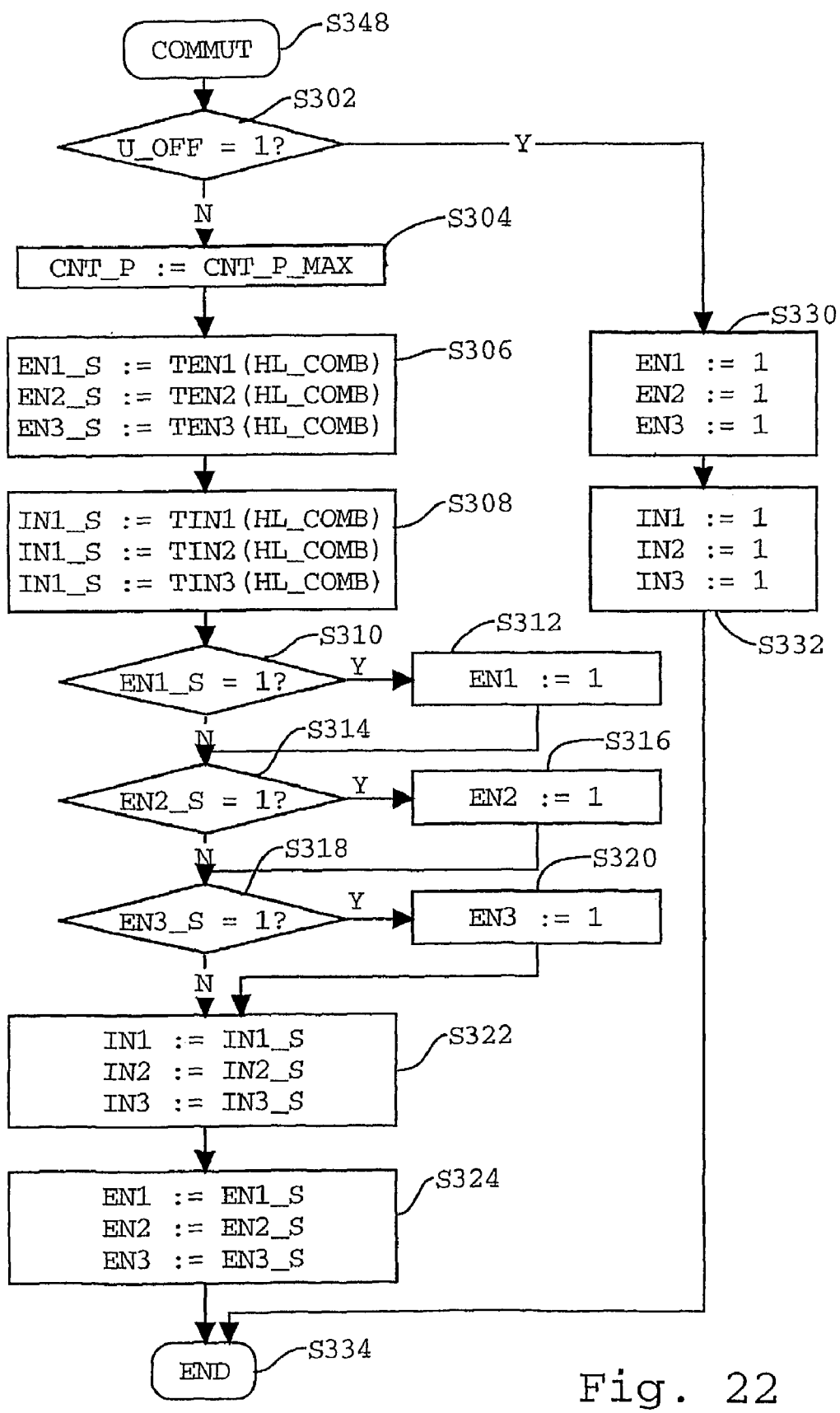
Figure 23:
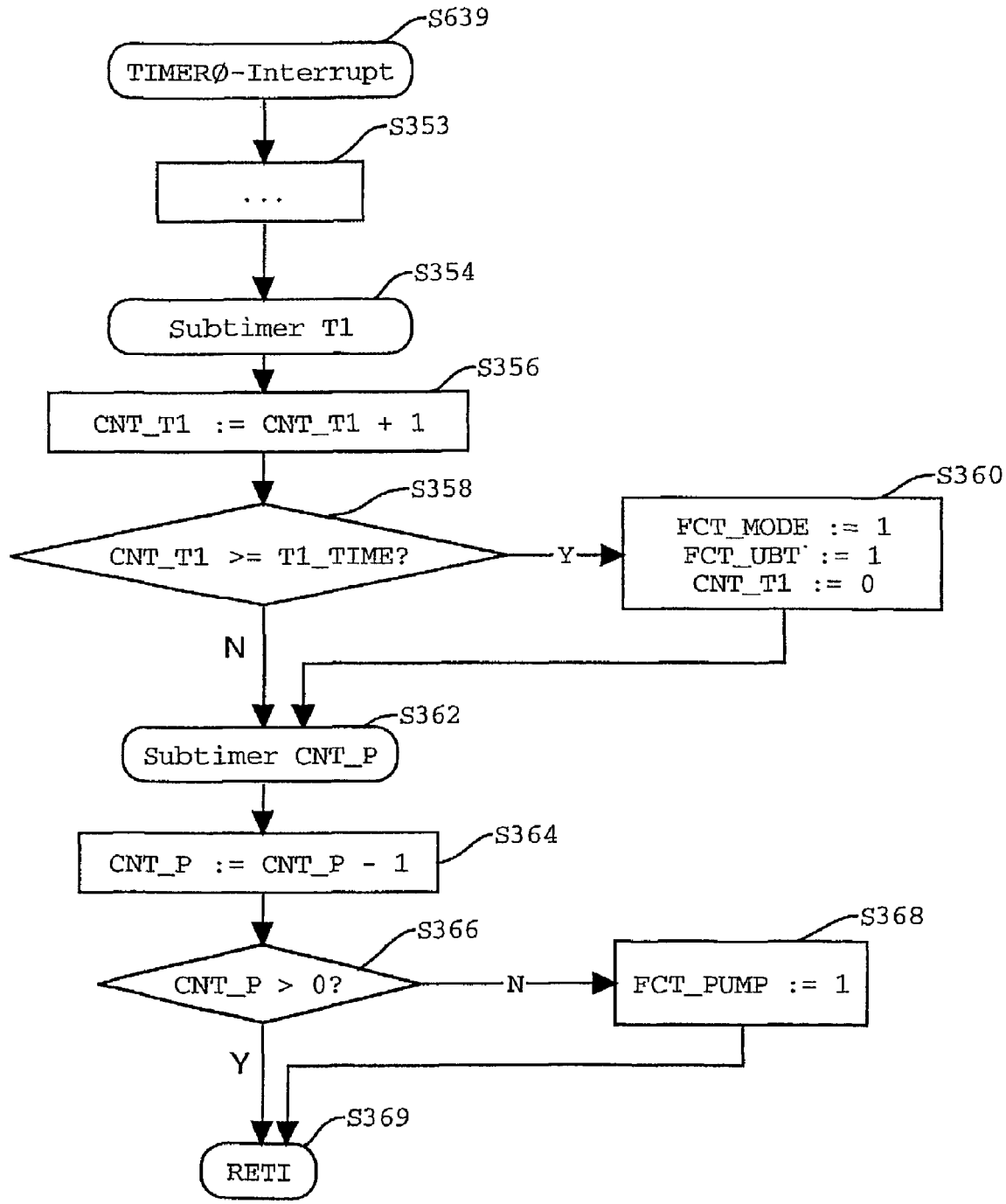
Figure 24:
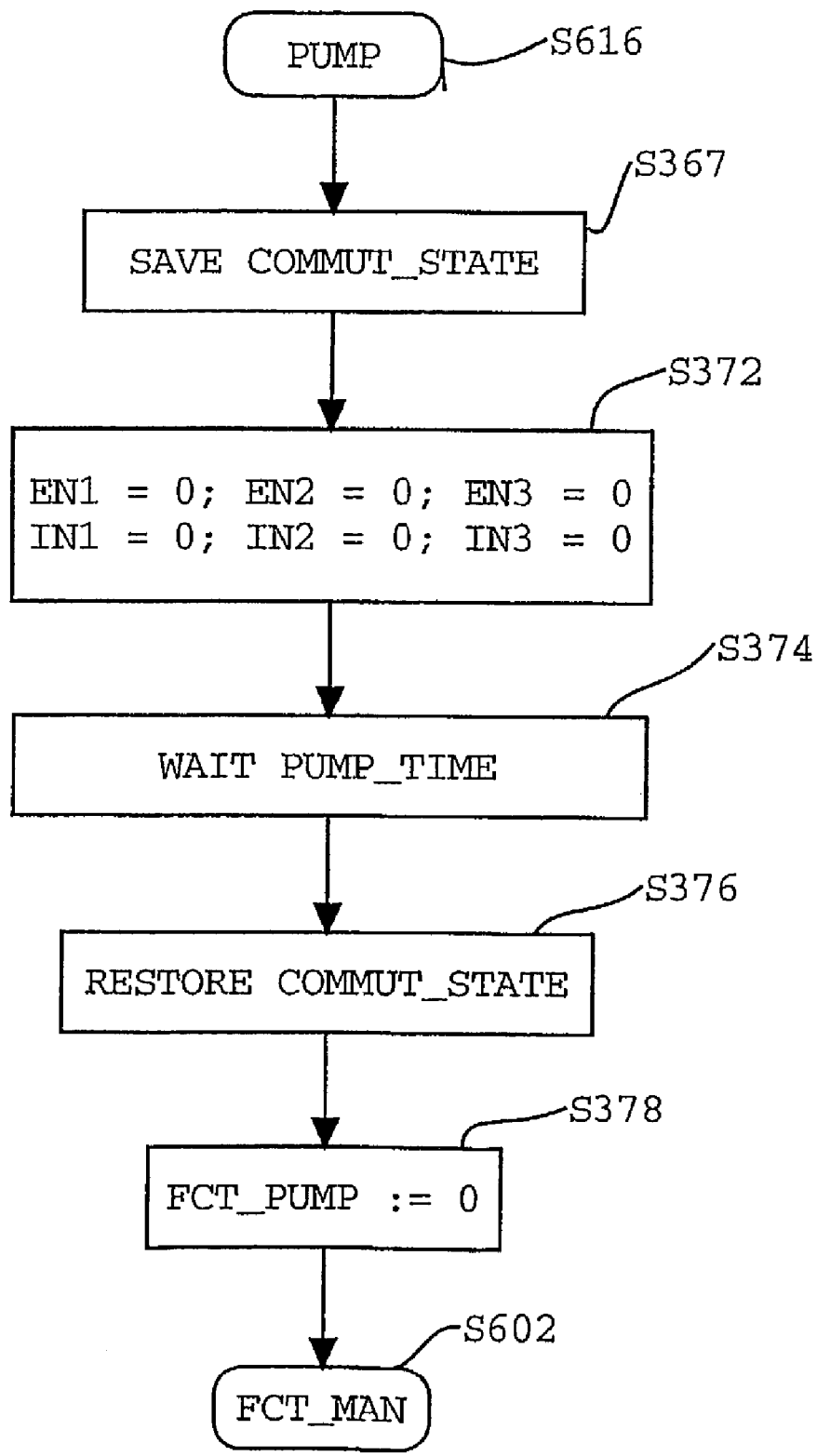
Figure 25:
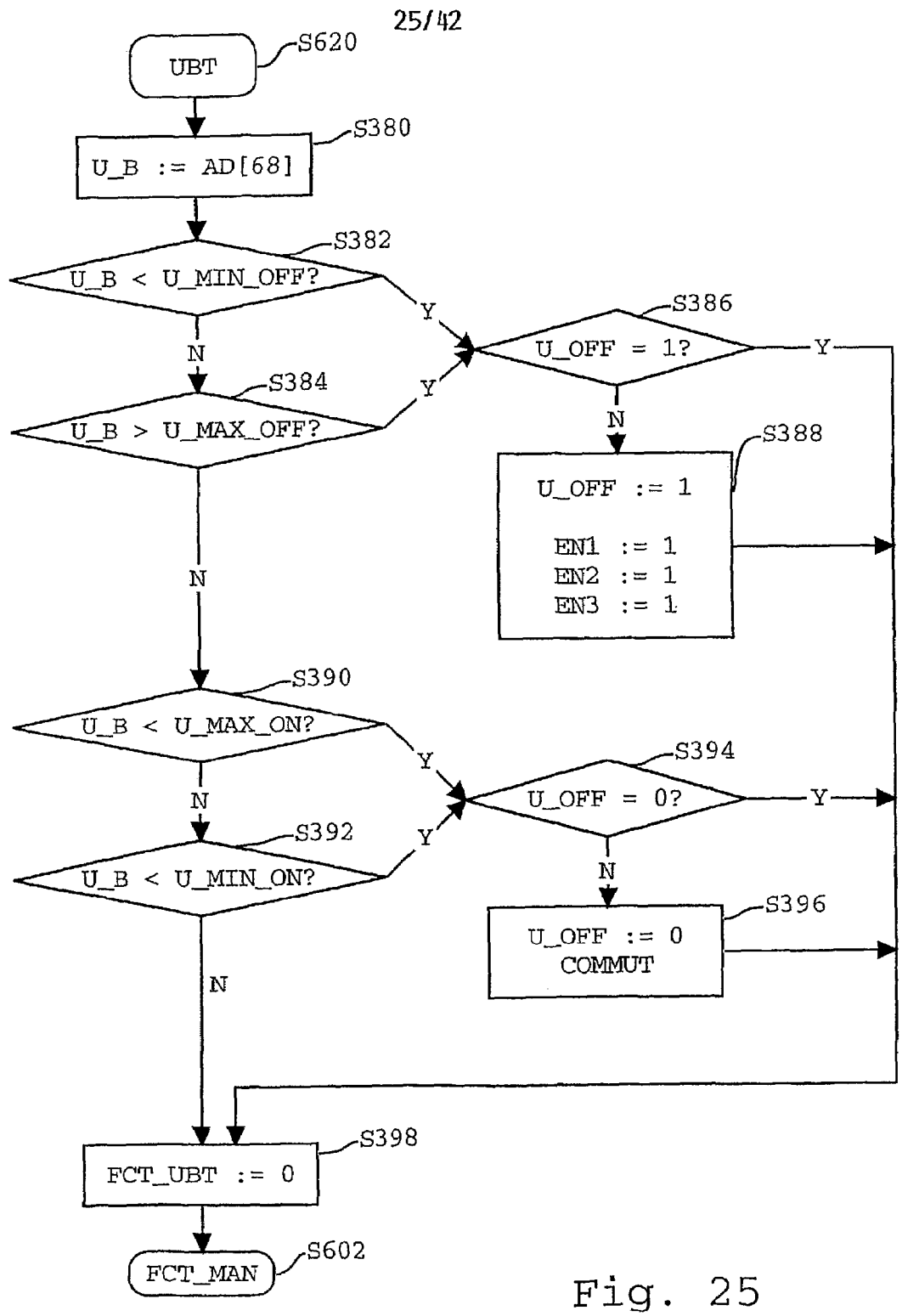
Figure 26:
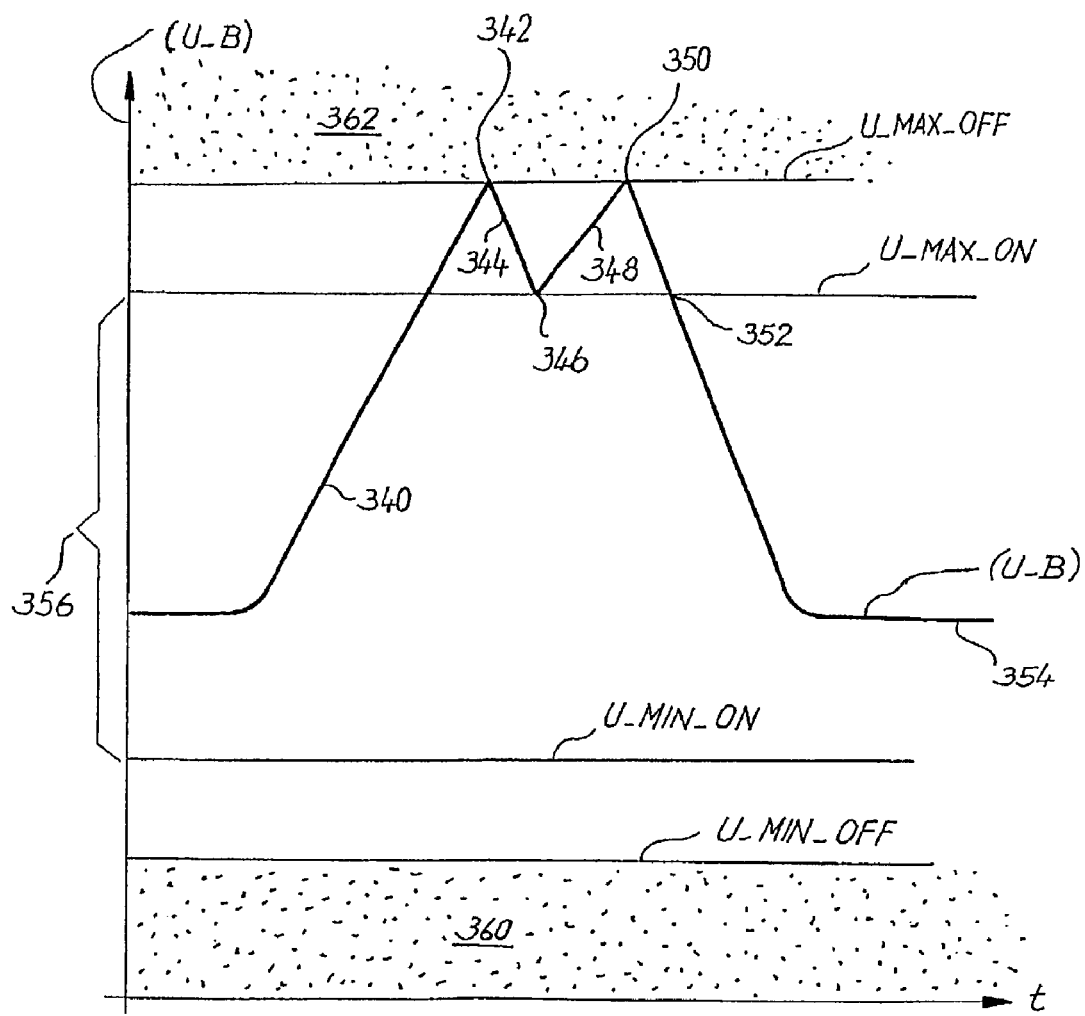
Figure 27:
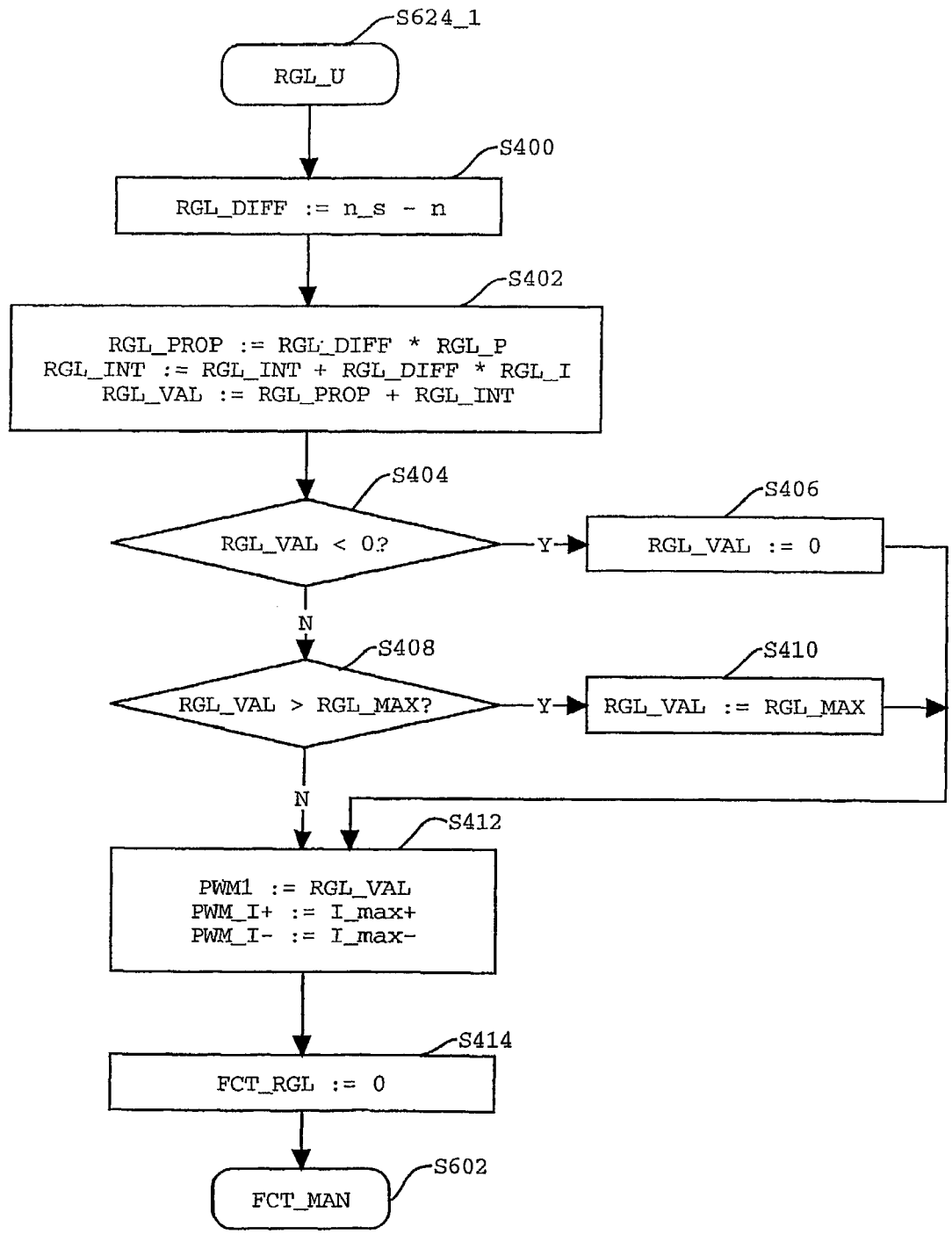
Figure 28:
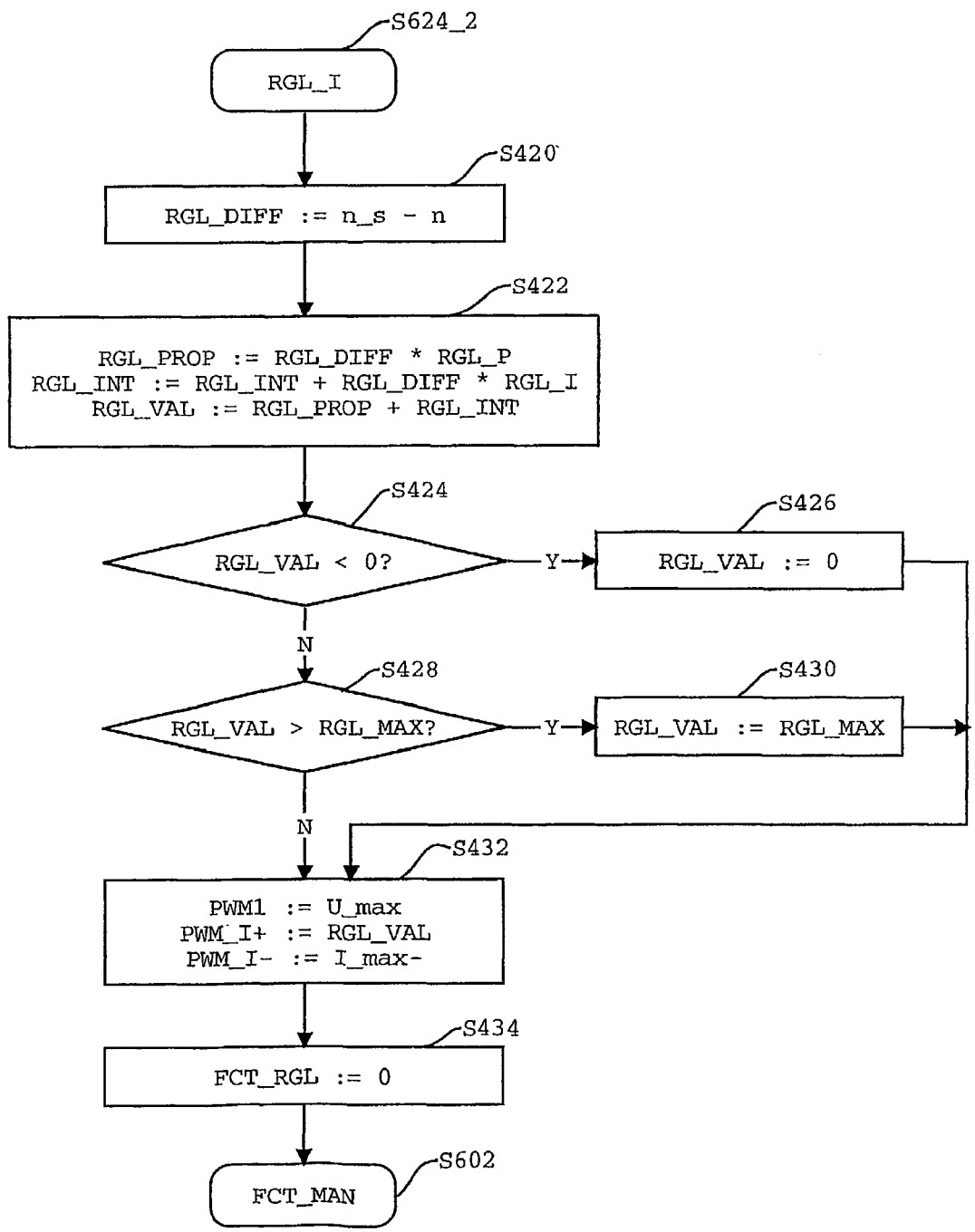
Figure 29:
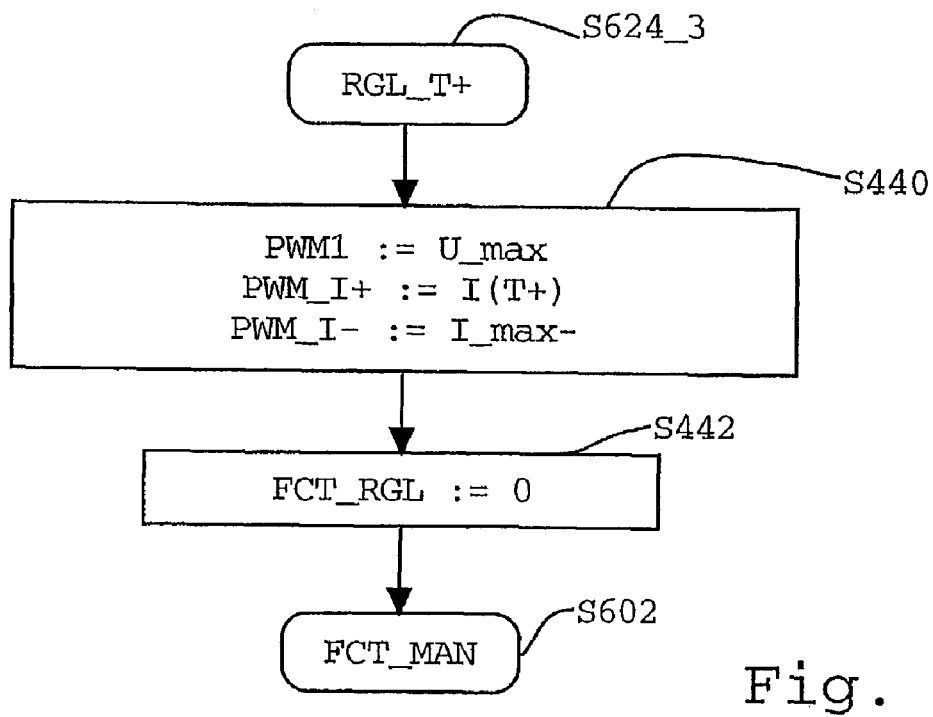
Figure 30:
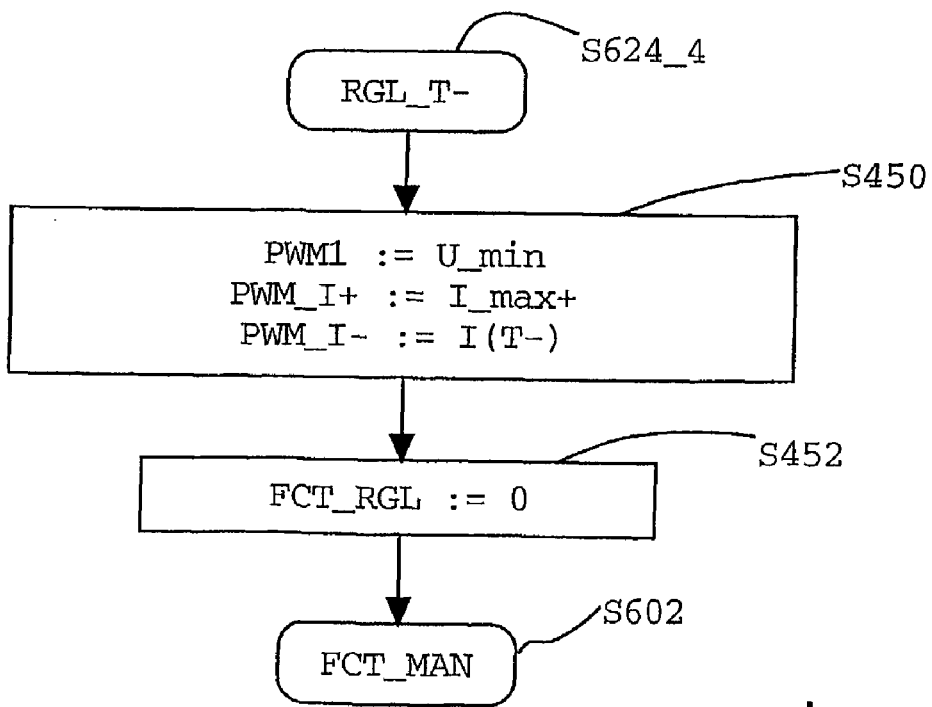
Figure 31:
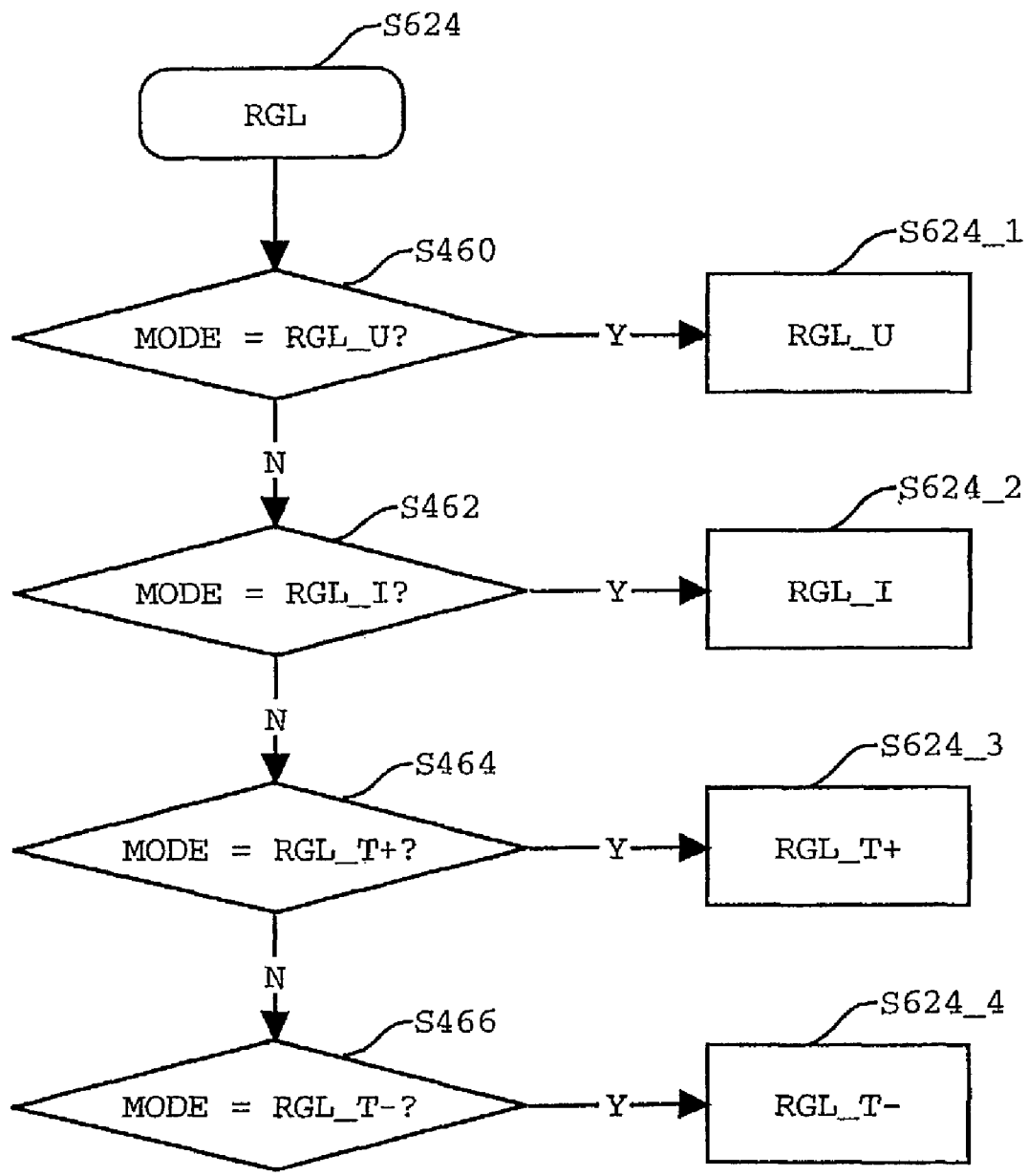
Figure 32:
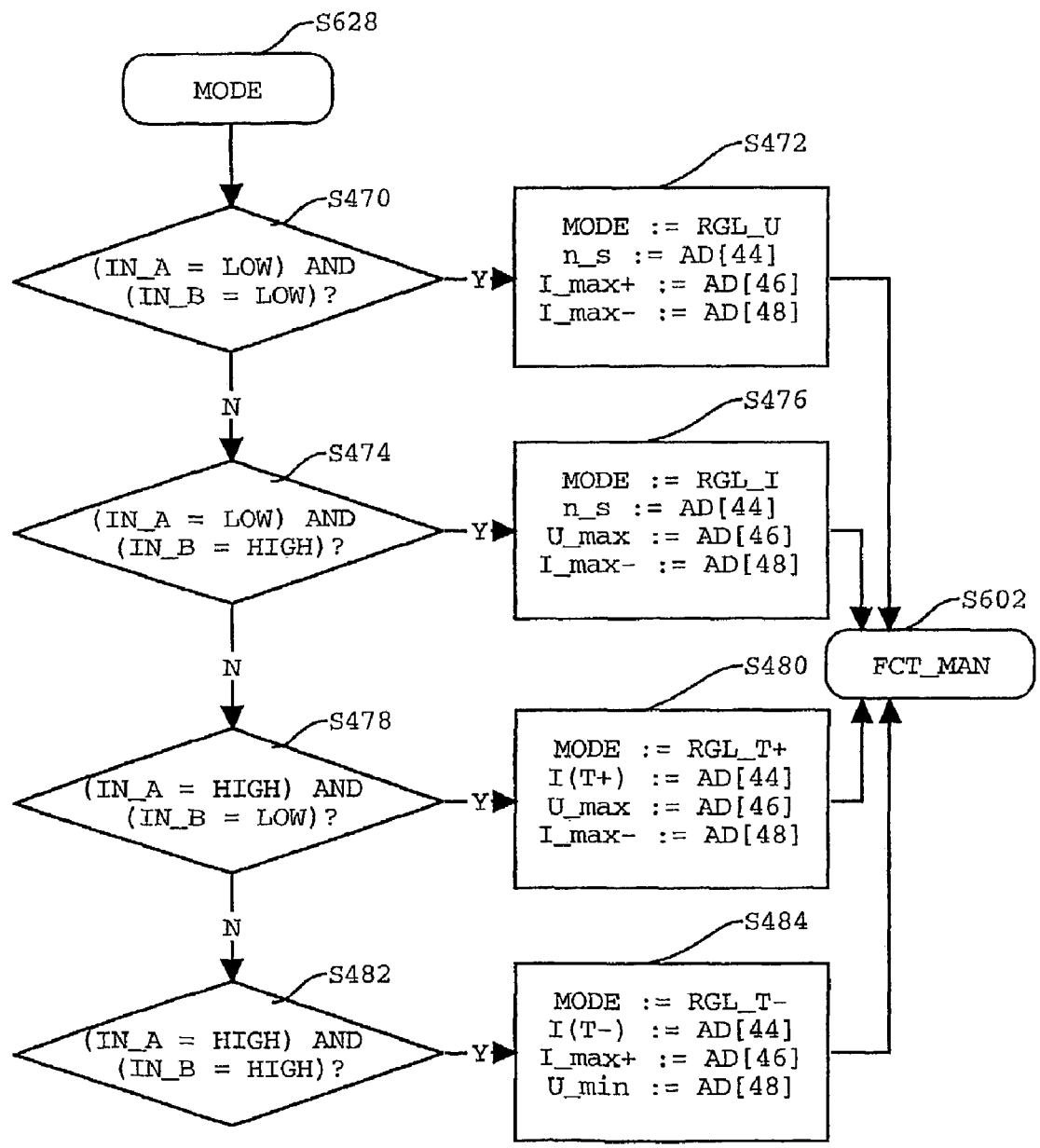
Figure 33:
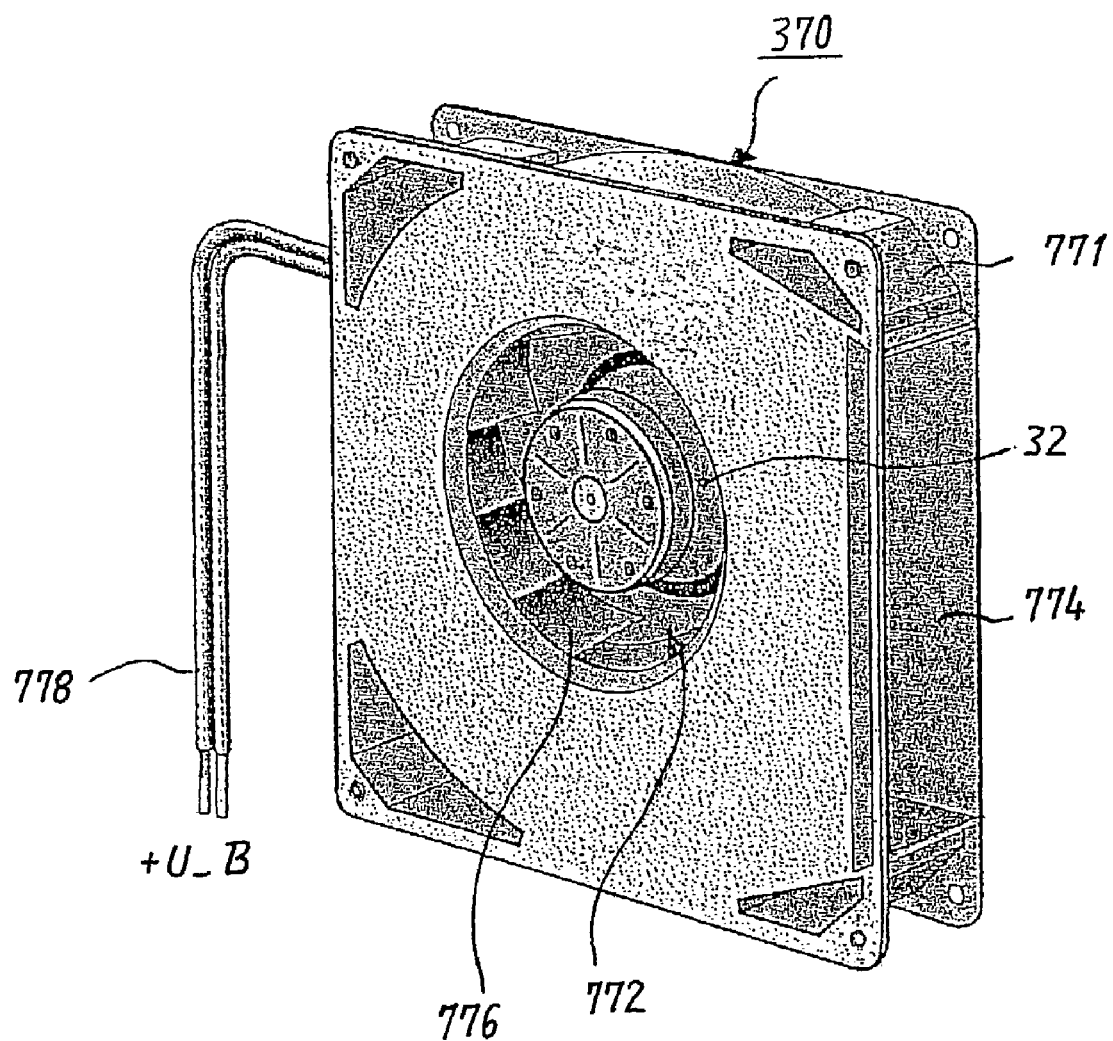
Figure 34:
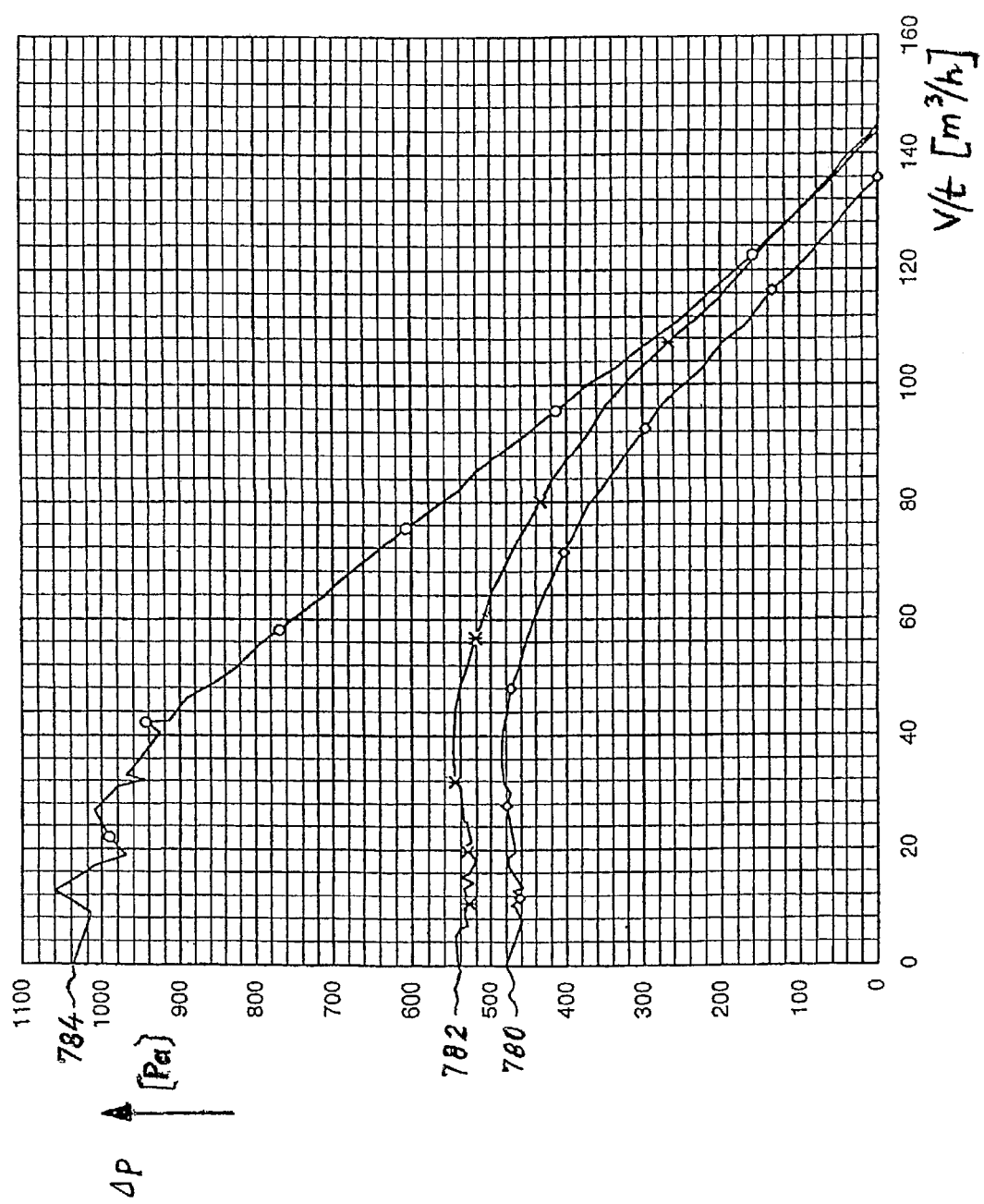
Figure 35:
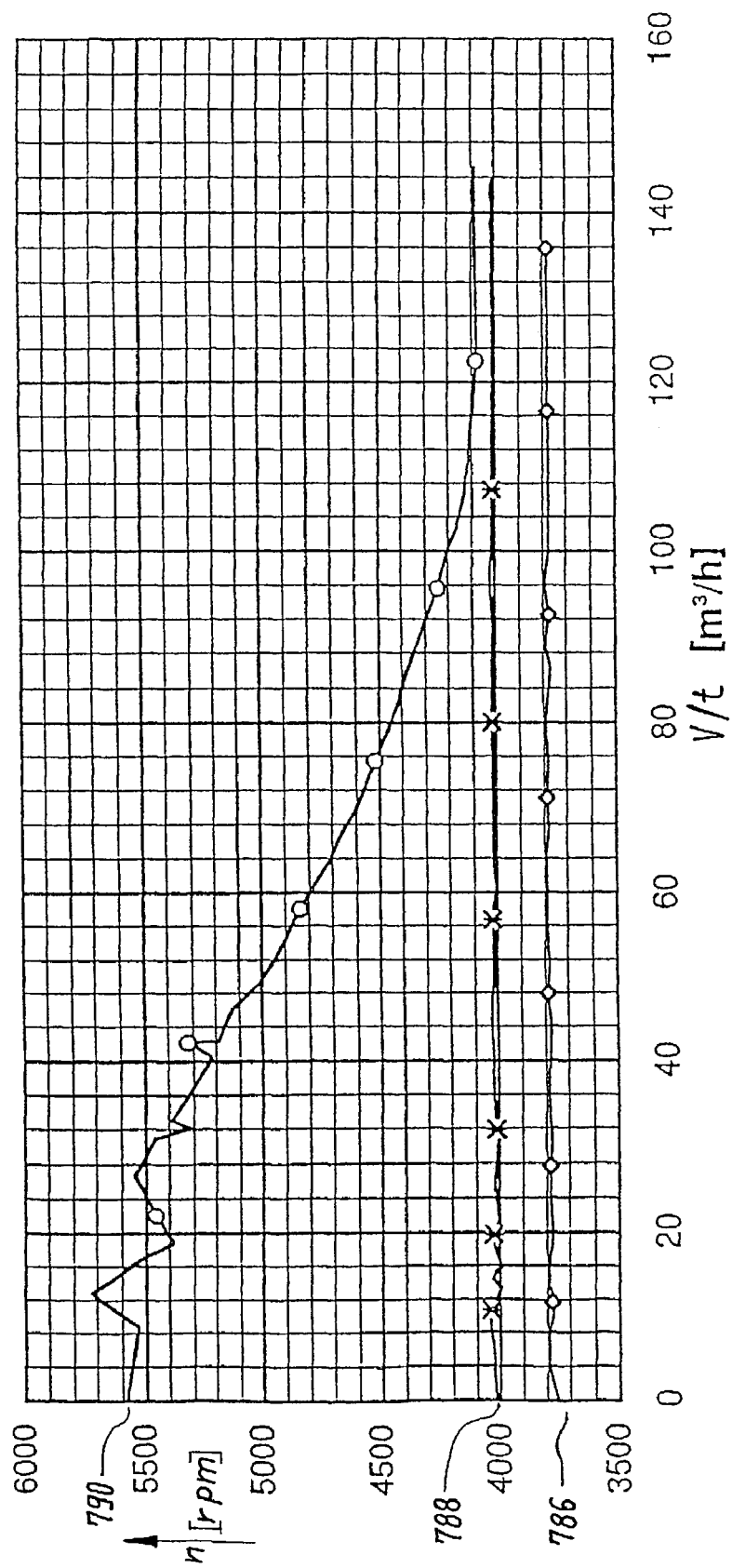
Figure 36:
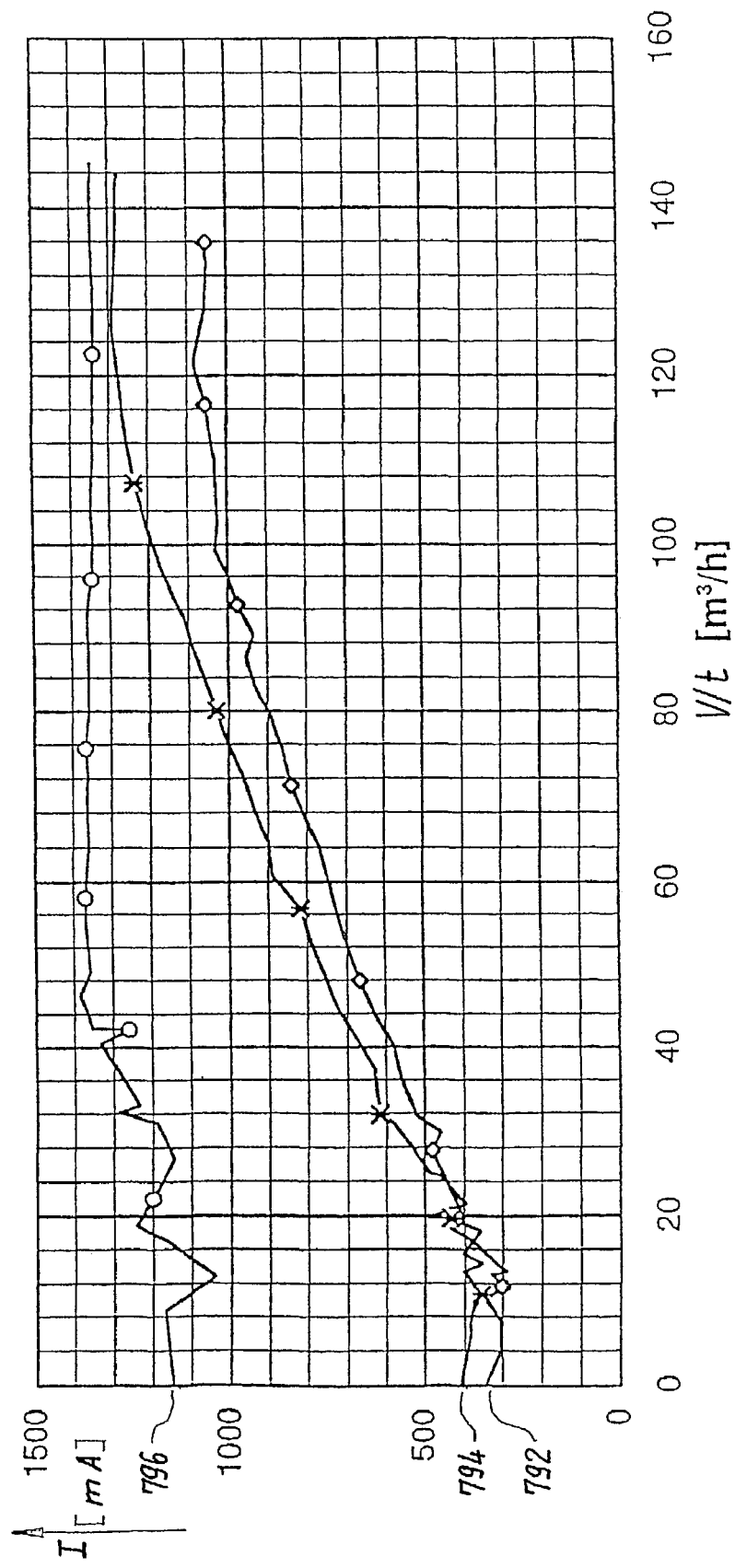
Figure 37:
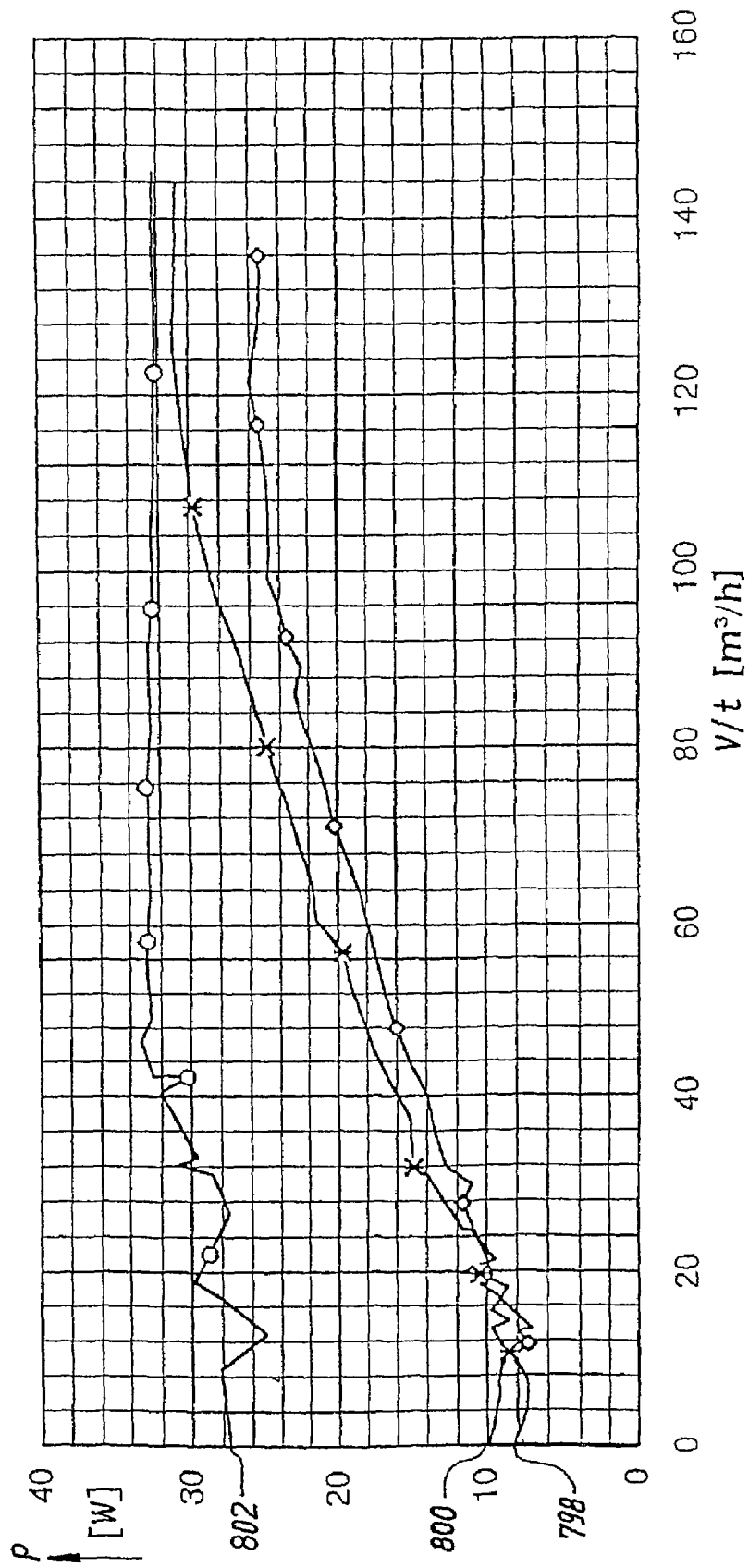
Figure 38:
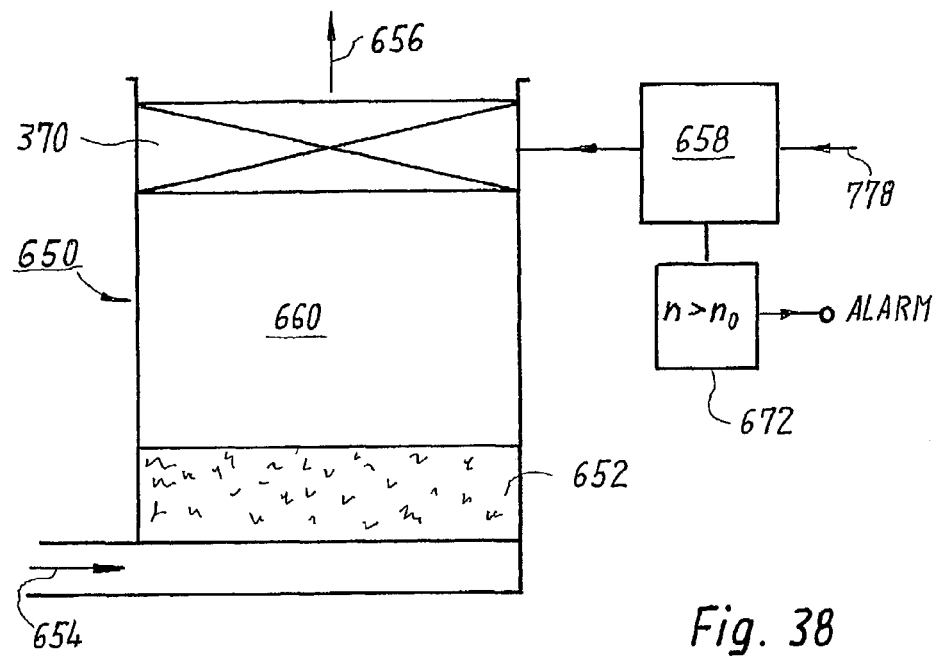
Figure 39:
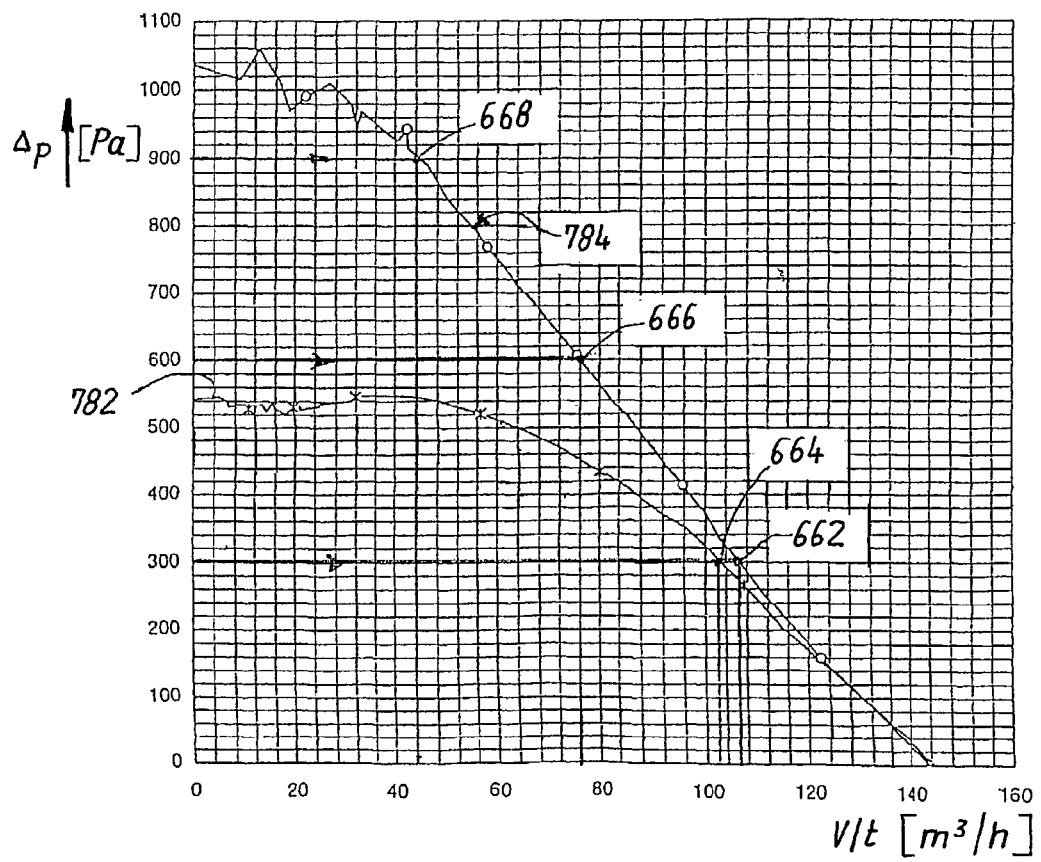
Figure 40:
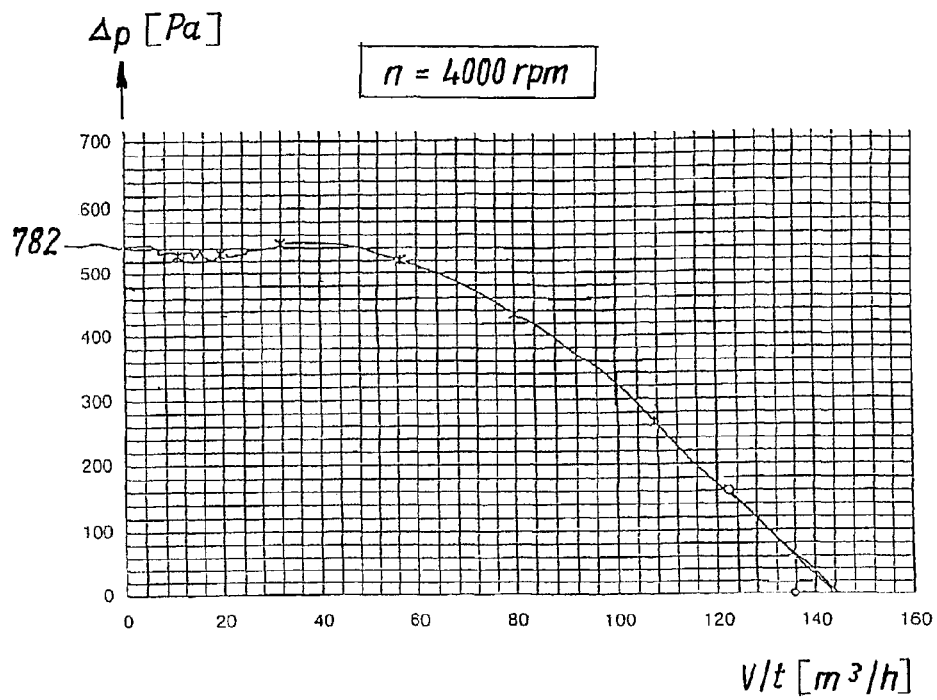
Figure 41:
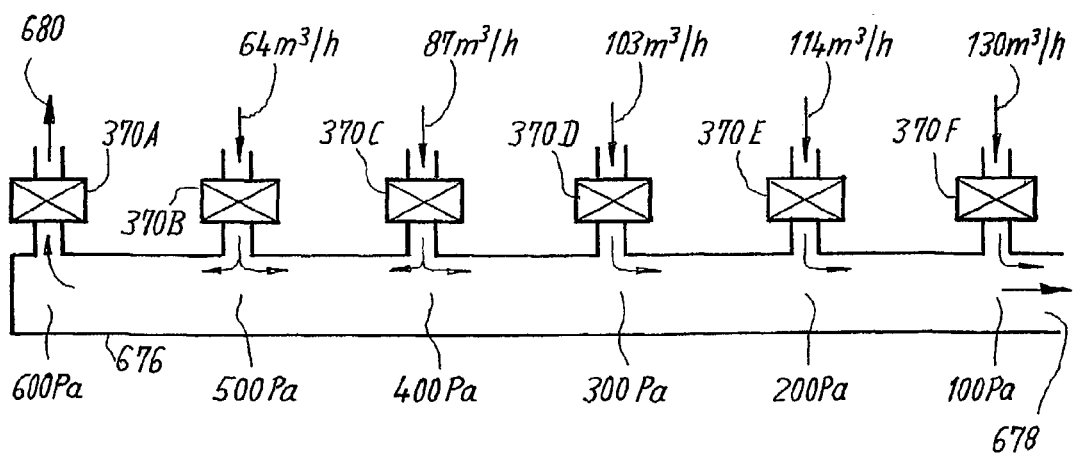
Figure 42:
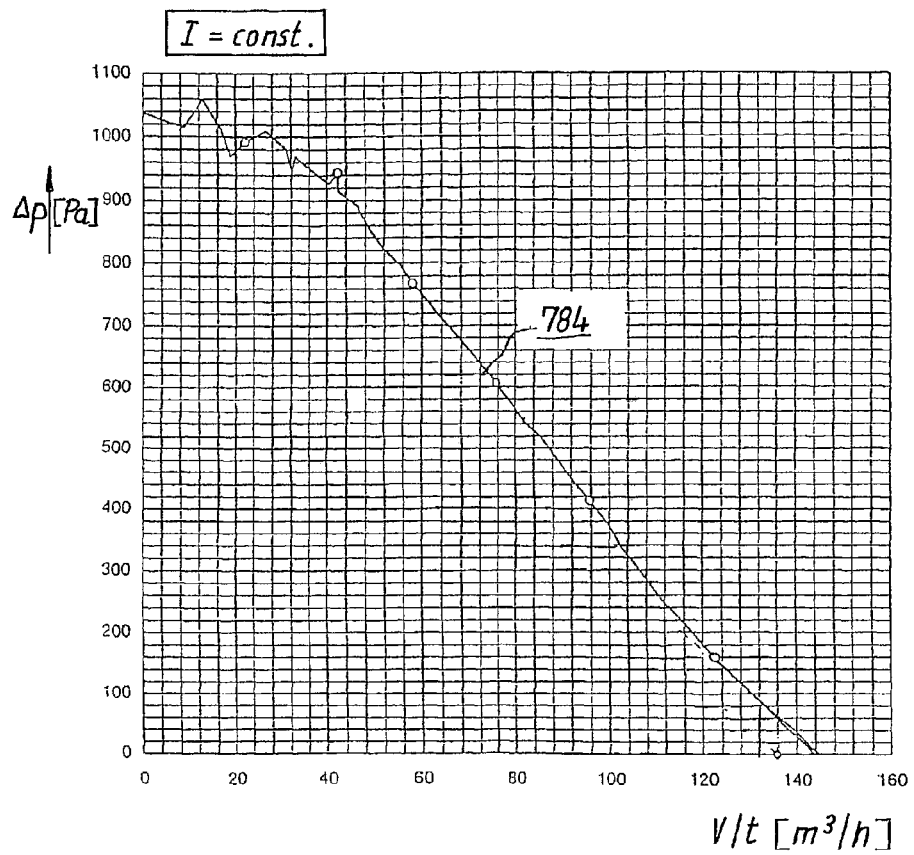
Figure 43:
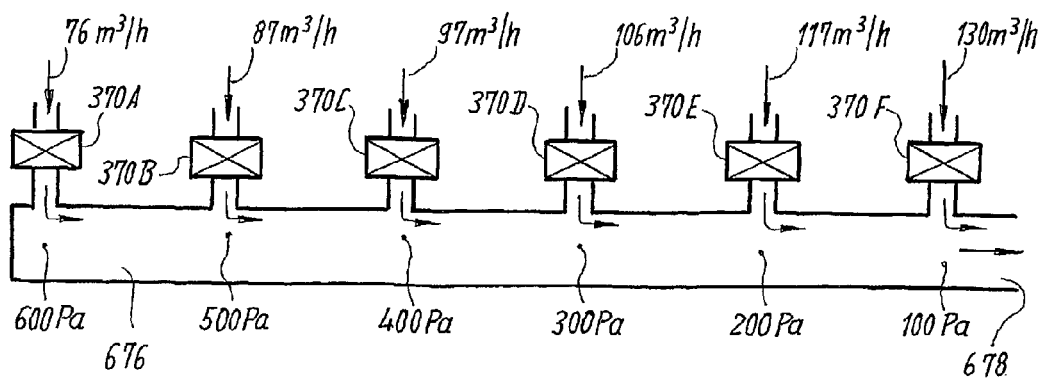
Figure 44:
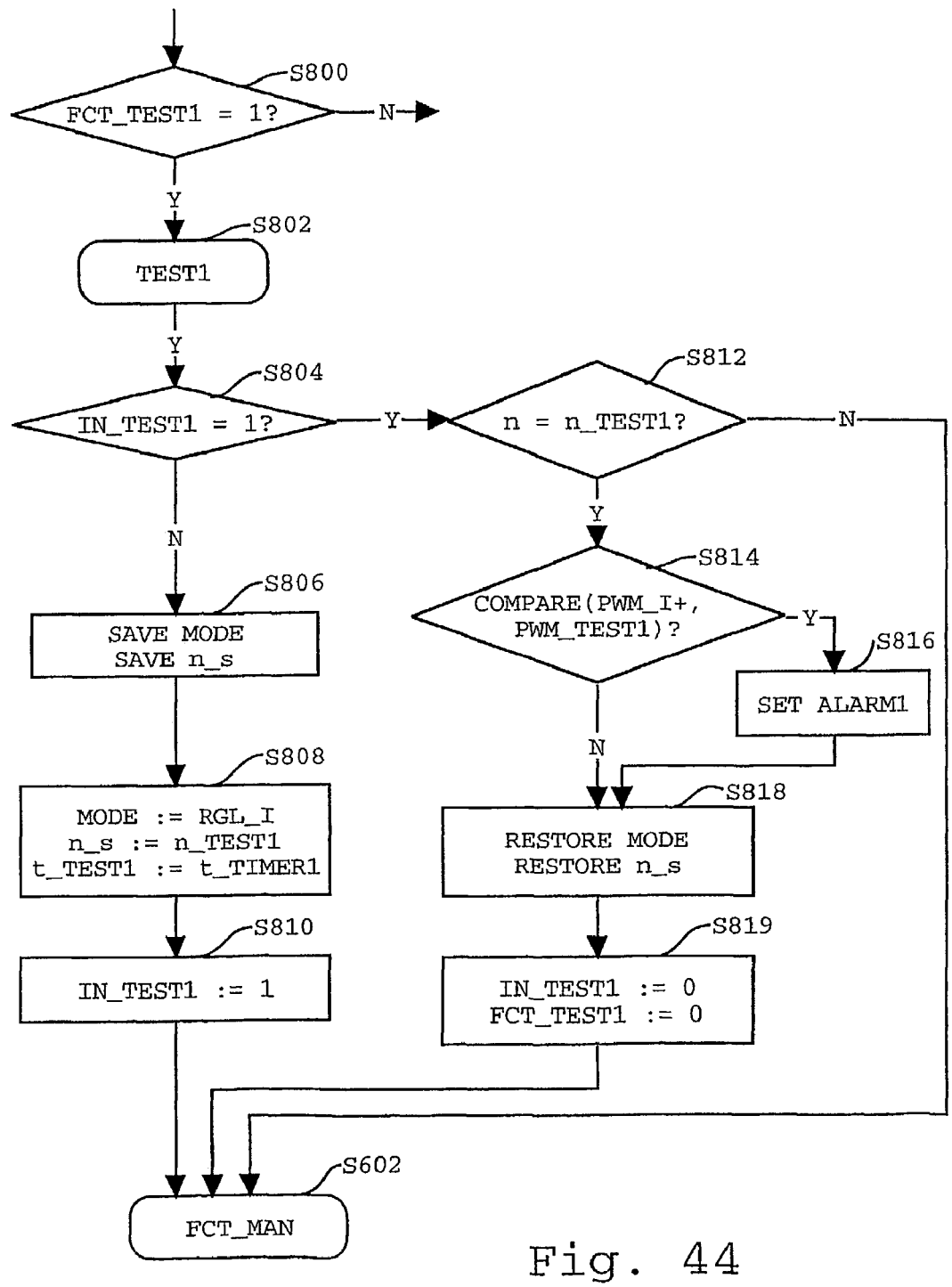
Figure 45:
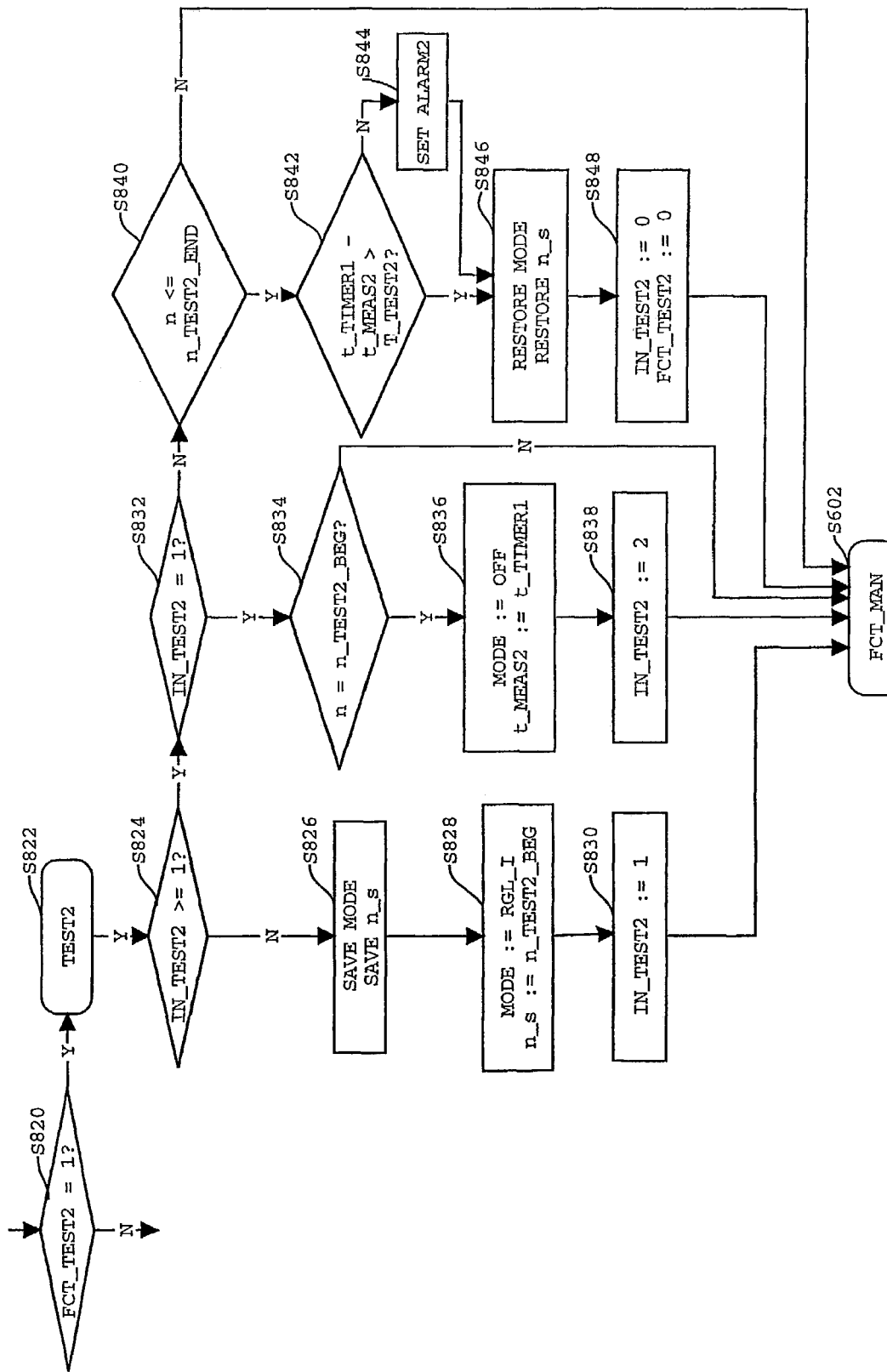
Figure 46:
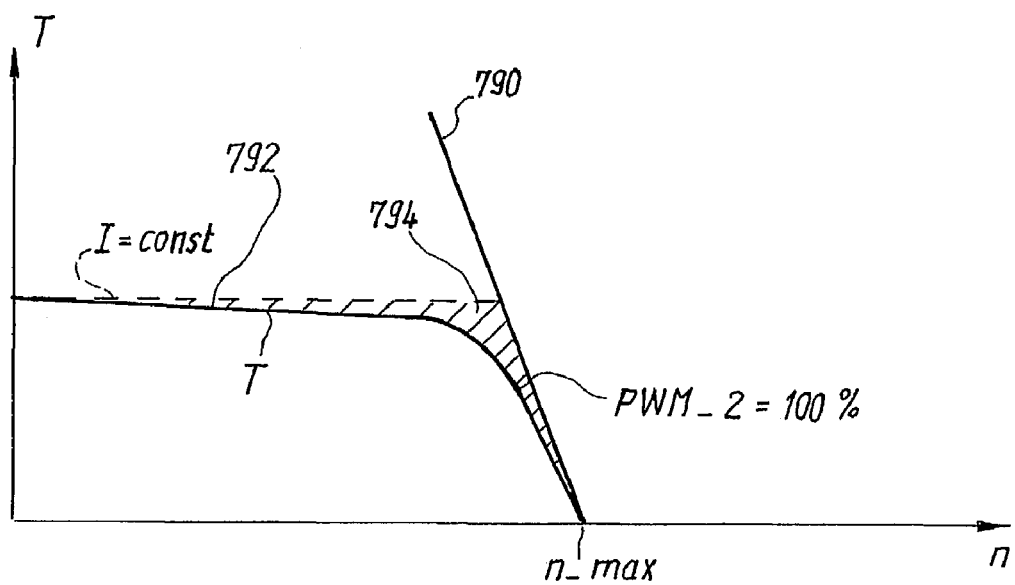

FIG. 5 contains schematic diagrams of the voltages, currents, and power levels occurring in FIG. 4 in the context of so-called alternate switching;

FIG. 6 shows a current limiting arrangement for limiting driving current i_2 in the arrangement of FIG. 1 to an externally specified, variable value;

FIG. 7 contains diagrams to explain the mode of operation of FIG. 6;

FIG. 8 shows a current limiting arrangement for limiting braking current i_2 in the arrangement of FIG. 1 to an externally specified, variable value;

FIG. 9 contains diagrams to explain the mode of operation of FIG. 8;

FIG. 10 depicts, in highly schematic fashion, a combined current limiting arrangement for limiting the driving current and braking current in an arrangement according to FIG. 1;

FIG. 11 is an overview circuit diagram to explain a preferred embodiment of an arrangement according to the present invention;

FIG. 12 is a depiction to explain, by way of example, a PWM generator according to the prior art that can advantageously be used in the DC machine according to FIGS. 1 through 11;

FIG. 13 contains diagrams to explain FIG. 12;

FIG. 14 is an individual depiction to explain the activation of one bridge arm in the arrangement according to FIGS. 1 through 11;

FIG. 15 shows the output signals of rotor position sensors 111, 112, 113 according to FIG. 1, and a combined rotor position signal that is assembled from these rotor position signals;

FIG. 16 is a flow chart showing, in an overview, several possible ways in which the arrangement according to the preceding Figures can be operated as a motor or as a brake;

FIG. 17 contains diagrams to explain the mode of operation of FIG. 16;

FIG. 18 shows a physical model to explain the processes in DC machine 32;

FIG. 19 shows stator current curves that occur in the context of rotation speed regulation by means of current setting (FIG. 19B) and rotation speed regulation by means of voltage setting (FIG. 19A);

FIG. 20 shows a function manager that is preferably utilized in a DC machine according to the present invention;

FIG. 21 shows a Hall interrupt routine;

FIG. 22 shows a routine for the commutation procedure;

FIG. 23 shows a TIMER0 Interrupt routine;

FIG. 24 shows a pumping routine for charging a capacitor that is required for the commutation operation;

FIG. 25 shows a routine for monitoring the voltage at DC machine 32;

FIG. 26 is a diagram showing a curve for the voltage at the motor, which triggers certain operations in the routine of FIG. 25;

FIG. 27 shows an RGL_U routine for regulating rotation speed via the voltage at the motor;

FIG. 28 shows an RGL_I routine for regulating rotation speed via the current delivered to the motor;

FIG. 29 shows an RGL_T+ routine for regulating the driving torque;

FIG. 30 shows an RGL_T− routine for regulating the braking torque;

FIG. 31 shows a routine indicating how, on the basis of the MODE signal, the correct routine is selected from a plurality of control routines;

FIG. 32 shows a routine indicating how various routines are activated as a function of the MODE signal;

FIG. 33 is a perspective depiction of a typical radial fan, which has advantageous properties when operating at a constant drive torque;

FIG. 34 is a family of curves showing pressure difference Δp plotted against volumetric flow for various types of fan;

FIG. 35 is a family of curves showing rotation speed n plotted against volumetric flow V/t;

FIG. 36 is a family of curves showing motor current I plotted against volumetric flow V/t for various types of fan;

FIG. 37 is a family of curves showing power consumption P plotted against volumetric flow V/t for various types of fan;

FIG. 38 schematically shows the construction of a radio base station for mobile radio that is equipped with a radial fan;

FIG. 39 shows two curves, namely a curve 782 for operation of the fan of FIG. 38 at a constant rotation speed of 4000 rpm, and a curve 784 for operation of that fan at constant current, i.e. constant torque;

FIG. 40 individually depicts curve 782 of FIG. 34;

FIG. 41 depicts a ventilation conduit 676 into which air is conveyed by a total of six identical radial fans, as well as the air flows existing in that context when all the fans are regulated to the same rotation speed;

FIG. 42 individually depicts curve 784 of FIG. 34;

FIG. 43 is similar to FIG. 41, but depicts the six radial fans being operated at the same constant torque;

FIG. 44 is a flow chart of a first test routine which serves to test a motor, e.g. the motor of a fan, during operation;

FIG. 45 is a flow chart of a second test routine which serves to test a motor, e.g. the motor of a fan, during operation;

FIG. 46 is a diagram to explain a conventional motor; and

Figure 47:
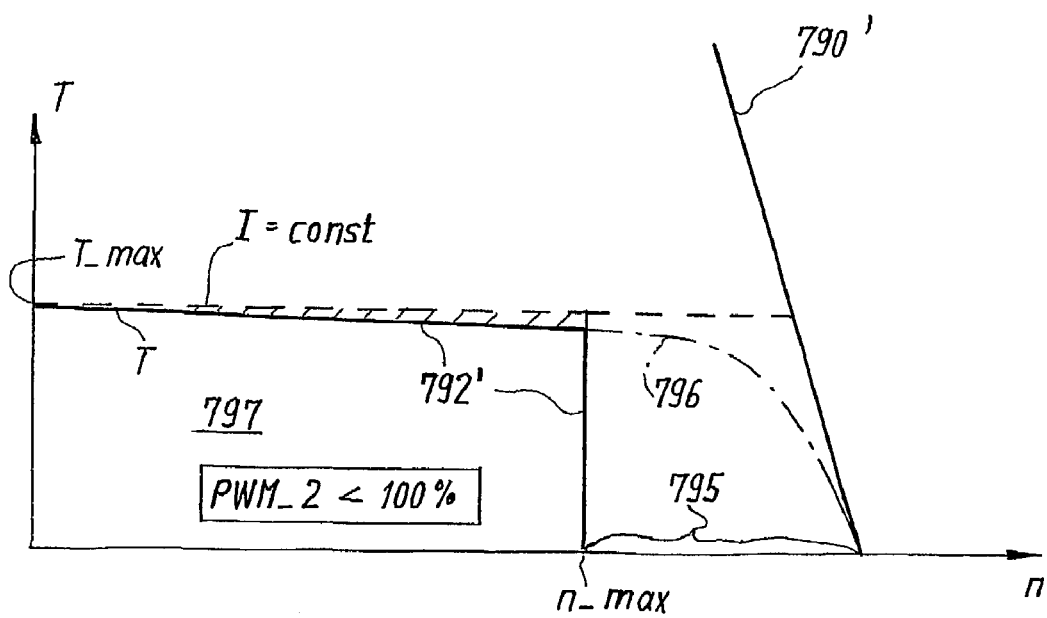

FIG. 47 is a diagram to explain a preferred embodiment of the invention.

OVERVIEW

FIG. 1 depicts, in a highly schematic overview, the entirety of a preferred exemplary embodiment of an arrangement according to the present invention.

Depicted on the right, as an example, is a three-phase electronically commutated DC machine (ECM) 32. This has a permanent-magnet rotor 110, here depicted with four poles, that controls three Hall generators 111, 112, 113 which, in operation, generate Hall signals HS1, HS2, and HS3 that are depicted in FIG. 15. The phase position of these signals relative to one another is evident from FIG. 15. DC machine 32 furthermore has a stator 114 having three winding phases 115, 116, 117, which are depicted here by way of example in a delta circuit and whose terminals are labeled L1, L2, and L3.

Figure 2:
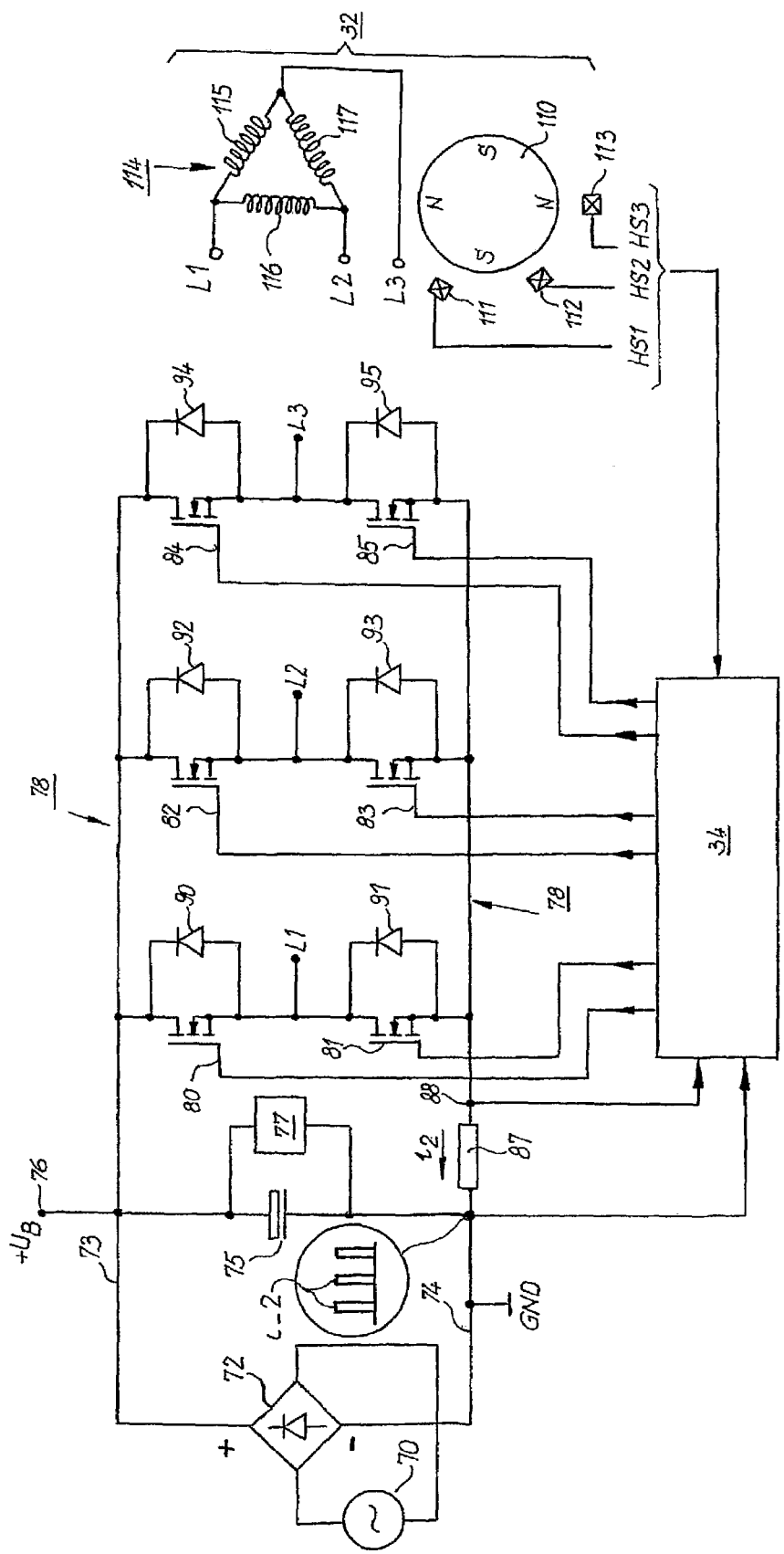
FIG. 2 depicts a full bridge circuit 78 that can preferably be utilized in the arrangement according to FIG. 1.

These terminals are connected to the output of a power output stage 78 whose configuration is depicted by way of example in FIG. 2. The latter is connected via a terminal 76 to a positive operating voltage +U_B and via a node 88 and a measuring resistor 87 to ground GND. The pulsed total current in the supply lead to motor 32 is sensed at node 88 by means of measuring resistor 87, so that the potential at node 88 changes as a function of the current through stator winding 114.

The current when DC machine 32 is driving is designated i_2; the current when DC machine 32 is braking is designated i_2'. Both are pulsed direct currents, as depicted e.g. in FIG. 13B, and their pulse duty factor tON/T (FIG. 13B) is designated PWM2 (cf. equation (9) below).

The signal (at node 88) for driving current i_2 is conveyed to a current limiting stage 131, and the signal for braking current i_2' is conveyed to a current limiting stage 161. Preferred exemplary embodiments of these current limiting stages will be explained in detail below with reference to FIGS. 6 and 8. The term "motor" will often be used hereinafter for ECM 32.

A current limiting stage 161 for braking current i_2' is, of course, required only when braking is to occur. If that is not the case, it is not required. The same is true, conversely, of current limiting stage 131, if DC machine 32 is to be used only as a brake.

From a controller 24, a variable current limiting value PWM_I+ (for the driving current) can be conveyed to current limiting stage 131, for example in order to regulate rotation speed n or driving torque T+ of motor 32. Current limiting stage 131 is designed, by way of its hardware, in such a way that a permissible current i_2 in motor 32 cannot be exceeded even when current PWM_I+ assumes its maximum value.

EXAMPLE 1

Motor 32 has an operating rotation speed of 6,800 rpm and a no-load rotation speed of 9,300 rpm. Each of the windings has a resistance of 0.5 ohm, and operating voltage U_B is intended to be 24 V. At start-up, the following would then apply:

i_2=24 V/0.5 ohm=48 A.

Current i_2 must not, however, exceed e.g. 5 A. In that case current limiter 131 is designed in such a way that even at maximum PWM_I+, current i_2 cannot be greater than 5 A.

For the voltage at winding 114, the following approximate approximation applies:

Voltage at winding 114=U_B×PWM2     (1)

When motor 32 is at rest, the effect of current limiter 131 will therefore be to establish a PWM2 of, at most, approx. 10%, since 24 V×10%=2.4 V and 2.4 V/0.5 ohm≈5 A.

In this example, therefore, motor 32 has a pulsed direct current i_2 constantly conveyed to it during operation, since a continuous direct current would rise to too high a value and result in damage to said motor. This can also be expressed as follows: this motor would not work without its electronics, and with its electronics it constitutes a motor/electronics unit.

Generation of a pulsed direct current i_2 having the necessary pulse duty factor PWM2 is effected by the fact either that PWM1 itself generates the correct value for PWM2, or that a value of PWM1 not corresponding to the desired operating values is modified by current limiting stage 131 or by current limiting stage 161.

From controller 24, a (variable) current limiting value PWM_I− for braking current i_2' can be conveyed to current limiting stage 161 (if present). This value is then constantly held in the permissible range by the hardware of current limiter 161. Value PWM_I+ determines the upper limit value for the driving current, and value PWM_I− determines the upper limit value for the braking current, in DC machine 32.

When one of current limiting stages 131 or 161 responds, e.g. because the current in output stage 78 would become too high at startup or during a braking operation, signal PWM1 is modified, by current limiting stage 131 or 161, to yield a (permissible) signal PWM2. This also applies when the rotation speed of motor 32 is regulated by the fact that current target value PWM_I+ is generated as the output signal of a rotation speed controller (cf. S432 in FIG. 28 and associated description).

Signals HS1, HS2, HS3 are conveyed to controller 24 and represent an indication of the present rotation speed n of motor 32. These signals are also conveyed to a commutation controller (control logic) 49 which controls, by way of driver stages 50, 52, 54, the commutation of currents in windings 115, 116, 117. Commutation controller 49 generates signals IN1, EN1, IN2, EN2, IN3, EN3 which are conveyed to driver stages 50, 52, 54, to which signal PWM2 is also conveyed. FIG. 14 shows, by way of example, the construction of driver stage 50, which is identical in configuration to driver stages 52 and 54.

FIG. 5A shows, by way of example, signal PWM2 that provides PWM control of driver stages 50, 52, 54. This signal has a period T (corresponding to a frequency of e.g. 20 Khz), and an on-time TON. The ratio TON/T is referred to as the pulse duty factor of signal PWM2 (cf. equation (9)). This pulse duty factor depends on a) the current through resistor 87;
b) signal PWM1;
c) signal PWM_I+;
d) signal PWM_I−.

By appropriately controlling driver stages 50, 52, 54, signal PWM2 specifies the voltage at winding arrangement 114, which according to equation (1) is approximately equal to U_B*PWM2.

The interaction of the aforementioned factors can be specified in controller 24, to which one of several operating modes can be specified at an input MODE (cf. FIG. 16).

At input n_s, a desired rotation speed ("target rotation speed") is specified to controller 24.

At input I_max+, an upper limit value for driving motor current i_2 is specified to controller 24.

At input I_max−, an upper limit for braking current i_2', which occurs when DC machine 32 is braking a load, is specified to it.

At input T+, a driving torque generated by the motor in the corresponding operating mode over a wide rotation speed range is specified to controller 24. This is possible because the current of a DC machine is substantially proportional to the generated torque. Characteristic curve 796 of FIG. 36 shows, for a radial fan 370 according to FIG. 33, the absorbed current I as a function of volumetric flow V/t during operation at a substantially constant torque. It is evident that this current I, and therefore the generated torque, is constant over a fairly wide range. The advantages of such a fan are explained with reference to FIGS. 38 through 43.

At input T−, a braking torque generated by the DC machine (as an electric brake) over a wide rotation speed range is specified to controller 24.

In addition, digital data can be entered into controller 24 via a bus 18 and stored there in a nonvolatile memory 20. These data could be, for example, the values for I_max+, I_max−, T+, T−, n_s, and MODE, or other values with which the arrangement is to be programmed. Digital data can also be transferred outward via bus 18 from controller 24, e.g. rotation speed n, alarm signal, etc.

Preferably, both controller 24 and commutation controller 49 are implemented by means of software in the same microcontroller 23. For reasons of clarity, these functions are depicted separately in FIG. 1.

If controller 24 is operating digitally, signals PWM1, PWM_I+, and PWM_I− are obtained at its output in digital form, i.e. as PWM signals. These signals are processed in current limiters 131, 161 preferably in analog form, since this makes possible extremely fast execution of the control process, which would be achievable digitally only with greater effort. The resulting signal is then, as shown in FIG. 11, converted in an A/D converter 182 back into a digital signal PWM2 which, in accordance with equation (1), controls the voltage at stator arrangement 114 and thus the voltage through the latter.

The advantages of an arrangement as shown in FIG. 1 may be seen principally in the following aspects:

A) Rotation Speed Regulation Via Current Control

If value PWM1 is set (e.g. via input MODE) to a high value (cf. FIG. 16, S520) which would correspond, for example, to a rotation speed of 9,300 rpm, while the desired rotation speed n_s is lower and is equal, for example, to only 6,800 rpm, the rotation speed can be regulated by way of current limiter 131, i.e. by modifying signal PWM_I+. The result of this, as depicted in FIG. 19B, is that the current in motor 32 assumes substantially a constant value, there being a steep rise and fall in the current. Motor 32 thus operates with very little fluctuation (ripple) in its torque, and with excellent efficiency.

In this operating mode, current limiter 131 is therefore constantly active and limits the current in motor 32 to a variable value (within specified limits) that is specified to it by rotation speed controller 24 as signal PWM_I+.

This may be compared to the curve in FIG. 19A, in which rotation speed regulation is accomplished by means of signal PWM1 (cf. FIG. 16, S504), which in this case must be substantially lower, thereby resulting in a very much more inhomogeneous shape for the current in motor 32, with correspondingly greater fluctuations in the generated torque (torque ripple) and poorer efficiency.

B) Setting a Drive Torque T+

Motor 32 can be operated at a constant driving torque T+. This is done, as shown in FIG. 16, S512, by setting PWM1 to a high value that would correspond, for example, to 9,300 rpm (so that positive current limiter 131 is constantly active), and by specifying to current limiter 131 a value PWM_I+ that corresponds to the desired driving torque T+. This is possible because in a DC machine, the torque T is largely proportional to winding current i_3, which is measured indirectly by way of driving current i_2. Value PWM_I+ is thus established, in this instance, at a constant value. Motor 32 then operates at a constant driving torque.

In a radial fan, as depicted by way of example in FIG. 33, this operating mode is very advantageous because in it, a radial or diagonal fan automatically increases its rotation speed greatly with increasing counterpressure, as shown by curve 790 in FIG. 35. This is a very valuable characteristic specifically in radial fans, since the delivered air volume falls off less sharply with increasing counterpressure than in other types of fan, i.e. is less strongly influenced by the counterpressure.

C) Setting a Negative Torque T−

DC machine 32 can also be operating at a constant braking torque T−, if braking operation is provided for. This is shown by S516 in FIG. 16. Here PWM1 is set so that negative current limiter 161 is constantly active, e.g. to PWM1=0% for a rotation speed of zero, to 50% for 10,000 rpm, and between the two for linearly modifiable intermediate values. Current limiter 161 has specified to it a value PWM_I− that corresponds to the desired braking torque T−, so that a pulsed braking current i_2' flows and determines the desired torque T−. This is possible because braking torque T− is largely proportional to the braking current in DC machine 32.

D) Rotation Speed Regulation Via Voltage Control

Lastly, the rotation speed can be regulated in the "normal" fashion by modifying signal PWM1, the motor current being limited to a permissible value via current limiter 131 (and 161, if applicable). This is depicted in FIG. 16 at S504, and in detail in FIG. 27. The advantage of an especially constant motor current is lost, however, and what is obtained is a current profile as depicted in FIG. 19A, in which the fluctuations in the driving torque, and the motor noise, are greater.

E) Combination of Operating Modes

It is additionally possible to switch back and forth on a software basis, by way of signal MODE, among all these operating modes, as shown in FIG. 16. For example, when a device is being started up, a DC machine 32 can be used as a brake at a constant torque T−; and after the device has accelerated it can be used as a drive motor, either at a regulated rotation speed (FIG. 16, S504 or S520) or at a constant driving torque (FIG. 16, S512).

As another example, DC machine 32 can be brought to a desired rotation speed n_s by rotation speed regulation via voltage or current control, and can thereby be adapted to the speed of a conveyor belt that needs to be braked. DC machine 32 is then coupled to the conveyor belt, and the MODE is switched over to constant braking torque in order to brake the belt. Other examples are described below with reference to FIGS. 44 and 45.

The invention is thus suitable for a wide variety of drive purposes, one particularly preferred application being the driving of a radial or diagonal fan at a substantially constant torque T+, as explained below with reference to FIGS. 33 through 43.

FIG. 2 once again shows the three-phase electronically commutated DC machine (ECM) 32 with its winding terminals L1, L2, and L3, also an output stage 78, embodied as a full bridge circuit, having three bridge arms in which semiconductor switches 80 through 85 are arranged. The invention is also similarly suitable for other DC machines, e.g. for ECMs having only one phase, two phases, or more than three phases, or for collector machines.

An alternating voltage from an alternating-voltage source 70 is rectified in a rectifier 72 and conveyed to a DC link circuit 73, 74. A capacitor 75 smooths DC voltage U_B at link circuit 73, 74, which is conveyed to the individual bridge arms of full bridge 78. Voltage U_B can be measured at a terminal 76.

In this exemplary embodiment, N-channel MOSFETs are used as power switches both for upper power switches 80, 82, 84 and for lower power switches 81, 83, and 85. Free-wheeling diodes 90, 91, 92, 93, 94, and 95 are connected antiparallel with power switches 80 through 85. Free-wheeling diodes 90 through 95 are usually integrated into the associated N-channel MOSFETs. DC voltage U_B at link circuit 73, 74 is also conveyed to loads 77, e.g. to electronic components of DC machine 32.

Via upper power switches 80, 82, and 84, the respective winding terminal L1, L2, and L3 can be connected to positive lead 73; and via lower power switches 81, 83, and 85 and a measuring resistor 87, the respective winding terminal L1, L2, and L3 can be connected to negative lead 74.

DC machine 32 has a central control unit 34 which controls upper and lower power switches 80 through 85.

Measuring resistor 87 serves to measure current i_2 flowing through lower bridge transistors 81, 83, and 85 on the basis of the voltage between node 88 and ground GND, and to convey it to a current limiting arrangement in central control unit 34. This is also referred to as a "bottom-end measurement." In the present circuit, this current can flow in both directions: in the direction depicted when DC machine 32 is absorbing electrical power, and in the opposite direction when the DC machine is operating as a generator and delivering power which then flows into capacitor 75.

As depicted in FIG. 2, current i_2 in the supply lead to motor 32, as measured at measuring resistor 87, is a pulsed direct current, usually at a frequency of approx. 20 kHz. The current through phases 115, 116, 117 of motor 32, however—because of free-wheeling diodes 90 through 95, the control system, and the preferred "alternate switching" that is described below—takes the form of relatively low-frequency current pulses of variable amplitude, as depicted in FIGS. 19A and 19B. In the preferred version as shown in FIG. 19B, current I is practically constant in the region of pulse top Z.

The electronics of motor 32 therefore measure pulsed current i_2 in the supply lead to motor 32, and thus cause, in motor 32, pulses having a substantially constant amplitude, as illustrated by way of example in FIG. 19B.

Rotor position sensors 111, 112, and 113 are each arranged at an angular spacing of 120 degrees (el.) around rotor 110, and serve to determine the latter's position. Rotor position sensor 111 is thus arranged at 0 degrees (elec.) (0 degrees mech.), rotor position sensor 112 at 120 degrees (elec.) (60 degrees mech.), and rotor position sensor 113 at 240 degrees (elec.) (120 degrees mech.), or at equivalent positions.

The correlation between electrical angle phi_el and mechanical angle phi_mech is defined by $$\text{phi\_el} = \text{phi\_mech} \cdot PZ/2 \tag{2}$$

where PZ=the number of poles of rotor 110.

Rotor position sensor 111 furnishes a Hall signal HS1, rotor position sensor 112 a Hall signal HS2, and rotor position sensor 113 a Hall signal HS3 (cf. FIGS. 3 and 15). Hall signals HS1, HS2, HS3 are conveyed to central control apparatus 34, which determines therefrom the position of rotor 110 and its rotation speed n.

Control Logic

FIG. 3 is a table indicating the current flow through upper power switches 80, 82 and 84 (column 704) and lower power switches 81, 83, and 85 (column 702) as a function of Hall signals HS1, HS2, and HS3 (column 700) for one running direction of the DC machine. Also indicated is the angular range of the electrical angle phi_el, e.g. 0 to 60 degrees (elec.).

FIG. 4 next describes the situation in which, for example, MOSFETs 80 and 81 are switched on and off alternatingly, which is referred to as "alternate switching." The values in region 706, i.e. columns 80 through 85, are valid for a DC machine without alternate switching. The values in region 708, i.e. in columns EN1, EN2, EN3, IN1, IN2, IN3, are valid for a DC machine 32 with alternate switching, as described with reference to FIG. 4.

For a position of rotor 110 in the range from 0 to 60 degrees (elec.), the Hall signals have values HS1=1, HS2=0, and HS3=1. As a result, power switches 80 through 85 are activated in the manner illustrated. With non-alternating activation, winding terminal L1 is then connected via power switch 80 to positive lead 73 ("1" for switch 80 in FIG. 3), winding terminal L2 is connected via power switch 83 to negative lead 74 ("1" for switch 83 in FIG. 3), and at winding terminal L3 both power switches 84 and 85 ("0" in each case for switches 84 and 85 in FIG. 3) are open, as are power switches 81 and 82.

With simple switching (see FIGS. 3 and 4), a "1" for one of the lower power switches 81, 83, 85 means that the latter is being switched by a PWM signal, i.e. being switched off and on at a specific pulse duty factor.

With alternate switching (see FIG. 4), a "1" for a lower power switch means that the latter is switched by a PWM signal (FIG. 5C), and that the associated upper power switch is also switched by the inverse PWM signal (FIG. 5B), i.e.

switched off and on. A more detailed presentation of simple and alternate switching is given with reference to FIG. 4.

Columns EN1, EN2, EN3 and IN1, IN2, IN3 determine the activation of a driver module 200 (FIG. 14), which generates an alternate switching therefrom. In this context, for example, EN1=0 means that the driver module is activated for the bridge arm to L1, and EN1=1 means that this driver module is not activated, i.e. that transistors 80 and 81 are blocked. IN1=1 means that when driver module 200 is activated, upper power switch 80 is closed; IN1=TRISTATE (TRI) means that when driver module 200 is activated, PWM signal PWM2 (cf. description of FIG. 4) is alternately activating upper driver 210 or lower driver 212 of driver module 200, so that either transistor 80 is conductive and transistor 81 is blocked, or conversely transistor 80 is blocked and transistor 81 is conducting. This switchover is performed, for example, at a frequency of 20 kHz. In the process, charge is constantly being pumped into a capacitor 230 (FIG. 14) so that the latter always remains charged. When the driver module is switched off (e.g. EN1=1) the value of IN1 has no effect, but in such a case it is usually set to 1 (cf. FIG. 3).

For the example above with a rotor 110 in the range 0 to 60 degrees (elec.), this means that the driver modules to the bridge arms of winding terminals L1 and L2 are switched on (EN1=0 and EN2=0), but the bridge arm to winding terminal L3 is switched off (EN3=1). At the bridge arm to L1, upper power switch 80 is closed (IN1=1), and at the bridge arm to L2, PWM signal PWM2 causes switching back and forth between power switches 83 and 82 (IN2=TRI), as described above.

At each position of rotor 110, therefore (in the case of alternate switching), activation logic 49 causes exactly one of winding terminals L1, L2, and L3 to have no current flow at all, a second to be at operating voltage U_B, and a third to be switched back and forth between positive and negative operating voltage. It is therefore possible to eliminate from the equivalent circuit diagram the winding terminal having no current flow, and to treat stator 114 as having two poles, as shown in FIG. 4. This consequently allows only one winding to be considered. The other windings behave similarly.

Delivery of Current to the Stator Winding

FIG. 4 shows an equivalent circuit diagram with the circuit elements that are active for a rotor position in the range from 0 to 60 degrees (elec.). Parts identical to those in FIGS. 1 and 2 have been given the same reference numerals and will not be described again. Power switches 80, 81, and 82 are depicted symbolically as switches.

Winding phase 116 connected between L1 and L2 (which runs parallel to the serially connected phases 115 and 117, as is evident from FIGS. 1 and 2), is depicted as inductance 120, winding resistor 121, and voltage source 122 for the voltage U_i induced upon rotation of rotor 110 in winding 116, which as stated by $$U\_i = n * k\_e \quad (3)$$

is proportional to rotation speed n of the motor and a motor constant k_e.

The winding current flowing through winding 116 is designated i_3; the link circuit direct current i_1 is the smoothed current from link circuit 73, 74; and i_2 is the pulsed current of the output stage. At a rotor position in the range 0 to 60 degrees (elec.), upper power switch 82 is closed.

Current can be delivered to stator winding 114 in various ways:

Simple Switching

With simple switching, lower power switch 81 is closed and opened by means of a PWM signal 228 (pulse-width modulated signal); upper power switch 80 remains open. The motor rotation speed is controlled by way of the so-called pulse duty factor tON/T (FIG. 13) of a PWM signal 228 (FIG. 4).

When switch 81 is closed, winding current i_3 flows from positive line 73 through power switch 82, winding resistor 121, and inductance 120 to power switch 81. Winding current i_3 is increased by the voltage at link circuit 73, 74, and the motor is driven. When switch 81 is closed, current i_2 is equal to current i_3. When switch 81 is closed, winding current i_3 can therefore be determined, and regulated, by means of a measurement of current i_2.

When power switch 81 is opened, winding current i_3 does not immediately drop to zero; instead, inductance 120 attempts to maintain current i_3. Since diode 91 is non-conductive to current i_3, winding current i_3 flows through free-wheeling diode 90 and through the closed switch 82.

With sufficiently fast switching by means of PWM signal 228 (e.g. at a frequency of 20 kHz), an approximately constant winding current i_3 dependent on the pulse duty factor of PWM signal 228 is established, and driving current i_2 always corresponds to winding current i_3 when switch 81 is closed. The arithmetic mean of pulsed current i_2 corresponds to link circuit direct current i_1.

Alternate Switching

In an alternately switched output stage as preferably used here, power switch 81 is switched on and off by means of PWM signal 228, in the same way as with simple switching. Simultaneously and additionally, power switch 80 is opened by means of a PWM signal 227 when power switch 81 is closed, and vice versa. PWM signal 227 thus corresponds substantially to the inverse of PWM signal 228. More details of this are provided with reference to FIG. 5.

The first result of alternate switching is that freewheeling diode 90, at which most of the power dissipation occurs with simple switching, is bypassed by the conductive MOSFET 80, exploiting the fact that current can flow in both directions through MOSFETs. On the other hand, alternate switching makes possible a winding current i_3 in both directions, i.e. both motor-mode and generator-mode. With simple switching, winding current i_3 can flow through diode 90 only in a direction that drives DC machine 32.

A winding current i_3 in the opposite direction results in braking of DC machine 32.

Another result of alternate switching is that with sufficiently fast alternation by means of PWM signals 227, 228 (e.g. at a frequency of 20 kHz), an approximately constant winding current i_3 dependent on the pulse duty factor of PWM signals 227, 228 is established; and when switch 81 is closed, current i_2 corresponds to winding current i_3, which can be positive or negative. A negative (i.e. braking) current is designated i_2' in FIG. 1. Since current i_2 or i_2', as long as it is flowing, is equal in magnitude to i_3, this current can be used to regulate i_3 to a desired value.

FIGS. 5A through 5F are diagrams of the voltages, current, and power levels occurring in FIG. 4 with alternate switching.

FIG. 5A shows a PWM signal PWM2 180 which has, for example, a frequency of 20 kHz and is described in more detail in FIGS. 12 and 13, and with which signals 227 for activating power switch 80 (FIG. 4), and 228 for activating power switch 81 (FIG. 4), are generated by driver module 200 (FIG. 14). Signals 227 and 228 have profiles that are substantially mirror images of one another, i.e. when signal 227 is high, signal 228 is low; and when 227 is low, signal 228 is high. These signals 227, 288 are separated from one another by dead times Δt (e.g. 1 microsecond) during which both transistors 80, 81 are nonconductive. During these dead times, a current i_90 (FIG. 5D) flows through diode 90.

FIG. 5B schematically shows current i_80 that flows, as a function of PWM signal 227, through transistor 80 when the latter is conductive and transistor 81 is blocked. Maximum current i_max has a value of, for example, 4 A.

FIG. 5C schematically shows current i_81 that flows, as a function of PWM signal 228, through transistor 81 when the latter is conductive and transistor 80 is blocked. Maximum current i_max has a value of, for example, 5 A.

FIG. 5D shows current i_90 that flows through diode 90 during each dead time ΔT. Maximum current i_max has a value of, for example 5 A. Dead time ΔT must be observed because if transistors 80 and 81 were simultaneously conductive, a short circuit would occur and would destroy the full bridge circuit.

Winding current i_3 (see FIG. 4) thus flows, in the context of alternate switching, alternatingly through lower switch 81 and upper switch 80. ΔT each switchover, it flows through freewheeling diode 90 during a short dead time ΔT.

FIG. 5E shows the resulting power dissipation P80 of transistor 80 and P90 of diode 90. Maximum power dissipation P80_max of transistor 80 is, for example, 1 W; maximum power dissipation P90_max of diode 90 is, for example, 6 W. The result of alternate switching is therefore that during the period when transistor 81 is open (except for the dead time), power dissipation is reduced from 6 W to 1 W, since during the time T_80 (FIG. 5E), transistor 80 with its low internal resistance (e.g. 60 milliohm) bypasses diode 90.

FIG. 5F shows power dissipation P81 of transistor 81. Maximum power dissipation P81_max of transistor 81 is, for example, 1 W.

"Alternate switching" of transistors 80 and 81 therefore prevents most of the power dissipation that occurs with "simple switching" in diode 90. The same is true in FIG. 2 for diodes 92 and 94. Reducing the power dissipation in diodes 90, 92, 94 means that the circuit components experience less heating, a more compact design becomes possible, and the efficiency of DC machine 32 is improved.

Hardware Current Limiting

Both an excessively high driving current i_2 and an excessively high braking current i_2' can damage or destroy DC machine 32. Measuring resistor 87 (cf. FIG. 1) is therefore provided in the direct current link circuit. ΔT it, driving current i_2 or braking current i_2' is measured.

Current limiting as shown in FIGS. 6 and 8 is based on a comparison between a first signal (e.g. the signal at input 138 of comparator 137, which can be influenced by signal PWM_I+) that is preferably present in the form of a smoothed analog value, and a second signal that is present in the form of pulses (e.g. the signal at input 140 of comparator 137, which is derived from driving current i_2 ).

The first signal as well is preferably derived from a pulsed signal (PWM_I+) if a digital controller is used.

The second signal used in the context of FIGS. 6 and 8 is a pulsed signal that is derived from motor current pulses i_2 and i_2'. The level of motor current pulses i_2 and i_2' corresponds to the level of winding current i_3 (cf. description of FIG. 4). It would also be possible to smooth current pulses i_2 and i_2' before the comparison, and convey them as an analog second signal. Smoothing, however, causes some of the information regarding the level of winding current i_3 to be lost.

Signal PWM2, which determines both the switching on and off of the alternately switched output stage and, therefore, current i_2 or i_2', is controlled by the potential at a node 156 (FIGS. 6 and 8), and this potential is determined by variables that include an analog control output SWA1. The current limiting arrangement changes the potential present at node 156 if current i_2 or i_2' becomes too high. This change is extraordinarily fast, and that is the reason why, according to the invention, it can also be used for control tasks.

FIG. 6 shows current limiting arrangement 131 for the pulsed driving current i_2 flowing through measuring resistor 87. It is effective only when current i_2 is flowing in the direction depicted (driving motor 32), and is therefore referred to as a "positive" current limiter. Its function is to reduce the pulse duty factor of signal PWM2 immediately when current i_2 becomes greater than a value that is specified by the pulse duty factor of signal PWM_I+, and thereby to limit current i_2 to the value that is set.

As FIG. 6 shows, controller 24 generates a PWM signal PWM_I+. It also generates, at its output 157, a PWM signal PWM1 that is conveyed via a resistor 158 to a node 154 which is connected via a capacitor 159 to ground GND. R 158 and R 159 together constitute an integrating element. An analog target value signal SWA1, whose level depends on the magnitude of the pulse duty factor of PWM1, is therefore obtained at node 154. If PWM1 has an amplitude of 5 V and a pulse duty factor of 100%, output 157 is constantly at +5 V, and therefore SWA1=+5 V. ΔT a pulse duty factor of 0%, output 157 is constantly at 0 V, and therefore SWA1=0 V. For PWM1=50%, SWA1=2.5 V. (Signal SWA1 could also be output directly by controller 24 as an analog signal.)

Node 154 is connected via a high-resistance resistor 152 to a node 156 that is connected to the input of an analog/PWM converter 182 (cf. FIGS. 12 and 13), at whose output a PWM signal PWM2 is obtained that, as shown in FIGS. 1 and 11, is conveyed to driver stages 50, 52, 54 and determines the level of the driving or braking current in stator winding 114.

Node 156 is connected via a resistor 150 to a node 146. Resistor 150 has a lower resistance than resistor 152 (cf. table below). A small capacitor 148 is located between node 146 and GND.

As FIGS. 6 and 7A show, current pulses i_2 of the motor current cause positive voltage pulses u_2 at negative input 140 of comparator 137, while at positive input 138 an analog potential PHI1 is present whose level is determined by the (variable) pulse duty factor PWM_I+.

If current pulses i_2 in measuring resistor 87 have an amplitude which is greater than target value PHI1 specified by PWM_I+, PWM2 is then reduced by pulling output 142 of comparator 137 toward ground. This output 142 is connected via a resistor 144 to node 146.

Negative input 140 of comparator 137 is connected via a resistor 130 to node 88 at measuring resistor 87. A small filter capacitor 132 (e.g. 1 nF) is also located between negative input 140 and ground GND in order to filter out interference signals from measuring resistor 87. Filter capacitor 132 therefore serves, in this exemplary embodiment, not to average motor current i_2, but rather to filter spikes at the beginning of each pulse, which is why this capacitor is very small. Measuring resistor 87 is designed here so that a voltage drop of approx. 200 mV occurs at it at the maximum permissible current i_2.

PWM signal PWM_I+, which alternates between a positive potential of +5 V and ground potential GND, is conveyed to an input 304 of current limiter 131 from controller 24. A resistor 310 is located between this input 304 and a node 311, and a capacitor 312 is located between node 311 and ground GND. Depending on the pulse duty factor of signal PWM_I+, a DC voltage is thus established at node 311 that is, for example, +5 V at a pulse duty factor of 100%, and decreases as the pulse duty factor drops.

Since the maximum voltage u_2 at measuring resistor 87 is in this case approximately 0.2 V, a voltage of +5 V at positive input 138 of comparator 137 would be too high. A resistor 314 is therefore present between node 311 and positive input 138, and a resistor 136 between positive input 138 and ground. Resistors 311, 314, 136 constitute a voltage divider that determines potential PHI1 at positive input 138. PHI1 is thus determined by the pulse duty factor of signal PWM_I+, and voltage divider 311, 314, 136 is selected so that even at a pulse duty factor of 100%, the maximum current i_2 permissible for motor 32, e.g. 5 A, cannot be exceeded.

FIGS. 7A and 7B explain the mode of operation of FIG. 6. In FIG. 7A, if a pulse u_2 rises between times t10 and t11 above a value that is specified by the instantaneous potential PHI1 at positive input 138, comparator 137 then switches over between times t10 and t11. Its previously high-resistance output 142 is connected internally to ground GND, so that between t10 and t11, by way of resistor 144, a discharge current flows from capacitor 148 to ground GND and the potential at node 146 therefore decreases.

As a result, potential u_156 at node 156 is also reduced (cf. FIG. 7B), and the analog input signal of analog/PWM converter 182 drops, so that the pulse duty factor of signal PWM2 decreases. PWM2 determines the amplitude of pulses i_2. That amplitude therefore decreases, and is limited to the value specified by PWM_I+.

Between t11 and t12 in FIG. 7A, potential PHI1 then remains continuously greater than u_2, so that during this time period potential u_156 and thus the amplitude of current pulses i_2 rises (cf. FIG. 7B). The slope of the increase depends on the magnitude of the value set for PWM1. For this reason, a high value of PWM1 is set in certain operating modes.

Starting at t14 (in this example), value PHI1 is diminished by the fact that pulse duty factor PWM_I+ is slowly lowered. Between t12 and t13, therefore, amplitude u_2 is greater than PHI1, so that output 142 is switched to ground and consequently potential u_156 at node 156 decreases, as depicted in FIG. 7B. The same happens between times t15 and t16, times t17 and t18, and times t19 and t19A.

The consequence is that potential u_156 tracks target value PHI1 with a slight delay, which in turn is specified by the (variable) value PWM_I+; and because u_156 determines the voltage at stator winding 114 and therefore the amplitude of motor current i_2, motor current i_2 decreases correspondingly and is consequently defined by signal PWM_I+.

It is clearly evident that in such an arrangement signals PWM_I+ and PWM1 could also be specified as analog signals, but digital signals have the great advantage that they can be very quickly calculated, generated, and modified with digital precision in a microprocessor (or several microprocessors).

Since resistor 150 is considerably smaller than resistor 152, the potential of node 146 has priority over potential SWA1 of node 154, so that if current i_2 is too high, potential u_156 at node 156 is immediately lowered even if PWM1 is high.

By setting the pulse duty factor of signal PWM_I+, the maximum permissible current i_2 can therefore be very conveniently set in the context of the adjustment range of current limiting arrangement 131, i.e. for example from 0 to 5 A if the maximum permissible current i_2 is 5 A. The lower the pulse duty factor PWM_I+, the lower the current i_2 at which current limiting begins.

Current limiting arrangement 131 can be used to regulate the rotation speed of motor 32 by modifying value PWM_I+. If motor 32 is driving a load, in that case PWM1 is continuously set to a high value, e.g. to 100%.

If motor 32 is braking a load, as explained in FIG. 8, PWM1 is set to a rotation-speed-dependent value, e.g. to 0% for a rotation speed of 0, to 50% for 10,000 rpm, and to linearly modifiable intermediate values therebetween.

Current limiting arrangement 131 can also be used to regulate the current in driving motor 32 to a constant value, PWM1 being set to 100% in this case as well. In this case PWM_I+ is set to a constant value, and motor 32 then furnishes a constant drive torque over a wide rotation speed range (cf. curve 796 in FIG. 36).

Arrangement 131 can also be used, in the usual fashion, to limit motor current i_2 to a maximum permissible value, e.g. to 5 A; in this case PWM_I+ is set to its maximum value and rotation speed n is regulated by modifying signal PWM1.

If motor 32 is being used only for drive purposes and not for braking, current limiting arrangement 161 (FIG. 8) can be omitted. In this case the motor can be operated with simple switching, as described above. Alternatively, alternate switching—which has particular advantages in terms of efficiency—can be used in this case as well.

FIG. 8 shows "negative" current limiting arrangement 161. Its function is to increase the pulse duty factor of signal PWM2 when braking current i_2' is higher than a value specified by the pulse duty factor of signal PWM_I−. In the description below of FIG. 8, the same reference characters as in FIG. 6 (for which see FIG. 6) are used for identical or identically functioning parts.

| | | |
|---|---|---|
| Maximum braking current: | PWM_I− = 0% | (4) |
| Minimum braking current: | PWM_I− = 100% | (5) |

In this example the maximum braking current was 5 A, and the minimum 0 A.

Arrangement 161 of FIG. 8 contains a comparator 167 whose output 172 is connected to the anode of a diode 176, and whose cathode is connected to node 146. Output 172 is moreover connected via a resistor 174 to regulated voltage +Vcc (here +5 V). Vcc is also connected via a resistor 162 to negative input 170 of comparator 167, which is connected via a resistor 160 to node 88 and via a small resistor 163 to ground GND.

Positive input 168 of comparator 167 is connected via a resistor 166 to ground, and directly to a node 324 that is connected via a capacitor 322 to ground and via a resistor 320 to an input 308 to which signal PWM_I− is conveyed. Capacitor 322 serves, in combination with resistors 166 and 320, as a low-pass filter.

As already described with reference to FIG. 6, analog control output SWA1 at node 154 is conveyed via high-resistance resistor 152 to node 156. Potential u_156 at node 156 determines the current flow through stator winding 114 and therefore also the current through measuring resistor 87. If that current is negative, it is referred to as a braking current i_2'. If this braking current rises above a value that is determined by the pulse duty factor of PWM_I−, current limiter 161 immediately pulls the potential at node 156 sufficiently upward, and thereby sufficiently increases PWM2, that braking current i_2' can assume the maximum value specified by PWM_I−.

Signal PWM_I− is conveyed from controller 24 to input 308. The amplitude of the pulses of PWM_I− is +5 V.

At maximum braking current i_2' (here 5 A), voltage u_2' at measuring resistor 87 is, in this instance, approx. 0.2 V, i.e. node 88 is then 0.2 V more negative than GND. At a braking current of zero, node 88 is at ground potential.

As a result of the voltage divider constituted by resistors 160 (e.g. 1 kilohm) and 162 (e.g. 22 kilohm), the following potentials are accordingly obtained at negative input 170 of comparator 167:

At a braking current amplitude of 0 A:

$$5 \text{ V}/23 = 0.22 \text{ V} \quad (6)$$

At a braking current amplitude of 5 A:

$$-0.2 \text{ V} + 5.2 \text{ V}/23 = +0.02 \text{ V} \quad (7)$$

FIG. 9A shows typical potential profiles u_2" at negative input 170 when a braking current i_2' is flowing. In the pulse off periods, e.g. between t21 and t22, the potential there is approximately +0.22 V; and during a braking current pulse that potential drops to a value which is lower, the higher the amplitude of the braking current pulse.

Potential PHI2 at positive input 168 of comparator 167 is determined by the pulse duty factor of signal PWM_I−, by its amplitude (here +5 V), and by the voltage divider ratio of resistors 320 (e.g. 22 kilohm) and 166 (e.g. 10 kilohm).

At a pulse duty factor for signal PWM_I− of 0% (corresponding to a maximum braking current) the voltage at input 308 is 0 V, and consequently the potential PHI2 at positive input 168 is also 0 V.

At a pulse duty factor of 100%, a voltage of +5 V is constantly present at input 308, and voltage divider 320, 166 yields a potential PHI2 of $$(5 \text{ V} * 10 \text{ kilohm})/(10 \text{ kilohm} + 220 \text{ kilohm}) = 5 \text{ V}/23 = 0.22 \text{ V} \quad (8)$$

As the pulse duty factor of signal PWM_I− rises, i.e. as the braking current decreases, potential PHI2 rises from 0 V to +0.22 V. FIG. 9A shows, by way of example, a potential PHI2 of approximately 0.1 V, which in this example would correspond to a target braking current of approx. 2.6 A.

If the potential at negative input 170 is more positive than potential PHI2 at positive input 168, output 172 of comparator 167 is connected internally to ground. Diode 176 is thereby blocked, and the potential of nodes 146 and 156 is reduced by means of a current to node 154. Node 154 in this case has a low potential, e.g. a potential of 0 V if PWM1=0%. (During braking, PWM1 is preferentially rotation-speed-dependent and rises with increasing rotation speed, e.g. from 0% to 50%.)

If the instantaneous value of braking current i_2' exceeds value PHI2 specified by the pulse duty factor of PWM_I−, input 170 thus becomes more negative than input 168, and output 172 becomes high-resistance. This is the case, for example, in FIG. 9A between t20 and t21, likewise between t22 and t23.

During this time interval, a current flows from +Vcc via resistor 174, diode 176, and resistor 150 to node 156, so that potential u_156 rises during these time intervals, as depicted in FIG. 9B; as a result, the pulse duty factor of signal PWM2 rises, and the amplitude of the braking current pulses decreases (because of the change in the PWM2 pulse duty factor) to the point that the potential of input 170 is no longer more negative than potential PHI2 of node 168. This is the case, for example, in FIG. 9 between t24 and t25. Output 172 is then connected to ground GND during this time interval as well; and diode 176 becomes blocked, so that potential u_156 decreases, because a current is flowing from node 156 to node 154. The (small) capacitor 148 prevents abrupt voltage changes at node 146. Resistor 174 is smaller than resistor 152, so that current limiter 161, which charges capacitor 148, has priority over value SWA1 at node 154. The small capacitor 163 prevents short spikes from influencing comparator 167.

The level of the permissible braking current i_2' is therefore directly influenced by the pulse duty factor of signal PWM_I−, and the braking current cannot exceed the value specified by that pulse duty factor. The fact that the arrangements according to FIGS. 6 and 8 operate quickly means they are very suitable for control tasks, as will be described below.

For "negative" current limiting using current limiting arrangement 161 (FIG. 8), a minimum pulse duty factor SW_MIN_CONST of e.g. 15% must be observed for PWM2, since below this value the current pulses flowing through measuring resistor 87 become so short that measurement is no longer possible. This constitutes a lower limit on the rotation speed range of the motor. There are, however, possibilities for circumventing this limitation on the rotation speed range by designing the software appropriately (cf. the description below).

This problem does not occur with the "positive" current limiting arrangement 131, since at a very low pulse duty factor only a low driving current i_2 occurs. With a low pulse duty factor and an excessively high rotation speed n of motor 32, on the other hand, very large braking currents i_2' could flow; this must be prevented by appropriate measures. When the motor is braking, PWM1 is therefore increased as rotation speed rises, as already described.

When a variable value for PWM_I+ or PWM_I− is being used, the source for PWM1 has the function of a digitally controllable voltage source, and of course could also be replaced by a different controllable voltage source or by a switchable voltage source.

FIG. 46 depicts torque T as a function of rotation speed n for a conventional DC motor, e.g. a collector motor. If the motor is not regulated, it achieves a rotation speed n_max at zero load. With increasing torque, the maximum rotation speed decreases approximately along a straight line 790, which can be referred to as the motor curve. As shown, with this motor the torque/rotation speed characteristic curve 792 transitions asymptotically into motor curve 790. The result is a cross-hatched region 794 in which operation of the motor is not possible. Motor curve 790 is reached when motor current i_2 flows without interruption, i.e. when PWM2=100%.

FIG. 47 shows a preferred motor design according to the invention. By means of electronic measures, as described with reference to the preceding Figures, maximum rotation speed n_max is defined at a value to the left of motor curve

790', i.e. located between that value and motor curve 790' is a region 795 that is not used because operation in that region would usually result in an overload of motor 32. Motor 32 operates only in a region 797 that is defined by T_max and n_max.

Torque/rotation speed characteristic curve 792' thus has the profile shown in FIG. 47; i.e. up to the specified rotation speed n_max the motor delivers practically its full torque T_max, since falling segment 796 (indicated as a dot-dash line) of the torque/rotation speed characteristic curve is not used.

The consequence of operating at a distance 795 from motor curve 790' is that motor current i_2 must constantly be limited, since the induced voltage of motor 32 is relatively low, and the motor current and motor rotation speed are therefore constantly attempting to rise to characteristic curve 790'. This means that pulse duty factor PWM2 of driving motor current i_2 must always be held below 100%, as indicated in FIG. 47; in other words, motor current i_2 always takes the form of current pulses at a frequency of e.g. 20 to 25 kHz. Motor 32 then behaves, in illustrative terms, like a compressed spring; i.e. its rotation speed would inherently (at PWM2=100%) tend to rise along characteristic curve 796 to motor curve 790', but is prevented from doing so by the electronics of motor 32. Motor 32 therefore has its full power level in the region 797 up to the permissible rotation speed n_max, and when operated at constant current (I=const) yields practically a constant torque T between rotation speed 0 and rotation speed n_max.

It is advantageous in this context that as shown in FIG. 19B, after commutation (at K) the current through a phase of motor 32 rises very quickly, as shown by a curve segment 338, to the preset maximum current I_max, remains at that value until the next commutation K', and then drops rapidly back to 0.

The wide top region Z at a substantially constant current results in excellent utilization of the motor, namely a substantially constant torque (corresponding to the constant current I_max) and quiet running. This embodiment is particularly advantageous if rotor 110 of motor 32 has a trapezoidal magnetization in which the gaps between the poles are small (cf. DE 23 46 380).

For comparison, FIG. 19A shows the profile of the motor current corresponding to FIG. 46 for PWM2=100%. Here there is a pronounced ripple in current 335, and this results in greater fluctuations in torque, more motor noise, and poorer utilization of the motor, because the maximum motor current I flows only during a small percentage of the current block depicted in FIG. 19A. FIGS. 19A and 19B show this difference with great clarity. This difference makes it possible, in FIG. 19B, to obtain higher torque T and therefore greater power from a given motor 32. An additional advantage is that there is very little fluctuation in the torque in this context.

FIG. 10 shows a combination of a "positive" current limiter 131 (FIG. 6) and "negative" current limiter 161 (FIG. 8) which together influence the potential at node 156 in such a way that motor current i_2 is less than a value determined by PWM_I+, and braking current i_2' is less than a value determined by PWM_I−. The potential at node 88 is conveyed both to positive current limiter 131 and to negative current limiter 161.

The outputs of current limiters 131 and 161 are both connected to capacitor 148.

If no current limitation is being performed by current limiters 131 or 161, the small capacitor 148, which is important in terms of the potential at node 156, is charged through resistors 152 and 150 to potential SWA1 at node 154. If current limiter 131 or 161 is not active, the potential at node 156 is thus determined only by signal PWM1 from RGL 24.

If positive current limiter 131 (FIG. 6) or negative current limiter 161 (FIG. 8) is active, however, capacitor 148 (e.g. 100 pF) is charged or discharged as already described.

During charging or discharging of capacitor 148, hardware current limiting has priority over signal SWA1, since resistor 144 (FIG. 6) for discharging capacitor 148 and pull-up resistor 174 (FIG. 8) for charging capacitor 148 are much smaller than resistor 152. After completion of a current limiting operation, capacitor 148 is charged once again to the potential of node 154.

Preferred Values of an Exemplary Embodiment

Preferred values for components are indicated below for the exemplary embodiment of FIGS. 6 through 10:

| | |
|---|---|
| Resistor 81 | 41 milliohm |
| Resistors 130, 144, 160 | 1 kilohm |
| Resistors 136, 150, 166 | 10 kilohm |
| Resistors 152, 310, 320 | 220 kilohm |
| Resistors 158, 162, 174 | 22 kilohm |

It appears to be important that resistor 150 be considerably smaller than resistor 152, e.g. 5% of R152

| | |
|---|---|
| Comparators 137, 167 | LM2901 |
| Capacitors 132, 163 | 1 nF |
| Capacitor 148 | 100 pF |
| Capacitors 159, 312, 322 | 100 nF |
| Diode 176 | 8AS216 |
| A/D converter 182 | FIG. 12 shows one possible embodiment. |

In this exemplary embodiment, the frequencies of all the signals PWM1, PWM2, PWM_I+, PWM_I− were on the order of 20 kHz.

Pulse duty factor PWM1 for braking is preferably rotation-speed-dependent, e.g. 0% when the motor is at rest, 50% at 10,000 rpm, and rising linearly therebetween.

Overview (FIG. 11)

FIG. 11 shows an overview of a preferred exemplary embodiment of an electronically commutated motor 32 according to the present invention.

The arrangement depicted contains a microprocessor or microcontroller 23, hereinafter called μC 23 (e.g. Microchip PIC 16C72A, with additional components as applicable).

The three rotor position sensors 111, 112, and 113 are arranged in series and are connected via a resistor 64 to +12 V and via a resistor 65 to ground (GND). The signals of rotor position sensors 111, 112, and 113 are processed in signal processors 61, 62, and 63 and conveyed to μC 23 as Hall signals HS1, HS2, and HS3 that are depicted schematically in FIG. 15.

Three potentiometers 43, 45, 47 are arranged respectively between voltage +Vcc and ground (GND). The potentials that can be set using potentiometers 43, 45, and 47 are conveyed to three analog inputs 44, 46, and 48 of μC 23. μC 23 has an A/D converter 30. Two control channels IN_A and IN_B of μC 23 can be connected via switches 41 and 42, respectively, to a +5 V potential.

Bus 18 (FIG. 1) is connected to μC 23, and EEPROM 20 (nonvolatile memory) is connected via a bus 19 to μC 23.

Operating voltage +U_B of motor 32 is picked off at node 76 (FIG. 1) and conveyed to input 68 of μC 23 via two resistors 66 and 67 connected as a voltage divider.

μC 23 is connected via outputs EN1, IN1 to driver stage 50, via outputs EN2, IN2 to driver stage 52, and via outputs EN3, IN3 to driver stage 54. Driver stages 50, 52, and 54 are in turn connected to output stage 78 (FIG. 2).

A PWM generator 182 (FIGS. 12, 13) generates a signal PWM2 180 that is conveyed to driver stages 50, 52, and 54. Its output 180 is connected to +5 V via a resistor 184 and to ground (GND) via a Zener diode 186. The latter limits the amplitude of signal PWM2 180, and resistor 184 serves as a pull-up resistor for the open collector output of PWM generator 182.

μC 23 encompasses controller RGL 24 and three PWM generators 25, 27, and 29 controllable by the latter.

PWM generator 25 has an output PWM1 157 that is connected, through resistor 152 and through the RC element constituted by resistor 158 and capacitor 159, to node 156.

PWM generator 27 has an output PWM_I– that is connected via lead 308 to negative current limiter 161 (FIG. 8).

PWM generator 29 has an output PWM_I+ that is connected via lead 304 to positive current limiter 131 (FIG. 6).

Node 88 at measuring resistor 87 is connected to positive current limiter 131 and to negative current limiter 161.

Positive current limiter 131 and negative current limiter 161 are connected to node 156 via capacitor 148, which goes to ground (GND), and resistor 150, as explained in detail in FIGS. 6, 8, and 10.

Mode of Operation

Driver stages 50, 52, and 54 control the bridge arms in output stage 78 through which current flows to stator windings 114 (FIG. 2).

Driver stages 50, 52, and 54 are controlled on the one hand by means of μC 23 via leads EN1, IN1, EN2, IN2, EN3, and IN3, and on the other hand by way of signal PWM2 180.

Signals EN1, IN1, EN2, etc. control which of stator windings 114 has current flowing through it (cf. description for FIGS. 2 and 3).

Signal PWM2 180 controls the magnitude of the current flowing through the motor windings (cf. description for FIG. 4).

μC 23 receives, via rotor position sensors 111, 112, and 113, three rotor position signals HS1, HS2, and HS3 from which it can determine the position of rotor 110 and thus the necessary commutation via outputs EN1, IN1, EN2, etc.

μC 23 comprises controller RGL 24 which controls signal PWM1 via PWM generator 25, signal PWM_I– via PWM generator 27, and signal PWM_I+ via PWM generator 29.

By means of the low-pass filter constituted by resistor 158 and capacitor 159, signal PWM1 is reshaped (transformed) into an analog smoothed signal SWA1 and is conveyed through resistor 152 to node 156, which is connected to PWM generator 182. The potential at node 156 therefore determines the pulse duty factor of signal PWM2, which controls the current through stator windings 114.

A greater pulse duty factor for signal PWM1 increases pulse duty factor PWM2 and therefore increases current i_2 through the stator windings. Signal PWM1 is thus "transformed" by low-pass filter 152, 158, 159 and by PWM generator 182 into a PWM signal PWM2. This "transformation" is influenced by the two current limiters 131, 161, if they are active.

Signal PWM_I+ controls the threshold at which positive current limiter 131 becomes active, and signal PWM_I– controls the threshold at which negative current limiter 161 becomes active.

If motor current i_2 is greater than the threshold value (controllable by means of signal PWM_I+) of positive current limiter 131, potential u_156 is reduced until motor current i_2 is once again below the threshold value.

If braking current i_2' is greater than the threshold value (controllable by means of signal PWM_I–) of negative current limiter 161, potential u_156 is elevated until braking current i_2' is once again below the threshold value.

Both positive current limiter 131 and negative current limiter 161 have priority at node 156 over analog signal SWA1 controlled by PWM1 (cf. FIGS. 6, 8, 10).

Controller RGL 24 of μC 23 has several possible ways of regulating motor 32:

One possibility is to regulate the rotation speed of rotor 110 by way of PWM generator 25 (FIG. 11) and signal PWM1, and to set signals PWM_I+ and PWM_I–, for controlling positive and negative current limiters 131, 161, to a constant value so that current limiters 131, 161 become active if currents i_2 or i_2' become excessive, thus preventing any damage to motor 32. PWM1 is therefore variable in this instance: PWM_I+ is set e.g. to 100&, and PWM_I– e.g. to 0%.

Analog control inputs can be conveyed to μC 23 via the three potentiometers 43, 45, and 47. The potentials at inputs 44, 46, and 48 can be digitized using A/D converter 30 and stored as control input variables, e.g. for a target rotation speed value n_s.

The two inputs IN_A and IN_B of μC 23 can be set, by means of switches 41 and 42, to HIGH (switch closed) or LOW (switch open), for example in order to set an operating MODE of μC 23.

μC 23 can be connected via bus 18 to other devices, e.g. to a PC or a control device, for example in order to exchange control instructions and data in both directions, or to write data into EEPROM 20 or read data therefrom. EEPROM 20 (nonvolatile memory) is connected via bus 19 to μC 23, and μC 23 can, for example, read operating parameters from EEPROM 20 or write them into EEPROM 20.

Operating voltage +U_B of motor 32 is picked off at node 76 (FIG. 1) and conveyed to μC 23 via the two resistors 66 and 67 functioning as a voltage divider. The potential at node 68 is digitized in μC 23 by means of A/D converter 30. Resistors 66, 67 transform operating voltage +U_B into a range suitable for A/D converter 30. μC 23 thus has the instantaneous operating voltage +U_B available to it in order, for example, to implement voltage monitoring (cf. FIGS. 25 and 26).

PWM Signal Generator

FIG. 12 shows, by way of example, a known circuit for PWM generator 182. Parts identical or functionally identical to those in preceding Figures are labeled with the same reference characters, and usually will not be described again.

Control output u_156, in the form of the potential at node 156, is present at the positive input of a comparator 188 (FIG. 11). A triangular signal 198, generated by a triangular oscillator (sawtooth oscillator) 183, is present at the negative input of comparator 188 (FIGS. 12 and 13).

Triangular oscillator 183 has a comparator 190. From output P3 of comparator 190, a positive feedback resistor 192 leads to its positive input. A negative feedback resistor 191 similarly leads from output P3 of comparator 190 to negative input P1 of comparator 190. A capacitor 195 is located between the negative input of comparator 190 and ground. Output P3 of comparator 190 is moreover connected via a resistor 193 to +Vcc. Positive input P2 of comparator 190 is connected to +Vcc and to ground via two resistors 194 and 196, respectively. For an explanation of the mode of operation of triangular generator 183, the reader is referred to DE 198 36 882.8 (internally: D216).

If the potential of triangular signal 198 at the negative input of comparator 188 is less than that of signal u_156 at the positive input of comparator 188, the output of comparator 188 is then high-resistance, and pull-up resistor 184 pulls lead PWM2 180 to HIGH. If the voltage of triangular signal 198 is above that of signal u_156, the output of comparator 188 is then low-resistance, and signal PWM2 180 is LOW. If an inverted PWM is needed, the positive and negative inputs on comparator 188 are transposed.

FIG. 13A shows triangular signal 198 and control input u_156 at node 156, and FIG. 13B shows PWM signal PWM2 180 resulting from FIG. 13A.

Triangular signal 198 of triangular generator 183 is depicted in idealized form. In actuality it does not have a perfectly triangular shape, although this changes nothing in terms of the mode of operation of PWM generator 182 shown in FIG. 12. Triangular signal 198 has an offset 199 from the 0 V voltage. Control input u_156 therefore does not produce a pulse duty factor TV>0 until it is greater than offset 199.

Pulse duty factor TV of signal PWM2 (FIG. 5A, FIG. 13) is defined as $$TV = tON/T \qquad (9)$$

TV can lie between 0% and 100%. If the motor rotation speed is too high, for example, u_156 is then lowered and TV is thereby decreased (cf. FIG. 13). This is referred to as pulse width modulation (PWM). For better comprehension, the pulse duty factors are referred to as PWM1 and PWM2.

Output Stage Activation

FIG. 14 shows driver stage 50 for winding terminal L1. The other two driver stages 52 and 54 are of identical configuration. Driver stage 50 switches upper power switch 80 and lower power switch 81 on the basis of signals EN1, IN1 and in conjunction with signal PWM2 180. Driver module 200 used in this exemplary embodiment is a type L6384 of the SGS-Thomson company.

Driver module 200 has a dead-time generator 202, an enable logic unit 204, a logic unit 206, a diode 208, an upper driver 210, a lower driver 212, and terminals 221 through 228.

μC 23, or possibly a more simple logic circuit, is connected to terminals EN1 and IN1 (cf. FIG. 11).

If EN1 is HIGH or TRISTATE, a transistor 250 switches on and becomes low-resistance. A resistor 252 which, as explained below, determines a dead time of driver module 200 is thereby bypassed, and input 223 becomes low-resistance as a result. Upper driver 210 and lower driver 212, and thus also the bridge arm having power switches 80, 81, are thereby switched off. In this state, signal IN1 has no influence on driver module 200. By way of transistor 250, μC 23 gains control over driver module 200 and thus also over winding terminal L1.

If EN1 is set to LOW, transistor 250 becomes blocked and high-resistance. A constant current from driver module 200 flows via resistor 252 (e.g. 150 kilohm) to ground, causing a voltage drop at resistor 252 which is present at input 223. If this voltage is greater than, for example, 0.5 V, driver module 200 is activated. If, on the other hand, transistor 250 is conductive, this voltage drops to practically zero, and driver module 200 is deactivated. The voltage at input 223 serves at the same time to set the dead time.

In the event of a reset operation in μC 23, all the inputs and outputs of μC 23 are high-resistance, i.e. including IN1 and EN1. In this case transistor 250 is switched on via resistors 242 and 244, and driver module 200 is switched off as a result. This provides additional safety.

A circuit without transistor 250 and resistors 242, 244 and 248 would theoretically also be possible. In this case signal EN1 would need to be set to TRISTATE in order to switch driver module 200 on, and to LOW to switch it off. In the event of a reset of μC 23, however, the inputs and outputs of μC 23 become high-resistance, as mentioned above, and driver module 200 and thus also the respective bridge arm would thus be switched on, which could result in uncontrolled circuit states and is therefore not desirable.

When driver module 200 is activated (EN1=LOW), it is possible to determine via input 221 whether upper power switch 80 or lower power switch 81 is to be made conductive.

If input 221 is LOW, lower driver 212 is then switched on and power switch 81 is conductive. Upper power switch 80 is blocked.

If input 221 is HIGH, however, the situation is exactly the opposite: upper power switch 80 is conductive, and lower power switch 81 is blocked.

At each change of the signal at input 221 of driver module 200, dead-time generator 202 generates a dead time during which both drivers 210 and 212 are switched off, so that short circuits do not occur in the individual bridge arms. The dead time can be adjusted by way of the size of resistor 252 and is, for example, 1 microsecond.

When the driver module is activated (EN=0), input IN1 can be used in three different ways.

When IN1=TRISTATE, PWM2 is fed in with priority via diode 260, and this signal causes alternate switching of bridge arm 80, 81 depicted here, at the pulse duty factor of PWM2 . Resistor 262 pulls the voltage at input 221 to 0 V when PWM2 is LOW, since this is not possible via diode 260. When IN1=TRISTATE, PWM2 therefore has priority over output IN1 of μC 23.

μC 23 switches on upper driver 210 of driver module 200 by setting IN1 to HIGH. The signal of output IN1 has priority over PWM2 when IN=1, i.e. PWM2 then has no influence.

μC 23 switches on lower driver 212 of driver module 200 by setting IN1 to LOW. Here as well, the signal of output IN1 has priority over PWM2, i.e. here as well the latter has no influence. Signal IN1 is set to zero only when "pumping" is occurring via μC 23, i.e. driver module 200 can be controlled in such a way that bridge transistors 80, 81 serve as a charge pump. This is described below.

Because PWM2 is fed in via diode 260 in combination with resistor 262, μC 23 can determine whether signal PWM2 should have priority for the controlling input 221 of driver module 200. If PWM2 is intended to have priority, μC 23 then sets IN1 to TRISTATE. μC 23 has priority, however, if it sets IN1 to HIGH or LOW.

It is a particular feature of this circuit that signal PWM2 is fed in at such a short distance upstream from driver module 200 but that μC 23 nevertheless retains control over the driver module. Signals IN1, EN1 from the activation logic unit are output first, and only then is signal PWM2 fed in.

A capacitor 230, and diode 208 integrated into driver module 200, represent a BOOTSTRAP circuit. The BOOT- STRAP circuit is necessary if N-channel MOSFETs are used for upper power switch 80, since they require an activation voltage that exceeds the voltage being switched (in this case +U_B).

If power switch 81 is closed, winding terminal L1 is then at ground and capacitor 230 is charged via diode 208 to +12 V (cf. FIG. 14). If power switch 81 is switched off and power switch 80 is switched on, the upper driver has available to it, via input 228, a voltage that is 12 V greater than the voltage of winding terminal L1. Upper driver 210 can thus switch on upper power switch 80 as long as capacitor 230 is charged.

Capacitor 230 must therefore be charged at regular intervals; this is referred to as "pumping." This principle is known to one skilled in the art as a charge pump. Pumping is monitored and controlled by $\mu$C 23 (cf. S616 in FIG. 20).

Two resistors 232 and 234 limit the maximum driver current for transistors 80, 81, and a capacitor 236 briefly furnishes a high current necessary for driver module 200.

Pumping

If, in the circuit according to FIG. 14, lower driver 212 is not switched on for a considerable period of time, capacitor 230 then discharges and upper driver 210 can no longer switch on upper power switch 80. In such a situation, charge must therefore be pumped into capacitor 230.

When motor 32 is operating normally in one specific rotation direction, FIG. 4 shows that one bridge arm is constantly being alternately switched on and off. This happens so frequently that sufficient pumping is ensured, and capacitor 230 is always sufficiently charged.

If, however, motor 32 becomes very slow or stops, sufficient pumping is no longer ensured. This situation can be checked on the basis of Hall time t_HALL (FIG. 15), i.e. the time between two successive changes of Hall signal HS (FIG. 15D). If the Hall time exceeds, for example, 10 ms, repumping must occur.

Another situation in which a Hall change does take place but sufficient pumping is not ensured is an oscillation of the motor about an idle position, for example because rotor 110 is jammed. It may happen that rotor 110 moves continuously back and forth between two regions in which alternate switching takes place only at winding terminal L1 or L2. In such a case, L3 must be pumped.

In this second case, sufficient pumping can be ensured by pumping each time motor 32 changes direction. The change in direction is detected in the commutation routine by way of rotor position sensors 111, 112, and 113. At a change in direction, a FCT_PUMP flag (S368 in FIG. 23, S614 in FIG. 20) is set to 1. This informs the main program (FIG. 20) in $\mu$C 23 that pumping should occur.

If FCT_PUMP=1, a function manager 601 (FIG. 20) then calls a PUMP routine S616 (FIG. 24). In this routine, all the outputs EN1, IN1, EN2, IN2, EN3, IN3 of $\mu$C 23 (FIG. 11) are set to LOW for a period of approx. 15 to 20 microseconds. As a result, lower power switches 81, 83, and 85 (FIG. 2) are switched on, upper power switches 80, 82, 84 are switched off, and all the driver stages 50, 52, and 54 (FIG. 11) are therefore pumped. After pumping, the driver stages are activated once again in accordance with the stored Hall signals HS1, HS2, and HS3, as described with reference to FIGS. 2 and 3.

FIG. 15 shows the formation of a Hall signal HS 265 as the sum or non-equivalence of Hall signals HS1, HS2, and HS3 of rotor position sensors 111, 112, 113. At each change that occurs in Hall signals HS1, HS2, and HS3, Hall signal HS 265 changes from HIGH to LOW or LOW to HIGH, so that Hall signal HS 265 changes every 60 degrees (elec.) (30 degrees mech.). These changes in Hall signal HS 265 are called Hall changes 267.

Rotation speed n of rotor 110 can be ascertained from Hall time t_HALL (FIG. 15D) between two Hall changes 267.

Since, in this exemplary embodiment, one electrical revolution (360 degrees elec.) corresponds to six Hall changes, twelve Hall changes take place for each mechanical revolution. The equation for the actual rotation speed n is $$n=1/(12*t\_HALL) \tag{10}$$

Motor Operating Modes

Motor 32, as depicted in FIGS. 1 and 11, can be operated in a variety of modes.

FIG. 16 shows an overview of four possible operating modes.

The first distinction is made at S500 in the choice between voltage setting (U setting or U_CTRL) and current setting (I setting or I_CTRL).

With voltage setting U_CTRL, a rotation speed regulation operation is performed in S502. For that purpose, in S504 signal PWM1, and therefore the analog control output SWA1, are controlled by the control output of controller RGL 24, which thereby regulates rotation speed n of motor 32. The values I_max+ and I_max− for current limiting in the positive and negative directions are defined in accordance with the data of motor 32.

With current control I_CTRL, a distinction is made in S506 between two further cases. Either a torque T of motor 32 is set in S508 (T_CTRL), or a rotation speed regulation operation (n_CTRL) is implemented in S518 by adjusting the current (I_CTRL).

Rotation speed regulation via current setting in S518 is performed, as depicted in S520, by setting PWM1 to a value U_max, U_max preferably being sufficiently high (e.g. 100%) that positive current limiting is always active. Control output PWM_I+ for positive current limiting is then controlled by means of a control output of controller RGL 24, and rotation speed n of motor 32 is thereby regulated. The permissible braking current I_max− is defined in accordance with the data of motor 32.

With torque adjustment via current setting, the possibility exists of controlling torque T positively (S510) or negatively (S514).

Positive torque adjustment (S510), which drives motor 32, is carried out by setting PWM1, in accordance with S512, to a value U_max which preferably is so high (e.g. 100%) that positive current limiting is always active. Control output PWM_I+ is then set to a value I(T+) correlated with positive torque T+, e.g. a pulse duty factor that corresponds to 2.3 A. Control output PWM_I− is set to value I_max− that corresponds to the maximum permissible braking torque i_2', i.e. for example to 0%.

Negative torque adjustment (S514), which brakes motor 32, is carried out by setting PWM1, in accordance with S516, to a value U_min that preferably is so low that negative current limiting is always active. Control output PWM_I− is set to a value I(T−) correlated with negative torque T−. Control output PWM_I+ is set to value I_max+ that corresponds to the maximum permissible driving current i_2.

The individual operating modes will be discussed in more detail below.

Torque Adjustment

The torque generated by electric motor 32 is substantially proportional to current i_2 over the period during which the respective lower power switch 81, 83, or 85 is closed.

FIG. 17 shows the two modes for setting the torque:

Positive torque adjustment (S510 in FIG. 16) takes place in a region 290. Motor 32 drives with an adjustable positive torque T+.

Negative torque adjustment (S514 in FIG. 16) takes place in a region 292. Motor 32 brakes with an adjustable negative torque T−.

In the exemplary embodiment presented, there exists in the context of torque adjustment the possibility of setting a desired torque T of motor 32 in both directions, i.e. driving or braking. If no braking torque is required, the portion in question can be omitted.

Physical Motor Model

FIG. 18 shows a motor model that represents the physical processes in motor 32 in simplified fashion.

At a node 300, a voltage U is present that causes a winding current I 308 (the current I at point 308) through stator winding 303, which latter is located between nodes 302 and 308. It can be regarded as a parallel circuit made up of an inductance L 304 and a resistance R 306.

Stator winding 303 causes a time delay between the changing voltage U 300 and the winding current I 308 resulting therefrom. This is referred to as a delay element or pT1 element.

Current I 308 through stator winding 303 causes, by way of device constant K_T of winding 303 or motor 32, a certain magnetic flux density and thus a torque T 312 acting on the permanent-magnet rotor (110 in FIG. 1).

Torque T 312 influences angular frequency (omega) 318 of the rotor as a function of moment of inertia J 314 of rotor 110 (FIG. 1) and applied LOAD 316.

The rotation of rotor 110 (FIG. 1) at angular frequency (omega) induces, by way of device constant K_E 324 of motor 32, a counter-EMF in stator winding 303 that counteracts voltage U 300.

Lastly, angular frequency (omega) 318 yields rotation speed n 328 in revolutions per minute by way of a conversion factor 60/(2(pi)).

Rotation speed regulation n_CTRL via voltage setting U_CTRL (S502 in FIG. 16) changes voltage U, via node 330, to the control output calculated by controller RGL 24 (FIG. 11), so as thereby to influence rotation speed n of rotor 110. Because of the time delay caused by stator winding 303, the voltage setting function has a long control path (pT1 element), which results in poor regulation especially with rapid changes in LOAD.

Rotation speed regulation n_CTRL via current setting I_CTRL (S518 in FIG. 16) or torque adjustment T_CTRL via current setting (S510 and S514 in FIG. 16) controls winding current I 308. This is done by measuring winding current 308 at node 332, and voltage U 300 is set via node 330 in such a way that winding current I 308, specified by rotation speed regulation via current setting (S518 in FIG. 16), or by torque adjustment T_CTRL via current setting (S510 and S514 in FIG. 16), flows through stator winding 303.

FIG. 19A shows, as an explanation of FIG. 18, current I 334 through one of winding terminals L1, L2, or L3 (FIG. 1) for rotation speed regulation n_CTRL via voltage setting (S502 in FIG. 16), a context in which voltage U 300 (FIG. 18) is constant when considered over a short time period. The time delay due to stator winding 303 (FIG. 18) results in a slow rise in current I at point 335 in FIG. 19A. At point 336 commutation occurs, i.e. current flows through a different stator winding 303, and current I 334 rises briefly because of the lower counter-EMF 324 (FIG. 18).

FIG. 19B shows current I 337 through one of winding terminals L1, L2, or L3 (FIG. 1) for rotation speed regulation via current setting (S518 in FIG. 16) or torque adjustment T_CTRL via current setting (S510 and S514 in FIG. 16).

With current setting, current I 337 is specified, and the specification is constant (I=const) when considered over a short period of time. The increase in current I 337 at point 338 is steeper, since voltage U 300 (FIG. 18) is set by way of current limiter 131 or 161 in such a way that the specified value I=const is attained quickly. Current I 337 is largely constant between the beginning of current flow at 338 and the subsequent commutation at point 339, and upon commutation at point 339 there is no substantial rise in current I 337 as at 336 in FIG. 19A, but instead it is held practically constant. At the end of this current flow, the motor experiences current flow, in accordance with the control logic, through another of winding terminals L1, L2, L3, e.g. via winding terminal L2; this is not depicted.

The current profile with current setting I_CTRL is therefore almost constant. This reduces ripple in the torque generated by the motor and thus reduces noise, and improves EMC (electromagnetic compatibility). Because of its better EMC, a motor of this kind therefore requires smaller capacitors for its power supply, and less-complex circuitry. There is also less stress on the power supply section and cables, since no current spikes occur; alternatively, smaller power supply sections can be used.

Current I set by rotation speed regulation is reached more quickly than in FIG. 19A, and load changes can thus be reacted to quickly. This improves control quality with rotation speed regulation via current setting I_CTRL. Rotation speed regulation via voltage control U_CTRL cannot react as quickly to load changes, since with voltage control U_CTRL the pT1 delay element means that current I and therefore torque T rise or fall more slowly.

The physical limits of motor 32 are not changed by the current setting function. For example, current I 337 in region 338 will rise less steeply at high power levels because voltage U cannot be set arbitrarily high. In FIG. 19, motor 32 is thus operated in a range below its natural characteristic curve, as is explained with reference to FIG. 47.

Overall Program and Function Manager

FIG. 20 is a flow chart showing one possible embodiment of the overall program that executes in μC 23.

At the very top are two interrupt routines—Hall Interrupt S631 (FIG. 21) and TIMER∅ Interrupt S639 (FIG. 23)—which are executed upon occurrence of the respective interrupts 630 and 638 and act on the main program via 632 and 640, respectively. The priority, or sequence in which the individual program parts are executed, decreases from top to bottom. The priorities are therefore labeled L1 through L9 on the right-hand side, a lower number indicating a higher priority. L1 thus has the highest priority.

Below the interrupt routines, the main program begins. After start-up of motor 32, an internal reset is triggered in μC 23. Initialization of μC 23 takes place in S600.

After initialization, the program branches into a so-called function manager 601 that begins in S602. Function manager FCT_MAN controls the execution of the individual subprograms or routines.

The first routines performed are those that are time-critical and must be executed at each pass. One example of these is a communication function COMM S604 which performs data exchange between μC 23 and EEPROM 20 (FIG. 11) or bus (data line) 18. S606 stands for any other time-critical function.

After S606 come requestable functions S612, S616, S620, S624, and S628. For each of these functions there exists a request bit beginning with the letters "FCT_". Function XY S612, for example, has a corresponding request bit FCT_XY.

At any point in the program executing in μC 23, therefore, any requestable function can be requested by setting the corresponding request bit to 1, e.g. FCT_XY:=1. Once the corresponding requestable function has been completed, it automatically sets its request bit back to 0, e.g. FCT_XY:=0.

After S606, the program checks in a predetermined sequence, starting with the most important requestable function, whether its request bit is set. If that is the case for a function, it is executed; the program then branches back to the beginning FCT_MAN S602 of function manager 601. The sequence in which the request bits are checked yields the priority of the requestable functions. The higher up in function manager 601 a function is located, the higher its priority.

An example will explain the mode of operation of function manager 601: If, for example, the program branches from S610 to S614, it then checks there whether function register bit FCT_PUMP=1, i.e. whether PUMP routine S616 has been requested (as depicted in FIG. 24). If so, execution branches to S616 and PUMP function S616 is executed. Upon completion, PUMP function S616 sets the request bit FCT_PUMP back to 0 (cf. S378 in FIG. 24), and execution branches back to S602.

If a request bit was not set for any of the queries through S626, execution branches back to S602 without any action, and function S604, which is executed at each pass of function manager 601, is performed again.

The function manager results in optimum utilization of the resources of μC 23.

FIG. 21 shows an exemplary embodiment of Hall Interrupt routine S631, which is performed at each Hall interrupt 630 (FIG. 20) triggered by the occurrence of a Hall change (e.g. 267 in FIG. 15D) in signal HS (HALL). The interrupt could, of course, also be triggered by an optical or mechanical sensor, and it can therefore also be referred to as a "sensor-controlled interrupt."

The following variables are used:

| | |
|---|---|
| t_END | Point in time of the present edge or Hall change |
| t_TIMER1 | Ring counter TIMER1 for time measurement |
| t_HALL | Time between two Hall changes (cf. FIG. 15) |
| t_END_OLD | Time of previous Hall change |
| n | Rotation speed |
| n_CONST | Rotation speed calculation constant |
| FCT_RGL | Request bit of controller RGL |

Hall Interrupt routine S631 senses the point in time t_END of the Hall change, and calculates therefrom the Hall time t_HALL and rotation speed n. Commutation is then performed, and controller S624 is called.

Step S340 represents actions that may possibly be performed in Hall Interrupt routine S631.

Calculation of rotation speed n from Hall time t_HALL begins in S342.

In S344, the time of the present Hall change 267 (FIG. 15D) is saved in variable t_END. The time is taken from ring counter t_TIMER1. Time t_HALL is then calculated from the difference between time t_END of the present Hall change and time t_END_OLD of the previous Hall change. After the calculation, the value of t_END is saved in t_END_OLD (for calculation of the next t_HALL).

In S346, rotation speed n is calculated from the quotient of rotation speed calculation constant n_CONST and Hall time t_HALL (cf. description of FIG. 15 and equation (10)).

In S348, commutation COMMUT of output stage 78 takes place by means of driver stages 50, 52, 54 (cf. FIG. 22).

In S350, controller RGL S624 is requested by setting FCT_RGL to 1, and in S352 execution leaves Hall Interrupt routine S631.

FIG. 22 shows COMMUT subprogram S348 that performs commutation of output stage 78 (FIGS. 1 and 2) in accordance with the commutation table of FIG. 3, by means of driver stages 50, 52, 54 (FIG. 11). COMMUT subprogram S348 is called in Hall Interrupt routine S631.

In a motor in which commutation occurs earlier in time as a function of rotation speed n of motor 32, COMMUT subprogram S348 is not executed, for example, until a time after Hall change 267 that depends on rotation speed n of motor 32 has elapsed. In many cases, however, this earlier commutation ("ignition advance") is not necessary.

The following variables are used:

| | |
|---|---|
| U_OFF | Flag indicating whether output stage 78 is switched off |
| CNT_P | Counter for pump monitoring |
| CNT_P_MAX | Maximum permissible time between two pumping operations |
| HL_COMB | Status of signals HS1 through HS3 |
| TEN1, TEN2, TEN3 | Commutation tables (FIG. 2) |
| EN1_S, EN2_S, EN3_S | Target commutation values |
| TIN1, TIN2, TIN3 | Commutation tables (FIG. 2) |
| IN1_S, IN2_S, IN3_S | Target commutation values |
| EN1, EN2, EN3 | Commutation values |
| IN1, IN2, IN3 | Commutation values |

Step S302 checks whether the output stage has been switched off (U_OFF=1) by voltage monitor UBT S620 (FIG. 25). This means that the voltage at direct current link circuit 73, 74 (FIG. 2) is too high or too low.

In that case execution branches to S330. In S330, all the driver modules 200 are deactivated. This is done by setting outputs EN1, EN2, EN3 to 1.

In S332, signals IN1, IN2, IN3 are set to 1. This has no effect if driver modules 200 are deactivated, but the state of signals IN1, IN2, IN3 that remains stored is thereby defined for subsequent operations. Execution then branches to the end (S334).

If U_OFF was equal to 0 in S302, i.e. if the voltage at direct current link circuit 73, 74 is normal, normal commutation then occurs in accordance with the commutation table of FIG. 2.

In S304, counter CNT_P, which is used for the pump monitoring function PUMP S616 (FIG. 24), is set to CNT_P_MAX, since commutation and thus also pumping will subsequently occur.

In S306, target values EN1_S, EN2_S, EN3_S for signals EN1 through EN3 are loaded in accordance with combination HL_COMB of Hall signals HS1, HS2, HS3 from the table of FIG. 3. The table values from FIG. 3 are labeled TEN1, TEN2, and TEN3. For example, if rotor 110 is located within the angular position 0 through 60 degrees (elec.), combination HL_COMB of the Hall signals is (HS1=1, HS2=0, HS3 =1), and the following values are loaded: EN1_S=0, EN2_S=0, EN3_S=1.

Similarly in S308, target values IN1_S, IN2_S, IN3_S for signals IN1 through IN3 are loaded in accordance with combination HL_COMB of Hall signals HS1, HS2, HS3 from the table of FIG. 3. The table for the IN values is labeled TIN1, TIN2, TIN3. For the example from S306, the result is IN1_S =1, IN2_S=TRISTATE, IN3_S =1 (for an angular position 0 to 60 degrees (elec.)).

Before commutation, two of the driver modules were activated and one driver module was deactivated. For example, before the commutation in FIG. 11, driver stages 52 and 54 were activated and driver stage 50 was deactivated. After the commutation, for example, driver stage 54 is deactivated and driver stages 50 and 52 are activated.

Steps S310 through S320 serve to switch off the driver stage that was activated before commutation and needs to be deactivated after commutation, i.e. driver stage 54 in the example above. A driver stage that is to be activated both before and after the commutation is not temporarily switched off, thereby preventing losses in motor 32.

In FIG. 3, the fields in columns EN1, EN2, EN3 in which the respective driver module is activated during two successive angular regions are surrounded by a box 740.

A check is therefore made in S310 as to whether target value EN1_S for signal EN1 is equal to 1, i.e. whether EN1 is to be switched off after commutation. If so, EN1 is set to 1 in S312, and the driver module of the bridge arm of winding terminal L1 is deactivated. If EN1 was deactivated before the commutation, then another deactivation has no effect.

In S314 through S320, the same occurs for the bridge arms of winding terminals L2 and L3.

In S322, signals IN1, IN2, and IN3 are set to target values IN1_S, IN2_S, and IN3_S.

In S324, signals EN1, EN2, and EN3 are set to target values EN1_S, EN2_S, and EN3_S. Since the driver modules that are to be deactivated after commutation have already been deactivated in S310 through S320, the result of S324 is to switch on the driver module that previously was switched off. The other driver module, which is to be switched on both before and after the commutation, was of course not switched off in S310 through S320, in order to prevent the power losses in motor 32 that would result from an interruption in current.

In S324 the COMMUT subprogram is terminated.

If it is desirable to operate motor 32 in both rotation directions, a second commutation table must be provided, by analogy with FIG. 3, for the other rotation direction. Target value EN1_S is then ascertained in S306, e.g. by means of a function TEN1 (HL_COMB, DIR), where DIR stands for the desired rotation direction. In many cases, however, e.g. with radial fans, operation is required in only one rotation direction. Operation with a commutation table for the opposite direction presents no difficulty to one skilled in the art and is therefore not described further, since this is unnecessary for an understanding of the invention and the description is in any case very long.

FIG. 23 shows TIMERØ Interrupt routine S639 (cf. FIG. 20), which is executed at each occurrence of an interrupt S638 triggered by timer TIMERØ integrated into µC 23.

The following variables are used:

| | |
|---|---|
| CNT_T1 | Counter for requesting MODE routine S628 |
| T1_TIME | Time between two requests for MODE routine S628 |
| FCT_MODE | Request bit for MODE routine S628 |
| FCT_UBT | Request bit for UBT routine S620 |
| CNT_P | Counter for pump monitoring |
| FCT_PUMP | Request bit for PUMP routine S616 (FIG. 24). |

TIMERØ is, for example 1 byte (256 bits) wide; at a processor frequency of 10 MHz and a prescale of 8, it reaches a value of zero every 256×8×0.4 microseconds=820 microseconds, and an interrupt 638 is triggered. The 0.4-microsecond time results from the fact that at a processor frequency of 10 MHz, one cycle requires 0.1 microsecond, and the processor requires four cycles and thus 0.4 microsecond for each instruction. TIMERØ is also governed by this.

In S353 any other steps not listed here are run through, for example if other program sections are to be controlled by TIMERØ.

In S354 a counter Subtimer T1 begins. "Subtimer" means that as a result of steps S356, S358, and S362 explained below, the actual action in S360 is triggered only after a certain number of TIMERØ interrupts. This has the advantage that TIMERØ can also be used for other purposes that need to be called more frequently.

In S356, internal counter CNT_T1 is incremented by 1.

In S358, the program checks whether CNT_T1 is greater than or equal to the value T1_TIME. If No, then execution branches immediately to S362.

If, however, it is found in S358 that counter CNT_T1 has reached the value T1_TIME, FCT_MODE is then set to 1 in S360, and MODE routine S628 (FIG. 20) is thus requested. In addition, FCT_UBT is set to 1, so that UBT routine S620 is requested. Counter CNT_T1 is set back to 0.

The call in S360 takes place, for example, every 24.6 ms if TIMERØ Interrupt 628 is triggered every 820 microseconds and if T1_TIME=30. The time value T1_TIME must be adapted to the particular motor.

In S362, counter Subtimer CNT_P begins.

In S364, counter CNT_P is decremented by 1.

In S366, CNT_P is checked. If CNT_P>0, execution branches to the end S369. If CNT_P=0, then a considerable amount of time has passed since the last commutation and the last pumping action, and PUMP routine S616 must be requested in S368.

In S368, request bit FCT_PUMP is set to 1, and PUMP function S616 (FIG. 24) is thereby requested. Execution then branches to the end S369, and leaves the TIMERØ Interrupt routine.

FIG. 24 shows PUMP routine S616 that is called by TIMERØ Interrupt routine S639 when pumping is necessary.

In S367, the instantaneous commutation state COMMUT_STATE is saved. In S372, all outputs EN1, EN2, EN3, IN1, IN2, IN3 are set to 0, thereby closing lower power switches 81, 83, and 85 so that pumping occurs. In S374, execution waits for the PUMP_TIME required for pumping.

Then, in S376, the commutation state COMMUT_STATE saved in S367 is restored. This can also be done by using target values EN1_S, EN2_S, EN3_S, IN1_S, IN2_S, and IN3_S.

In S378, request bit FCT_PUMP for PUMP routine S616 is reset, and execution branches to FCT_MAN S602 (FIG. 20).

Monitoring the Operating Voltage

FIG. 25 shows UBT subprogram S620 which serves to monitor the operating voltage +U_B, which can be measured in FIG. 11 at terminal 68 of μC 23. If +U_B lies outside a permissible range, full bridge circuit 78 is appropriately influenced so that the components connected to link circuit 73, 74—e.g. power transistors 80 through 85, free-wheeling diodes 90 through 95, capacitor 75, motor 32, and components 77 (FIG. 2)—are not damaged.

The UBT subprogram is requested in TIMER∅ Interrupt routine S639 (S360 in FIG. 23).

The following variables are used:

| | |
|---|---|
| U_B | Value for operating voltage + U_B |
| U_MIN_OFF | Lower limit value for operating voltage + U_B |
| U_MAX_OFF | Upper limit value for operating voltage + U_B |
| U_MIN_ON | Lower limit value for switching on current flow |
| U_MAX_ON | Upper limit value for switching on current flow |
| U_OFF | Flag indicating whether output stage is switched off |
| FCT_UBT | Request bit for UBT function S620 |

In S380, a query is made via the A/D converter (in μC 23) as to the level of the voltage at input 68 of μC 23, and the result is stored in variable U_B as a digital value.

FIG. 26 shows, by way of example, a profile over time of the digitized variable U_B that corresponds to the analog variable +U_B (operating voltage of motor 32).

The value U_B can become too low because, for example, the storage battery in an electric vehicle is discharged. The operating voltage then drops below a lower limit value U_MIN_OFF, and motor 32 must automatically be switched off. When this voltage then rises above a higher lower limit value U_MIN_ON, motor 32 can then be switched back on. The result of this is a lower-end switching hysteresis.

During braking, variable U_B can become too high because motor 32 is feeding energy in generator mode back into capacitor 75 (FIG. 2), so that U_B rises because that energy cannot be consumed by loads 77. Too great an increase in voltage U_B must be prevented, since otherwise components 77 could be damaged.

The increase in variable U_B resulting from a braking operation of motor 32 is depicted at 340. At 342 an upper threshold U_MAX_OFF is exceeded, and all the transistors 80 through 85 of motor 32 are blocked. As a result, at 344 value U_B drops, and at 346 it reaches the lower threshold value U_MAX_ON at which commutation of transistors 80 through 85 is once again switched on normally, so that at 348 U_B once again rises. At 350, transistors 80 through 85 are blocked again so that value U_B drops again, and at 352 threshold value U_MAX_ON is once again reached, where commutation of motor 32 is once again switched on. Since the braking operation in this example is now complete because the motor has reached its target rotation speed n_s, U_B drops back to a "normal" value 354 that lies in the "safe region" 356.

A "forbidden region" with an excessively low operating voltage U_B is labeled 360, and a forbidden region with an excessively high operating voltage U_B is labeled 362.

The program shown in FIG. 25 serves to implement the procedures just described. Steps S382, S384 check whether variable U_B lies outside the permissible region between U_MIN_OFF and U_MAX_OFF. If that is the case, execution branches to S386; otherwise to S390.

S386 checks, on the basis of variable U_OFF, whether output stage 78 is already switched off. If so, i.e. if U_OFF=1, execution can then leave UBT routine S620, and branches to S398. Otherwise, in S388, U_OFF is set to 1, and all outputs EN1, EN2, EN3 (FIG. 11) are set to HIGH, so that all the bridge transistors 80 through 85 (FIG. 2) are made nonconductive. Since the voltage induced in phases 115, 116, 117 when power switches 80 through 85 are open is less than voltage U_B at capacitor 75, all freewheeling diodes 90 through 95 are blocked, and no current and therefore also no power can flow from motor 32 into link circuit 73, 74. Motor 32 is thus "disengaged," i.e. it is neither absorbing nor delivering power.

S390 and S392 check whether U_B is within permissible region 356 (FIG. 24). This permissible region 356, which is smaller than the impermissible region defined by steps S382 and S384, results in a current limiting hysteresis which improves operation of the motor. If hysteresis is not required, S394 is appended directly to alternative "N" of S384, and steps S390, S392 can be omitted.

If U_B is located within permissible region 356, execution branches from S390 or S392 to S394; otherwise it branches to S398.

S394 checks whether U_OFF was already 0, i.e. whether output stage 78 was already being commutated normally. If U_OFF was equal to 0, execution branches to S398; otherwise, in S396, variable U_OFF is set to 0, and at COMMUT power stage 78 is commutated normally, in accordance with the table in FIG. 3, as a function of Hall signals HS1, HS2, HS3 (cf. FIG. 22). In this context, the onset of commutation can also be advanced as the rotation speed increases (cf. DE 197 00 479 A1 as an example).

In this fashion, motor 32 can supply energy in generator mode back into capacitor 75 (FIG. 2) during braking, i.e. when it exceeds rotation speed n_s specified by the rotation speed controller, without allowing voltage U_B at the capacitor to assume impermissible values.

This procedure also ensures that motor 32 is switched off if its operating voltage U_B drops below a permissible value U MIN_OFF, thereby preventing malfunctions of motor 32. This is especially important when a motor of this kind is being operated from a storage battery (not depicted), which must be imagined in FIG. 2 instead of rectifier 72; this is common practice for those skilled in the art.

In COMMUT subprogram S348 (FIG. 22), output stage 78 is commutated as a function of Hall signals HS1, HS2, HS3 if no malfunctions are present. The COMMUT subprogram, which also serves in general for commutation, takes into account the value of U_OFF during commutation. If U_OFF has a value of 1, all signals EN1, EN2, EN3 (FIG. 11) then remain HIGH (cf. S302 in FIG. 22), i.e. all driver modules 200 (FIG. 14) remain deactivated.

In S398 of FIG. 25, variable FCT_UBT is reset to zero, and execution branches to the beginning of function manager FCT_MAN S602 (FIG. 20).

Controller RGL 24

Exemplary embodiments of controller RGL 24 for the operating modes of motor 32 presented in FIG. 16 will be discussed below.

Rotation Speed Regulation Via Voltage Setting

FIG. 27 shows RGL_U routine S624_1 that performs rotation speed regulation n_CTRL via voltage setting U_CTRL (cf. S502 in FIG. 16); in other words, rotation speed n is regulated by modification of the voltage at motor 32. The RGL_U routine is requested by Hall Interrupt routine S631 (FIG. 21) after calculation of rotation speed n (S350 therein).

The following variables are used:

| | |
|---|---|
| RGL_DIFF | System deviation |
| n_s | Desired rotation speed |
| n | Actual rotation speed |
| RGL_PROP | Proportional component |
| RGL_P | Proportional factor |
| RGL_INT | Integral component |
| RGL_I | Integral factor |
| RGL_VAL | Control output calculated by controller |
| RGL_MAX | Maximum control output |
| PWM1 | Control output for signal PWM1 |
| PWM_I+ | Control output for positive current limiter 131 |
| PWM_I− | Control output for negative current limiter 161 |
| FCT_RGL | Request bit for RGL routine S624_1 |

In this example, the RGL_U routine performs a PI control action to calculate control output RGL_VAL. Control output RGL_VAL is checked for permissibility, and conveyed to PWM generator 25 (FIG. 11) in order to generate signal PWM1.

In S400, system deviation RGL_DIFF is calculated as the difference between the desired rotation speed n_s and present rotation speed n.

In S402, proportional component RGL_PROP is calculated by multiplying system deviation RGL_DIFF by proportional factor RGL_P. The new integral component RGL_INT is calculated by adding the old integral component RGL_INT to the result of the multiplication of system deviation RGL_DIFF and integral factor RGL_I, and control value RGL_VAL is obtained from the sum of proportional component RGL_PROP and integral component RGL_INT.

Steps S404 through S410 check whether control output RGL_VAL is within a permissible range.

If control output RGL_VAL is less than 0, it is set to 0 in S406.

If control output RGL_VAL is greater than the maximum permissible value RGL_MAX, it is set to RGL_MAX in S410.

In S412, value PWM1 is set to the control value RGL_VAL (limited as applicable), and values PWM_I+ and PWM_I− are set to the maximum permissible values I_max+ and I_max− for maximum currents i_2 and i_2', respectively. Using these values, rotation speed n is regulated to desired value n_s via voltage setting. Positive hardware current limiter 131 (FIG. 6) limits current i_2 to I_max+, and negative hardware current limiter 161 (FIG. 8) limits current i_2' to I_max−.

In S414, the RGL_U routine is terminated by setting FCT_RGL to 0, and execution branches to FCT_MAN S602 (FIG. 20).

Instead of a PI controller it is also possible, of course, to use a different controller such as a PID controller, as is familiar to one skilled in the art.

Rotation Speed Regulation Via Current Setting

FIG. 28 shows RGL_I routine S624_2, which performs rotation speed regulation n_CTRL via current setting I_CTRL (cf. S518 in FIG. 16); in other words, the rotation speed is regulated by modifying the current to which current limiting arrangement 131 and/or 161 is set.

The RGL_I routine is requested by HALL Interrupt routine S631 (FIG. 21) after calculation of rotation speed n (S350 therein).

The following variables are used:

| | |
|---|---|
| RGL_DIFF | System deviation |
| n_s | Desired rotation speed |
| n | Actual rotation speed |
| RGL_PROP | Proportional component |
| RGL_P | Proportional factor |
| RGL_INT | Integral component |
| RGL_I | Integral factor |
| RGL_VAL | Control output calculated by controller |
| RGL_MAX | Maximum control output |
| PWM1 | Control output for signal PWM1 |
| PWM_I+ | Control output for positive current limiter 131 |
| PWM_I− | Control output for negative current limiter 161 |
| FCT_RGL | Request bit for RGL routine S624_2 |

The RGL_I routine (FIG. 28) performs a PI control action to calculate control output RGL_VAL, which is checked for permissibility and conveyed to PWM generator 29 (FIG. 11), which controls positive current limiter 131.

Steps S420 through S430 correspond to the analogous steps S400 through S410 of RGL_U routine S624_1. In S420, system deviation RGL_DIFF is calculated; in S422, the PI controller calculates control output RGL_VAL; and in S424 through S430, a range check of control output RGL_VAL takes place.

The importance of limiting RGL_VAL to RGL_MAX is that a limitation of maximum motor current i_2 is thereby achieved.

In S432, value PWM1 is set to a value U_max which is sufficiently high that the positive current limiter is always active, i.e. for example to 100%, so that the motor current constantly takes the form of current pulses. Value PWM_I+ is set to control value RGL_VAL, which is limited as applicable by S424 through S430. The result is that rotation speed n is regulated to desired value n_s via current setting. Value PWM_I− is set to the maximum value I_max− that is permissible for maximum current i_2' and for the instantaneous rotation speed. Negative hardware current limiter 161 limits current i_2'.

Since control output RGL_VAL defines the value at which positive current limiter 131 becomes active, value RGL_MAX for the range check in S428 and S430 must be selected so that current i_2 cannot become greater than the permissible maximum current I_max+.

In S434, RGL_I routine S624_2 is terminated by setting FCT_RGL to 0, and execution branches to FCT_MAN S602 (FIG. 20).

Instead of a PI controller it is also possible, of course, to use a different controller such as a PID controller, as is familiar to one skilled in the art.

Positive Torque Adjustment Via Current Setting

FIG. 29 shows RGL_T+ routine S624_3, which performs a positive torque adjustment T_CTRL pos. via current setting I_CTRL (cf. S510 in FIG. 16); in other words, the desired torque T+ is established by regulating current i_2 to a specified value.

RGL routine S624_3 is requested by HALL Interrupt routine S631 (FIG. 21) after calculation of rotation speed n (S350 therein). Since no rotation speed regulation is taking place in this case, a call independent of the calculation of rotation speed n would also be possible.

The following variables are used:

| | |
|---|---|
| PWM1 | Control output for signal PWM1 |
| U_max | Value for PWM1 at which current limiter 131 is active |
| PWM_I+ | Control output for positive current limiter 131 |
| I(T+) | Value for PWM_I+ corresponding to torque T+ |
| PWM_I– | Control output for negative current limiter 161 |
| I_max– | Value for maximum permissible braking current i_2' |
| FCT_RGL | Request bit for RGL_T+ routine S624_3 |

In S440, the RGL_T+ routine sets signal PWM1 to a value U_max at which positive current limiter 131 is constantly active, i.e. usually to 100%. Signal PWM_I+ is set to a value I(T+) which corresponds to the desired positive torque T+, and PWM_I– is set to a value I_max– that corresponds to the maximum permissible braking current i_2' (cf. S512 in FIG. 16).

In S442, request bit FCT_RGL is reset to 0, since the RGL_T+ routine has been executed.

Execution then jumps back to the beginning FCT_MAN S602 of function manager 601 (FIG. 20).

Because the positive current limiter is constantly effective (since PWM1=U_max), it regulates the current to the desired value, and the motor's torque is thereby held constant. Curve 796 of FIG. 36 shows the current being held constant over a wide load range; curve 802 of FIG. 37 shows that, as a result, the power P absorbed by the motor is held constant; and curve 790 of FIG. 35 shows that as a result of the constant torque, the rotation speed of a fan changes greatly with differing loads. Constant power absorption makes it possible to reduce the dimensions of power supply sections, batteries, etc., resulting indirectly in a steep reduction in capital costs.

Negative Torque Adjustment Via Current Setting

FIG. 30 shows RGL_T– routine S624_4, which performs a negative torque adjustment T_CTRL neg. via current setting I_CTRL (cf. S514 in FIG. 16); in other words, the desired braking torque T– is established by regulating current i_2' to a specified value.

The RGL_T– routine is requested, for example by HALL Interrupt routine S631 (FIG. 21) after calculation of rotation speed n (S350 therein). Since no rotation speed regulation is taking place in this operating mode, a call independent of the calculation of rotation speed n would also be possible.

The following variables are used:

| | |
|---|---|
| PWM1 | Control output for signal PWM1 |
| U_min | Value for PWM1 at which current limiter 161 is active |
| PWM_I+ | Control output for positive current limiter 131 |
| I_max+ | Value for maximum permissible driving current i_2 |
| PWM_I– | Control output for negative current limiter 161 |
| I(T–) | Value for PWM_I– corresponding to torque T– |
| FCT_RGL | Request bit for RGL routine S624_4 |

In S450, the RGL_T– routine sets signal PWM1 to a value U_min at which negative current limiter 161 is constantly active. Signal PWM_I– is set to a value I(T–) which corresponds to the desired negative torque T–, and PWM_I+ is set to a value I_max+ that corresponds to the maximum permissible driving current i_2, e.g. to 100% (cf. S516 in FIG. 16).

In S4S2, request bit FCT_RGL is reset to 0, since the RGL_T– routine has been executed.

Execution then jumps back to the beginning FCT_MAN S602 of function manager 601 (FIG. 20).

In this fashion, the braking torque is kept at a constant value over a wide range of rotation speeds.

FIG. 31 shows RGL routine S624. This allows selection of the particular routine RGL_U S624_1 (FIG. 27), RGL_I S624_2 (FIG. 28), RGL_T+S624_3 (FIG. 29), and RGL_T– S624_4 (FIG. 30) that is to be used for controller RGL 24 (FIG. 11). Alternatively, only one or two of these routines can be provided in a motor; for example, a fan usually does not need a braking routine.

RGL routine S624 is requested e.g. by HALL Interrupt routine S631 (FIG. 21) after calculation of rotation speed n (S350 therein).

The following variables are used:

| MODE | Selected mode |
|---|---|
| RGL_U | Value for RGL_U mode S624_1 |
| RGL_I | Value for RGL_I mode S624_2 |
| RGL_T+ | Value for RGL_T+ mode S624_3 |
| RGL_T– | Value for RGL_T– mode S624_4 |

The MODE variable indicates the mode in which motor 32 is operated. The MODE variable is set in MODE routine S628 (FIG. 20). An exemplary embodiment of MODE routine S628 is given in FIG. 32.

S460 checks whether the selected MODE is equal to the RGL_U mode. If Yes, RGL_U routine S624_1 is called.

If not, S462 checks whether the selected MODE is equal to the RGL_I mode. If Yes, RGL_I routine S624_2 is called.

In similar fashion, S464 and S466 check whether modes RGL_T+ S624_3 or RGL_T– S624_4 are selected, and the corresponding routines are called.

FIG. 32 shows MODE routine S628. This routine sets the operating mode of motor 32 as a function of input leads IN_A, IN_B, 44, 46, and 48 of μC 23 (FIG. 11). It is requested by TIMER∅ Interrupt routine S639 (FIG. 23) in S360, and called by function manager 601 (FIG. 20) in S626.

The following variables are used:

| MODE | Selected operating mode |
|---|---|
| n_s | Rotation speed specification (desired rotation speed) |
| I_max+ | Value for maximum permissible driving current i_2 |
| I_max– | Value for maximum permissible braking current i_2' |
| U_max | Value for PWM1 at which positive current limiter 131 is active |
| I(T+) | Value for PWM_I+ that results in torque T+ |
| I(T–) | Value for PWM_I– that results in torque T– |
| U_min | Value for PWM1 at which negative current limiter 161 is active |

In MODE routine S628, the operating MODE that is to be used is selected on the basis of inputs IN_A and IN_B (FIG. 11)—which can, for example, be set from outside motor 32 or can be transmitted via bus 18. The parameters for controller RGL S624 (FIG. 31) for the selected mode are set by digitizing the analog value at input x, using A/D converter 30 (FIG. 11) and a function AD[x]. The value x is one of inputs 44, 46, or 48 of μC 23, and its analog value is determined by potentiometers 43, 45, and 47, respectively.

S470 checks whether IN_A=LOW and IN_B=LOW. If Yes, execution branches to S472. The selected MODE is set to RGL_U, so that RGL routine S624 (FIG. 31) calls RGL_U routine S624_1 (FIG. 27), which performs a rotation speed regulation operation n_CTRL via voltage setting U_CTRL. Rotation speed specification n_s is set to the digitized value AD[44], value I_max+ for the maximum permissible driving current i_2 is set to the value AD[46], and value I_max− for the maximum permissible braking current i_2' is set to the value AD[48]. Execution then branches to FCT_MAN S602. "AD[44]" means, for example, the value at input 44 of FIG. 11.

In the same fashion, S474 checks whether IN_A=LOW and IN_B=HIGH. If Yes, then in S476 the MODE is set to RGL_I, rotation speed specification n_s is set to the digitized value AD[44], value U_max to the value AD[46], and value I_max− to the value AD[48]).

S478 checks whether IN_A=HIGH and IN_B=LOW. If Yes, then in S480 the MODE is set to RGL_T+, value I(T+) is set to the value AD[44], value U_max to the value AD[46], and value I_max− to the value AD[48].

S482 checks whether IN_A=HIGH and IN_B=HIGH. If Yes, then in S484 the MODE is set to RGL_T−, value I(T−) is set to the value AD[44], value I_max+ to the value AD[46], and value U_min to the value AD[48].

The operating mode can, of course, also be inputted in a different manner, e.g. via bus 18 or EEPROM 20 (FIG. 11). The operating parameters that were inputted in this exemplary embodiment via the inputs IN_A, IN_B, 44, 46, and 48 can also be inputted via bus 18 or EEPROM 20, e.g. by replacing the EEPROM or a ROM.

Parameters of motor 32 can also be incorporated into the determination of the operating mode in MODE (FIG. 32). In response to a signal IN_A, for example, motor 32 can implement operating mode RGL_I for rotation speed regulation n_CTRL via current control I_CTRL, in order to achieve a desired rotation speed n_s. Once rotation speed n_s has been reached, operation then switches over, for example in MODE routine S628, to operating mode RGL_T−, and DC machine 32 operates at a constant braking torque, i.e. as a generator. The initial driving of DC machine 32 to a rotation speed n_s may be necessary, for example, because otherwise an excessively high relative speed would exist between DC machine 32 and an object being braked.

FIG. 33 shows a radial fan 370 having a housing 771 which has an air inlet 772 and an air outlet 774. A motor 32 drives a radial fan wheel 776 in order to transport air from air inlet 772 to air outlet 774. An operating voltage +U_B is conveyed to motor 32 via two leads 778. The electrical and electronic components of motor 32 are preferably located in housing 771.

FIG. 34 shows characteristic curves for radial fan 370 of FIG. 33, on which pressure increase Δp is plotted against volumetric flow V/t. For curves 780 and 782, the radial fan was operated with rotation speed regulation n_CTRL via voltage control U_CTRL; it was regulated to 3,800 rpm for curve 780, and to 4,000 rpm for curve 782. For curve 784, the radial fan was operated with positive torque control, in which motor current I was set to a constant value so that fan wheel 776 is operated over a wide rotation speed range at a substantially constant torque.

Characteristic curve 784 of the radial fan, for operation at a positive constant torque, is substantially better than curves 780 and 782, since a sufficient volumetric flow is generated even for large pressure differences Δp; in other words, a fan using characteristic curve 784 can continue to generate a sufficiently high volumetric flow even at a considerably higher counterpressure. A radial fan with characteristic curve 784 therefore has more applications. (The steeper the characteristic curve 784, the more favorable for the operation of such a fan.) It is also very advantageous that for a given installation of a radial fan that is operated at constant torque, the rotation speed rises if a filter is clogged and the counterpressure consequently rises. An alarm signal can thus automatically be triggered in the event of a specified rise in the rotation speed, so the filter can be checked and, if applicable, replaced. This is shown in FIG. 38.

The equivalents in the subsequent FIGS. 35, 36, and 37 are as follows: Curve 780 (3,800 rpm) corresponds to curves 786, 792, and 798. Curve 782 (4,000 rpm) corresponds to curves 788, 794, and 800. Curve 784 (constant torque) corresponds to curves 790, 796, and 802.

FIG. 35 shows characteristic curves for various fan types, rotation speed n being plotted against volumetric flow V/t.

Curve 786 shows that regulation to a rotation speed n_s=3,800 rpm is occurring. Curve 788 correspondingly shows regulation to a rotation speed n_s=4,000 rpm. In curve 790 (for radial fan 370), the rotation speed rises toward lower volumetric flows V/t. As shown in FIG. 34, this enables a high volumetric flow V/t even at greater pressure differences Δp. In curve 790, radial fan 370 is operating at a constant torque T+.

FIG. 36 illustrates characteristic curves for various fan types, showing current I through motor 32 plotted against volumetric flow V/t.

In curve 796, current I is constant over a wide range but decreases slightly toward smaller volumetric flows. This is probably attributable to problems with the power supply section that was used for the present measurement. In curves 792 and 794, current I increases with increasing volumetric flow V/t.

FIG. 37 illustrates characteristic curves 798, 800, and 802 for various fan types, showing power level P plotted against volumetric flow V/t.

In curve 802 for radial fan 370, power is fairly constant at greater volumetric flows V/t, as expected for a constant motor current I; power P declines slightly at smaller volumetric flows V/t. This is once again attributable to problems with the power supply section used for the measurements. In curves 798, 800, power increases with increasing volumetric flow V/t.

Operation in accordance with curve 802, i.e. at constant power P, can be very advantageous because the power supply of motor 32 needs to be dimensioned only for that power level.

A radial fan that operates at constant positive torque (characteristic curve 802), i.e. at approximately constant motor current I, is suitable for a wider range of pressure differences Δp (FIG. 34), so that, for example in a multistory building, it can be used just as effectively on the first as on the 12th floor in order to ventilate a bathroom or a kitchen through a common air discharge duct. This is explained below with reference to FIGS. 40 through 43.

As a result, for example, a radial fan 370 with positive torque control can be used for ventilation on every floor of a multistory building, in which very different pressures exist in the ventilation shaft as a function of floor level, whereas a radial fan 370 with rotation speed regulation n_CTRL via voltage control U_CTRL could be used only on specified floors. In other words, a wider variety of types of axial fans or radial fans not in accordance with the present invention can be replaced by a single type, or fewer types, of a radial fan according to the present invention being operated at a substantially constant torque T+.

FIG. 38 schematically shows a mobile radio base station 650. The latter has at the bottom a filter 652 for cooling air that flows in at 654 and out at 656. Located at the top is a radial fan 370, for example of the type depicted in FIG. 33. This fan receives its power via a controller 658. As in FIG. 33, its power connection is labeled 778. The components (not depicted) of station 650 that require cooling are located in a space 660.

Let it be assumed that when new, filter 652 causes a pressure drop Δp of 300 Pa. The result, as shown in FIG. 39 on curve 784 (controller 658=current controller regulating to a constant current) is a working point 662 corresponding to a volumetric flow of 107 m^3/h of cooling air.

If controller 658 is a rotation speed controller that regulates fan 370 to a constant rotation speed of 4,000 rpm, the result on curve 782 is a working point 664 corresponding to a volumetric flow of 103 m^3/h; in other words, with a new filter 652 there is almost no difference between working points 662 and 664.

If filter 652 becomes sufficiently dirty that pressure drop Δp rises to 600 Pa, FIG. 39 then shows that there is no longer an intersection with curve 782; in other words, with regulation to a constant rotation speed of 4,000 rpm, fan 370 is no longer delivering air through filter 652, and the electronics in space 660 are no longer being cooled.

The result on curve 784, however (regulation to constant current, i.e. to constant torque), is a working point 666 corresponding to a volumetric flow of 76 m³/h. As is evident from FIG. 35, the reason for this is that at this working point, the rotation speed of radial fan 370 has risen to 4,500 rpm, whereas at working point 662 it was only 4,150 rpm.

Even though the pressure drop has doubled, the cooling air volume therefore decreases in this case by only 29%, since rotation speed n of fan 370 has risen by 8.4% because of the I=const regulation approach.

In practice, fan 370 will be designed in such a situation so that the cooling air volume is still 100% even with a very dirty filter 652.

An essential advantage is the fact that if controller 658 regulates radial fan 370 to a constant current, a single fan is usually sufficient in FIG. 38, whereas if controller 658 regulates fan 370 to a constant rotation speed of e.g. 4,000 rpm, two parallel fans 370 usually need to be used (for safety reasons) to ensure cooling of components 660 even when filter 652 is dirty.

As is evident from FIG. 39, fan 370 with current regulation (curve 784) can maintain cooling even at a pressure drop Δp of 900 Pa. This is working point 668 at which a volumetric flow of 44 m³/h is still produced, since (as shown in FIG. 35), at that point rotation speed n of fan 370 has risen to 5,150 rpm.

The rise in rotation speed n as filter 652 becomes dirtier can be utilized in order to automatically generate a warning signal when filter 652 is dirtier. This purpose is served by a rotation speed monitoring element 672, e.g. a corresponding routine in the program which, upon exceedance of a rotation speed n_0 (e.g. 4,500 rpm), generates an ALARM signal that is transmitted by telemetry to a central station so that filter 652 is replaced at the next routine maintenance. If filter 652 is not replaced, the ALARM signal persists, and it is therefore possible to monitor, from the central station, whether or not maintenance work is being performed correctly.

FIG. 41 shows a ventilation duct 676 whose outlet is labeled 678, and to which six radial fans 370A through 370F of the type depicted in FIG. 33 are connected, all regulated to a constant rotation speed of 4,000 rpm. FIG. 40 shows the associated fan characteristic curve 782; i.e. a fan of this kind delivers approx. 144 m³ of air per hour at a counterpressure of 0 Pa, and approx. 88 m³/h at a counterpressure of 400 Pa.

The six fans 370A through 370F that are delivering into duct 676 generate, for example, a pressure of approx. 100 Pa at right-hand fan 370F, increasing to 600 Pa at fan 370A. The resulting delivery volumes are as shown in the table below:

| Fan | Δp (Pa) | n (rpm) | V/t (m^3/h) |
|---|---|---|---|
| 370A | 600 | 4,000 | — |
| 370B | 500 | 4,000 | 64 |
| 370C | 400 | 4,000 | 87 |
| 370D | 300 | 4,000 | 103 |
| 370E | 200 | 4,000 | 114 |
| 370F | 100 | 4,000 | 130 |

It is evident that the volume of air delivered decreases rapidly toward the left in FIG. 41, and that fan 370A cannot deliver any air at all; air in fact flows out of it, as indicated by an arrow 680. If this were a situation, for example, in which bathrooms were being ventilated, the bathroom odor from fan 370B would therefore overflow into fan 370A

For comparison, FIGS. 42 and 43 show the same arrangement with duct 676 and the six fans 370A through 370F, but with these fans each being operated at constant current, i.e. at a substantially constant torque. As is directly evident from FIG. 42, this fan can generate a substantially higher pressure, since its rotation speed automatically rises with increasing counterpressure. This is shown by the table below:

| Fan | Δp (Pa) | n (rpm) | V/t (m³/h) |
|---|---|---|---|
| 370A | 600 | 4,500 | 76 |
| 370B | 500 | 4,350 | 87 |
| 370C | 400 | 4,230 | 97 |
| 370D | 300 | 4,150 | 106 |
| 370E | 200 | 4,100 | 117 |
| 370F | 100 | 4,100 | 130 |

It is apparent that fan 370F in FIG. 43 is delivering an air volume of 130 m³ per hour, and fan 370A is delivering an air volume of 76 m³ per hour. This is a consequence of the increase in rotation speed, i.e. fan 370F is rotating at 4,100 rpm and fan 370A at 4,500 rpm, so that a negative airflow does not occur anywhere. A fan of this kind thus has a very broad area of application, e.g. for ventilation in multistory buildings or on long air ducts. A radial fan of this kind whose drive motor is regulated to constant torque can be used even with higher counterpressures. If fans of this kind are connected to a data bus over which their operating data can be modified from a central control point, the application possibilities expand even further, since individual fans can then be switched over on a centralized basis to a different constant torque, for example—in the case of a radio base station 650—as a function of outside temperature or some other parameter.

FIG. 44 shows a TEST1 test routine S802 for testing a motor for bearing damage and for generating an alarm signal if bearing damage is present. The TEST1 test routine can also be used to test a fan for a clogged filter and to generate an alarm signal if a clogged filter is present. The second variant is described after the first variant.

First Variant: Test for Bearing Damager

S800 checks whether the TEST1 routine has been requested (cf. FIG. 20). Step S800 is preferably performed between steps S622 and S626 in function manager 601 in FIG. 20.

A corresponding test instruction that sets the value FCT_TEST1 to 1 can be generated at regular intervals, e.g. every 24 hours, or can be conveyed to motor 32 e.g. via data bus 18. The motor is then tested while running. This is normally possible with a fan.

The test proceeds in such a way that the motor is set to a specific low rotation speed n_TEST1 (e.g. n_TEST1=1000 rpm), and value PWM_I+corresponding to the motor current at that rotation speed is checked to see if it lies above a permissible value PWM_TEST1. If Yes, then bearing damage is present, and an alarm is triggered. The reason is that at the low n_TEST1 rotation speed, frictional losses are caused principally by a damaged bearing, whereas losses due to air effects can be ignored.

If test instruction FCT_TEST1=1 is present, S804 then checks whether IN_TEST1=1, i.e. whether the TEST1 routine has already been started.

If No, then in step S806 the previous MODE of motor 32 and the previous target rotation speed n_s are saved. In S808, the motor is switched over to the RGL_I operating mode (FIG. 28), and the desired rotation speed n_TEST1 (e.g. 1000 rpm for a fan) is specified to it. The motor is regulated to this rotation speed by current adjustment, via value PWM_I+. The current in motor 32 at rotation speed n_TEST1 is thus obtained directly; that current corresponds to value PWM_I+. The test routine has now been started, and variable IN_TEST1 is set to 1 in S810. Execution then branches to the beginning of function manager FCT_MAN S602.

If the TEST1 routine was already started in S804 (IN_TEST=1), S812 then checks whether rotation speed n has already reached rotation speed n_TEST1, e.g. 1000 rpm. The test can proceed, for example, so as to check whether rotation speed n lies within a range of +/−2% on either side of the value n_TEST1. If the test in S812 is negative, execution then branches to the beginning of function manager FCT_MAN S602 so that other important functions can be executed. Instead of the rotation speed test it is also possible, for example by means of TIMER1, to wait for a specific time during which motor 32 will certainly have reached rotation speed n_TEST1.

Once rotation speed n_TEST1 has been reached in S812, the values PWM_I+ and PWM_TEST1 are compared in S814. In the first variant, the COMPARE function is used to test whether value PWM_I+, which corresponds to a specific current in motor 32, is greater than a specified value PWM_TEST1 which corresponds e.g. to a current of 60 mA. If it is greater, this means that bearing damage is present, and in that case the program goes to step S816 where an alarm signal is generated (SET ALARM1). The program then goes to step S818, where the old MODE and the old target rotation speed n_s are restored.

If the motor current (corresponding to value PWM_I+) is less than the current corresponding to value PWM_TEST1, the program then goes from S814 directly to step S818, which has already been described.

In S819, variables IN_TEST1 and FCT_TEST1 are prepared for the next test.

The TEST1 test routine is very easy to implement because in the rotation speed regulation process as shown in FIG. 28, the rotation speed is regulated by specifying a current value to the motor as target value PWM_I+, so that in this mode the current in motor 32 is automatically known and can easily be tested, with no need for a specific current measurement for the purpose. The reason is that with this type of regulation, current target value PWM_I+ corresponds to the actual current through motor 32, and that target value is present in controller 24 in digital form, i.e. can easily be compared to the specified value PWM_TEST1.

Second Variant: Test for Clogged Filter

The routine can also be used to test for a clogged filter. For this, rotation speed n_TEST1 is set to a high value, e.g. 5,000 rpm. At high rotation speeds, the effect of a defective bearing is negligible compared to the effect of air and, if applicable, of a clogged filter. If the filter is clogged, the fan has to work less, and the motor current drops for a given rotation speed as compared to a fan with a clean filter. The COMPARE function in S814 therefore tests, conversely, whether value PWM_I+ is less than the limit value PWM_TEST1. If Yes, an alarm is then triggered in S816 with SET ALARM1.

Of course both a TEST1 routine according to the first variant for testing for bearing damage, and a TEST1' routine according to the second variant for testing for a clogged filter, can be performed in motor 32 according to the present invention.

FIG. 45 shows a TEST2 test routine S822 for testing a motor 32 for bearing damage. S820 checks, on the basis of function manager bit FCT_TEST2, whether the TEST2 routine has been requested (cf. FIG. 20). Step S820 is preferably executed between steps S622 and S626 in function manager 601 in FIG. 20.

A corresponding test instruction FCT_TEST2:=1 can be generated at regular intervals, e.g. every 24 hours, or it can be conveyed to motor 32 via data bus 18, or in some other way.

TEST2 test routine S820 is based on a so-called coasting test. In this test, the motor is first set to a constant rotation speed n_TEST2_BEG, e.g. to 1,000 rpm. At a time t_MEAS2 the motor is then switched off, and TIMER1 is used to measure the time t_TIMER1−t_MEAS2 at which motor 32 reaches rotation speed n_TEST2_END (e.g. 50 rpm).

If the motor does so within, for example, 10 seconds, it is apparent that the bearings are OK. If, on the other hand, the motor is already at a standstill e.g. only 3 seconds after being switched off, it can be assumed that bearing damage is present, and an alarm signal is generated. The time values indicated are, of course, only examples, and the coasting times depend on a variety of parameters and are usually ascertained by experiment. They can be inputted via data bus 18.

Step S824 of FIG. 45 checks whether IN_TEST2>=1, i.e. whether TEST2 routine S822 has already been started.

If No, then in step S826 the previous MODE and previous target rotation speed n_s are saved. In S828 the RGL_I operating mode (shown in FIG. 28) is set using MODE:=RGL_I, and the desired rotation speed n_TEST2_BEG, e.g. 1,000 rpm, is specified to motor 32. The test routine is now started, and in S830 variable IN_TEST1 is set to 1. Execution then branches to the beginning of function manager FCT_MAN S602.

When TEST2 routine S822 is then called, it has already been started (IN_TEST2=1), and execution branches from S824 to S832. S832 checks whether value IN_TEST2 is equal to 1. If Yes, S834 then checks whether rotation speed n is equal to the desired rotation speed n_TEST2_BEG (cf. description of S812, FIG. 44).

If rotation speed n is not yet equal to rotation speed n_TEST2_BEG, execution then branches to FCT_MAN S602. If rotation speed n_TEST2_BEG has been reached in S834, then in S836 the MODE is switched to OFF, thereby making motor 32 currentless. This can be done, for example, by setting all three values EN1, EN2, EN3 to 1 (cf. description of FIG. 3). The time at which motor 32 was switched off is saved in t_MEAS2. In S838 value IN_TEST2 is set to 2, since the coasting phase has now begun.

T the next call of the TEST2 routine, IN_TEST2 has a value of 2, so that steps S824, S832 are run through. S840 checks whether rotation speed n has already dropped to the lower rotation speed n_TEST2_END (e.g. 50 rpm). If No, execution branches back to FCT_MAN S602. If rotation speed n_TEST2_END has been reached, however, the coasting time t_TIMER1−t_MEAS2 elapsed since motor 32 was switched off is calculated in S842, and that coasting time is compared to a value t_TEST2 (e.g. 10 seconds). If the coasting time is greater than t_TEST2, then no bearing damage is present, and execution branches to S846. If the coasting time is less than t_TEST2, however, then bearing damage does exist and an alarm signal is set in S844 (SET ALARM2).

In S846, the original operating MODE and original target rotation speed n_s are restored.

In S848, variables IN_TEST2 and FCT_TEST2 are prepared for the next measurement by being set to 0.

Test routine S820 according to FIG. 45 is thus based on a time measurement, whereas test routine S800 according to FIG. 44 is based on a current measurement.

The reduction in rotation speed prior to a measurement is advisable, especially in fans, in order to minimize the influence of value Δp, e.g. the influence of a dirty air filter.

It is normally sufficient to provide either the TEST1 test routine or the TEST2 test routine in order to identify bearing damage, but there may be safety-critical applications in which both test routines are executed automatically at time intervals.

It is of course also possible to save the value (t_TIMER1−t_MEAS2) obtained from a test, and ascertain by a comparison whether that value has deteriorated significantly over time. The same applies to current value PWM_I+ obtained during the TEST1 test routine. These data can also be transmitted via data bus 18 to a central station, so that records of the mechanical condition of motor 32 are continuously acquired there; or they can be stored internally in the motor in a nonvolatile memory, so that the motor carries its own "history" which can easily be interrogated during maintenance.

Both routines (TEST1 and TEST2) can preferably be completely parameterized, configured, and adapted to a particular motor via EEPROM 20 and bus 18.

The procedure in a method for regulating a DC machine to a desired value, e.g. a rotation speed or a torque, is therefore as follows: The DC machine uses a current limiting arrangement and has a pulsed direct current constantly conveyed to its supply lead, since the current limiting arrangement is constantly active. The desired value—e.g. rotation speed, power level, drive torque, or braking torque—is regulated by modifying the current target value for response of the current limiting arrangement; the result, in a DC machine of this kind, is as if that current target value had been specified to it or "imprinted" into it. In this context, the pulse duty factor of the pulsed direct current being conveyed is modified in order to maintain that current target value in the DC machine.

For a method of this kind, the DC machine is preferably dimensioned in such a way that its winding has a resistance which would be too low for direct operation of the machine at the operating voltage that is provided, i.e. which requires operation with current limiting. This aspect is explained quantitatively in Example 1.

The number of variants and modifications possible within the context of the present invention is, of course, quite extraordinarily large.

The invention claimed is:

1. A fan arrangement, comprising
   a radial or diagonal fan (370);
   a direct current motor (32) associated with said fan as a drive motor,
   a digital control element (23, 24; 658) associated with said direct current motor (32),
   a first signal generator (25), coupled to an output of said digital control element and having a first internal resistance (158, 152), which generates a control signal (u_156);
   a PWM generator (182), responsive to said control signal (u_156), controlling a pulse duty factor (PWM2) of a pulsed direct current applied to windings of said motor,
   a comparison arrangement (137, 167), having first and second inputs (138, 140), said first input (138) receiving an output signal of said digital control element, and said second input (140) receiving a signal derived from said pulsed direct current, said comparison arrangement producing a comparison output signal (146) as a function of the magnitudes of its two input signals;
   a modification arrangement, responsive to said comparison output signal (146), for modification of the control signal (u_156) for the PWM generator, which comparison arrangement has an internal resistance (144, 150, 174) that is smaller than the first internal resistance (158, 152) of said first signal generator (25), in order to enable preferential influencing of the control signal (u_156) and thus of the pulse duty factor of the pulsed direct current (i_2; i_2"), and
   a program, associated with said digital control element, for controlling the current flowing through the direct current motor (32), which program is configured to apply a pulsed direct current (i_2) from a current source to the motor (32), in a working rotation speed range of the fan, so as to result in a substantially constant current in the direct current motor (32) in that working rotation speed range.

2. The fan arrangement according to claim 1,
   wherein one of the signals, from the set of said current target-value signal and said current actual-value signal, is applied to the comparison arrangement as a substantially smoothed signal and the other is applied as a substantially pulsed signal, so as to enable, at each pulse of the signal conveyed as a pulsed signal, a comparison operation and, as a function of the result of that comparison operation, a modification of the control signal (u_156).

3. An arrangement for aerating or venting a plurality of specified points of an enclosed space comprising
   at each of those specified points, a respective fan (370) equipped with a respective drive motor (32) for pumping a gaseous medium, wherein a plurality of the drive motors, in their switched-on state, are each operated with a substantially constant substantially load-independent current, wherein the motor of at least one fan is implemented as a direct current motor which, in operation, is supplied at its supply leads with a substantially pulsed direct current, a PWM control system, having a pulse duty factor (PWM2) controllable by means of a first analog control signal (u_156), is provided to control the pulsed direct current, a signal generator, having a first specified internal resistance, is provided in order to generate a second analog control signal (SWA1), and said motor includes a comparison arrangement having respective inputs, to which a current target-value signal (PHI1) and a current actual-value signal (u_2), the latter derived from the pulsed direct current, are applied, in such a way that an output signal of the comparison arrangement influences the first analog control signal (u_156) so that a current, corresponding to the current target-value signal, flows in the motor (32), and in an enabled state, the comparison arrangement has a second specified internal resistance that is lower, compared to that first specified internal resistance, in order, in the enabled state, to modify the second analog control signal (SWA1) in such a way that the pulsed direct current exhibits a pulse duty factor (PWM2) adapted to a desired current.

4. The arrangement according to claim 3, wherein at least some of the fans provided at the specified points, and the motors associated with them, are of identical configuration.

5. The arrangement according to claim 3, wherein
one of the two signals to be compared is supplied as a substantially smoothed signal, and
the other of the two signals to be compared is supplied as a substantially pulsed signal to the comparison arrangement,
in order to enable, at each pulse of the pulsed signal, a comparison operation and an influencing of the analog control signal.

6. The arrangement of claim 3, wherein said fans are configured as diagonal fans.

7. The arrangement of claim 3, wherein said fans are configured as radial fans.

8. A method of regulating the current in a direct current motor serving to drive a fan, associated with which are a digital control element for generating, as a pulsed signal, a current target-value signal, and a PWM generator whose output signal controls the current through the direct current motor and whose pulse duty factor is controllable by an analog signal, comprising the steps of:
a) controlling the pulse duty factor of the PWM generator by the analog signal,
b) using the output signal of the PWM generator to control the current through the motor, so as to result in a pulsed current in a supply lead of the motor during operation;
c) deriving, from the pulsed motor current, a pulsed current-dependent signal, converting one of said pulsed current-dependent signal and said current target-value signal into a smoothed analog signal, and comparing amplitudes of said smoothed analog signal and of the other of said pulsed signals;
d) as a function of the result of that comparison, modifying the analog signal for controlling the PWM generator in such a way that the current through the direct current motor, serving to drive the fan, is regulated to the desired target value, in order to obtain a preferred fan characteristic curve.

9. The method according to claim 8, further comprising operating the direct current motor at a working point, at which the pulse duty factor of the output signal of the PWM generator is substantially continuously less than 100%, so that, during operation, a pulsed current flows continuously in a supply lead of the direct current motor.

10. The method according to claim 8, further comprising using an output signal of a rotation speed controller as the current target-value signal.

11. The method according to claim 10, wherein the rotation speed controller is implemented as a digital rotation speed controller.

12. The method according to claim 11, further comprising generating, in the digital speed controller, a PWM output signal (PWM_I+; PWM_I−), in which the information regarding a desired current target-value is contained in the pulse duty factor, and using said PWM output signal as the current target-value signal.

13. The method according to claim 12, further comprising converting the PWM signal (PWM_I+; PWM_I−) outputted by the digital control element as the current target-value signal into an analog target-value signal (PHI1; PHI2) and comparing an amplitude thereof to the pulsed current-dependent signal derived from the pulsed motor current,
in order, as a function of the result of that comparison, to influence the analog signal (u_156) conveyed to the PWM generator in such a way that the current in the motor is regulated to a desired target value.

14. An arrangement for aerating or venting a plurality of specified points of an enclosed space, comprising, at each of those specified points, a respective fan (370) equipped with a respective drive motor (32) for pumping a gaseous medium, wherein a plurality of the drive motors, in their switched-on state, are each operated with a substantially constant substantially load-independent current, wherein
the motor of at least one fan is implemented as a direct current motor which, in operation, is supplied at its supply leads with a substantially pulsed direct current,
a PWM control system (182), having a pulse duty factor (PWM2) controllable by means of a first analog control signal (u_156), is provided to control the pulsed direct current,
a signal generator, having a first specified internal resistance, is provided in order to generate a second analog control signal (SWA1), and
said motor includes a comparison arrangement having respective inputs, to which a current target-value signal (PHI1) and a current actual-value signal (u_2), the latter derived from the pulsed direct current, are applied, one of the two signals being applied as a substantially smoothed signal and the other signal being applied as a substantially pulsed signal, in order to enable, at each pulse of the pulsed signal, a comparison operation and an influencing of the first analog control signal (u_156), so that a current, corresponding to the current target-value signal, flows in the motor (32), and in an enabled state, the comparison arrangement has a second specified internal resistance that is lower, compared to that first specified internal resistance, in order, in the enabled state, to modify the second analog control signal (SWA1) in such a way that the pulsed direct current exhibits a pulse duty factor (PWM2) adapted to a desired current, thereby regulating motor current to obtain a preferred fan characteristic curve.

15. A direct current motor adapted for driving a fan, comprising:
    a permanent-magnet rotor (110),
    a stator (114) having a plurality of winding phases;
    a digital controller (23) generating, as a pulsed signal, a target-value signal for current directed through said winding phases,
    a Pulse Width Modulation (PWM) generator (182), coupled to an output (157) of said digital controller, for generating a pulsed output signal (PWM2) having a variable pulse duty factor, said pulsed output signal (PWM2) controlling the current flowing through said winding phases; and
    means for deriving, from the pulsed current flowing through said winding phases, a current-dependent signal;
    a converter (159, 148) for converting at least one of said pulsed current-dependent signal and said current target-value signal into a smoothed analog signal; and
    a comparison arrangement comparing amplitudes of said smoothed analog signal and of the other of said pulsed signals, and applying a result of said comparing to a control input (156) of said PWm generator (182), so as to regulate current (i_2) through the direct current motor to desired target values,
    in order to obtain a desired fan characteristic curve.

* * * * *